United States Patent
Yun et al.

(10) Patent No.: US 11,057,255 B2
(45) Date of Patent: *Jul. 6, 2021

(54) METHOD FOR TRANSMITTING AND RECEIVING SIGNALS IN WIRELESS LAN SYSTEM AND APPARATUS THEREFOR

(71) Applicant: LG ELECTRONICS INC., Seoul (KR)

(72) Inventors: Sunwoong Yun, Seoul (KR); Jinmin Kim, Seoul (KR); Sungjin Park, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/844,685

(22) Filed: Apr. 9, 2020

(65) Prior Publication Data
US 2020/0235977 A1    Jul. 23, 2020

Related U.S. Application Data

(63) Continuation of application No. 16/326,165, filed as application No. PCT/KR2018/004128 on Apr. 9, 2018, now Pat. No. 10,659,267.

(Continued)

(51) Int. Cl.
*H04L 27/26* (2006.01)
*H04L 5/00* (2006.01)
*H04W 84/12* (2009.01)

(52) U.S. Cl.
CPC ...... *H04L 27/2613* (2013.01); *H04L 27/2602* (2013.01); *H04L 27/2607* (2013.01);
(Continued)

(58) Field of Classification Search
CPC .. H04W 84/12; H04W 28/06; H04L 27/2602; H04L 27/2613; H04L 27/2626
(Continued)

(56) References Cited

U.S. PATENT DOCUMENTS 10,659,267 B2    5/2020   Yun et al.
2016/0249332 A1  8/2016   Xin et al.
(Continued)

FOREIGN PATENT DOCUMENTS

KR    10-2014-109911    9/2014

OTHER PUBLICATIONS

PCT International Application No. PCT/KR2018/004128, International Search Report dated Aug. 16, 2018, 4 pages.
(Continued)

*Primary Examiner* — Leila Malek
(74) *Attorney, Agent, or Firm* — Lee, Hong, Degerman, Kang & Waimey PC

(57) ABSTRACT

The present specification relates to a method for transmitting and receiving signals in a wireless local area network (WLAN) system and an apparatus therefor, the method comprising the steps of: generating a training sub-field consisting of a certain number of orthogonal frequency division multiplexing (OFDM) symbols; and transmitting, to a second STA, a signal including a header field and the training sub-field, wherein the transmitted signal is repeatedly transmitted T times (where T is a natural number) on the basis of information indicated by the header field after a data field.

12 Claims, 40 Drawing Sheets

Related U.S. Application Data

(60) Provisional application No. 62/531,307, filed on Jul. 11, 2017, provisional application No. 62/535,240, filed on Jul. 21, 2017, provisional application No. 62/550,717, filed on Aug. 28, 2017, provisional application No. 62/552,394, filed on Aug. 31, 2017, provisional application No. 62/560,199, filed on Sep. 19, 2017.

(52) U.S. Cl.
CPC ............ *H04L 5/001* (2013.01); *H04L 5/0023* (2013.01); *H04W 84/12* (2013.01)

(58) Field of Classification Search
USPC .......................................................... 375/299
See application file for complete search history.

(56) References Cited

U.S. PATENT DOCUMENTS

| | | | |
|---|---|---|---|
| 2016/0323058 A1* | 11/2016 | Cordeiro | H04L 1/0003 |
| 2016/0323755 A1 | 11/2016 | Cordeiro et al. | |
| 2017/0033958 A1 | 2/2017 | Eitan et al. | |
| 2017/0078008 A1 | 3/2017 | Kasher et al. | |
| 2017/0134076 A1 | 5/2017 | Maamari et al. | |

OTHER PUBLICATIONS

U.S. Appl. No. 16/326,165, Office Action dated Jul. 1, 2019, 16 pages.

European Patent Office Application Serial No. 18832064.2, Search Report dated Jun. 9, 2020, 10 pages.

802.11 Working Group of the LAN/MAN Standards Committee of the IEEE Computer Society, "P802.11ayTM/D0.35 Draft Standard for Information Technology—Telecommunication and Information Exchange Between Systems—Local and Metropolitan Area Networks—Specific Requirements—Part 11: Wireless LAN Medium Access Control (MAC) and Physical Layer (PHY) Specifications—Amendment 7: Enhancement throughput for operation in license-exempt bands above 45 GHz", May 2017, pp. 256.

Korean Intellectual Property Office Application No. 10-2019-7003020, Office Action dated Jun. 19, 2019, 5 pages.

Intel, "Specification Framework for TGay", IEEE 802.11-15/01358r9, Oct. 8, 2016, 90 pages.

Qualcomm, et al., "Short and long TRN subfield", IEEE 802.11-17/0430r0, Jan. 29, 2017, 15 pages.

Intel, "Draft Text for Data/TRN Transition Interval", IEEE 802.11-17/0924r0, Jul. 10, 2017, 3 pages.

* cited by examiner

FIG. 9

| CH 1 | L-STF | L-CE | L-Header | ay Header A | ay STF | ay CE | ay Header B | ay payload |
|---|---|---|---|---|---|---|---|---|
| | GF-STF | GF-CE | | | | | | |
| CH 2 | L-STF | L-CE | L-Header | ay Header A | | | | |

(L: Legacy, GF: Gap Filling, ay: 802.11ay)

FIG. 11

| |
|---|
| The Sequence $Seq^1_{left}$, 176(k), to be transmitted from left to right, up to down |
| -1 -j -j +1 +j -j +1 -1 +1 -j -1 +1 -1 +1 -j -1 -1 +j +j -1 -1 +1 +j +j -1 -j +j -1 +1 -1 -1 +j +1 +1 -1 +1 -j -1 -1 +j +j -1 - <br> 1 +j -1 -1 -j +1 -1 -j +j -j -1 +j -j +1 -1 +j -j +1 +1 +1 +1 +j +j -1 -1 -j +1 -1 -j +j -j -1 +j -j +1 +1 -j -j -1 -1 -j -j +j <br> -1 -1 -j +1 -1 -j +j -j -1 +j -j -j -1 +j +1 +1 +1 +j +j +1 +1 +j -1 +1 +j -j +1 -j -j +j -1 +j +j +1 +1 +1 +j +j -1 <br> -j -j +1 +j -j +1 -1 +1 -j -1 +1 -1 +1 -j -1 -1 +j +j -1 -1 -j -j +1 +j -j +1 -1 +1 -j -1 -1 +1 -1 +j +1 +1 -j -j -j +1 +1 |
| The Sequence $Seq^2_{left}$, 176(k), to be transmitted from left to right, up to down |
| +1 -j -j -1 +j -1 +1 -j +1 +1 -j -j -1 +j -1 -1 -1 -j +1 +j +1 +1 -j +1 -j +j -j +1 +j -j -1 -1 +j +1 -1 +j +j -1 -j <br> +1 -1 +1 +j -1 -1 -j -j -1 -1 +1 -1 +1 +j -1 -1 -j -j -1 -1 +j -j -1 -j -j +1 +1 -j -j -j -j +1 +j -j -1 -1 -1 +j +j <br> +1 +1 -j -1 +1 -j +j -j +1 +j -1 -1 +j +1 -1 +j -j -1 -j -1 +j +j +1 +1 -1 +1 +j -1 -1 +j +j +1 -j +1 -1 +1 +j -1 - <br> j +j -j +1 +j +j -1 -1 -1 +j +j +j -j -j -1 -j +j +1 +1 -j -j +1 -1 +1 +j -1 -1 -j -j -1 -1 +1 -1 +1 +j -1 -1 -j -j -j -1 -1 |
| The Sequence $Seq^3_{left}$, 176(k), to be transmitted from left to right, up to down |
| +1 +1 +j +j +j +1 +1 -j -1 +1 -1 +1 +1 +j -j +j +1 +1 -j -1 +1 -1 -1 +j +j -1 -1 -1 +j +1 -j +j -j -j -j +1 +1 +1 -j -j -1 +j -j <br> +j +j +j -1 -1 -1 +j +j +1 -j +j -j +j +j -1 -1 -1 +j +j -1 +j +j -1 +1 +1 +j +j +j +1 +1 -j -1 +1 -1 -1 -1 -j -j -j -1 +j +1 -1 <br> +1 -j -1 +j +j -j -1 +1 +j -1 -1 -j +1 -j +j -1 -j +1 +1 +j +1 -j -1 +1 -1 -j +j -1 -j +j +1 -j -1 +1 -1 -j +j -1 -j +j -j <br> +1 +1 +j -1 +1 -1 -j +j -j -j +1 +1 -1 +j -1 +j +1 +1 +j +j +1 +1 -j -1 -j +j -1 +1 +j -1 -1 -j +j -j +1 +j -1 -1 +j -1 -1 -j |
| The Sequence $Seq^4_{left}$, 176(k), to be transmitted from left to right, up to down |
| -1 +j +j +1 -j +j +1 -1 +1 +j -1 -j -1 -1 +j +1 -1 +j +j -1 -j +j -j -1 -j -j +1 +1 +1 -j -j -j +1 -1 -j +1 +1 +j +j +1 +1 <br> -1 +j +j +1 -j +j +1 -1 +1 -j -1 -j -1 -1 +j +1 -1 +j -j -1 -j +j -j -1 -j -j +1 +1 +1 -j -j -j +1 -1 -j +1 -1 -j -j -1 -1 +1 <br> -j -j -1 +j -j -1 +1 -1 -j +1 -1 -1 +j +1 -1 +j -j -1 -j -j +j +1 +j -j -1 -1 +j +j -1 -1 +1 -1 +j +1 +j -1 -j +1 +1 +j +j +1 +1 -1 +j <br> +j +j +1 -j +j +1 -1 +j -1 +j +1 +1 -j -1 +1 -j +j +j +1 +j +j -j +j -j -1 -1 -j +j -1 +1 -1 -j +1 +1 +j +j +j +1 +1 |
| The Sequence $Seq^5_{left}$, 176(k), to be transmitted from left to right, up to down |
| +1 -1 +1 -j -1 -1 +j +j +j -1 -1 +1 +j +j -1 -j +j -1 +1 -1 +j +1 -1 +1 +1 -1 +1 -j -1 -1 +j +j -j -1 -1 +1 +j +j -1 -j +j -1 -1 -1 +j <br> +1 +j -j +j +1 -j -j -1 -1 -1 -j -j +j -1 -1 +j +1 -j +j -1 +j +j -j -1 +j +j +1 +1 +1 +j +j -j +1 +1 +j -1 +1 +j -j +j +1 <br> -j -j +j +j -1 +j +j +1 +1 +1 +j +j -1 -1 +j +1 -1 +j -j -1 +j +j +j +1 -j -j -1 -1 -j -j -j +1 +1 +j -1 +1 +j -j +j +1 -j <br> +1 -1 +1 -j -1 -1 +j +j -j -1 -1 -j -j +1 +j +j +1 -1 +j -1 +1 -1 +1 +1 -j -1 -1 +j +j -1 -1 -j -j +1 +j -j +1 -1 +1 -j -1 |
| The Sequence $Seq^6_{left}$, 176(k), to be transmitted from left to right, up to down |
| +1 +j -1 +1 -1 -1 +j -j -1 +j +j +1 -1 -j +1 -1 +1 -j +j -j -j -1 -j -1 +j +j -1 +1 -j -1 -1 +j +j +1 +j +j +1 -1 +j +1 -j <br> +j +j +1 +1 +1 +1 +j +j -1 -j +j -1 +j -j +j +1 +1 +j +j -1 -j +j -1 -1 +j +j -1 -1 -j +1 -1 +1 -1 -1 -1 +j +j -j -1 -1 -j +1 -1 <br> +1 +j -1 -j +j -1 +j -j -1 +j +1 -1 -1 +j -j -1 +j +j -j +1 -j -1 -1 +j +1 -1 +1 -1 -1 -j -j +j +j +1 +j -1 +1 -1 -1 -j +j -1 +j <br> +1 -1 -1 +j +j +j -1 -j +1 -1 +1 +1 +j +j -j -j +1 +1 +1 -j -1 -1 -j +j +1 +1 +1 +j +j -1 -j +j -j -j -j -1 -1 -j -j +j -j <br> +j |
| The Sequence $Seq^7_{left}$, 176(k), to be transmitted from left to right, up to down |
| -j -1 +j +j -j -1 +1 +j -j -1 -1 +j -j +1 -j +j +j +1 -j -1 -1 -j +j -1 -j -j +1 -1 -1 -j -j -j -1 -1 +j +1 -1 +1 +1 <br> -j -1 +1 -1 -j +j -1 -j -j +1 -1 -1 -j -j -j -1 -1 +1 -1 +1 -1 -j -1 +j +1 +j +1 -1 +1 +j -j +1 -1 -1 +j +j +j +1 +j -j -1 +j -<br> 1 +1 -1 -j +j -1 -j -j +1 +1 -1 +j +j +j +1 +1 +j -1 +1 -1 -j +1 +j +j -1 +1 -1 -1 -j -j -j +1 +1 -1 +j -j -1 -j +j +j +j +1 -<br> j +j -j +1 -1 +j +1 +1 +j +j -j -1 -1 +j +j +1 +j -j -1 +1 +1 -1 +j -1 +j +j -j -1 -1 -1 -j -j -j -1 +j +1 -1 +1 |
| The Sequence $Seq^8_{left}$, 176(k), to be transmitted from left to right, up to down |
| +1 -1 +1 +j -1 -1 -j -j -j -1 -1 +j -j +1 -j -j -j +1 +1 +1 +1 +j -j -j +j +j -1 -1 -1 -j +j -1 +1 -1 +j -1 -j -j -j -1 -1 +1 <br> -1 +1 +j -1 -j -j -j -1 -j +j -j +j +1 -j -1 -1 -1 +j -j +j +j -1 -j +1 +1 +j -j +1 -1 +1 +1 -j -1 -1 -j -j -j -1 +j +1 <br> +1 -j -1 +1 -j +j +j -1 +j -j +1 -j +1 -1 +1 +j -1 -1 +j -j -1 +1 +j -j +1 -1 +1 -j -1 -j -1 -1 +j +1 -1 -j -j +j -1 -j +j <br> +1 +1 -j -1 +1 -j +j -j +1 +j +j -1 -j -j -1 +j -j -1 +1 -1 -j +1 +1 -j -j -1 +1 -j +1 -j -1 +1 -1 +j -1 -1 +j +1 -1 +j -j +j -1 -j |

FIG. 12

| The Sequence $Seq^1_{right}$, 176(k), to be transmitted from left to right, up to down |
|---|
| -1 -j -j +1 +j -j +1 -1 +1 -1 +1 -j -1 -1 +j +j -1 -1 +1 +j -1 -j +j -1 +1 -1 +j +1 +1 -1 +1 -j -1 -1 +j +j -1-<br>1 +j -1 -1 -j +1 -1 -j +j -j -1 +j +j +1 +1 +j +j -1 -1 -j +1 -1 -j +j -j -1 +j +j +1 -j -j -1 -1 -j -j-<br>+1 +1 +j -1 +1 +j -j +1 -j +j -j +j +1 -j -j -1 -1 -j -j +j -1 -j +1 -1 -j +j -j -1 +j +j +j -1 -j -j -1 -1 -j -j +1 +j<br>+j -1 -j +j -1 +1 -1 +j +1 -1 +1 -1 +j +1 +1 -j -j +j +1 +1 +1 +j +j -1 -j +j -1 +1 -1 +j +1 +1 -1 +1 -j -1 -1 +j +j -1 -1 |

| The Sequence $Seq^2_{right}$, 176(k), to be transmitted from left to right, up to down |
|---|
| -1 +j +j +1 -j +j +1 -1 +1 +j -1 -1 +j +j +1 -j +j +1 -1 +1 +j -1 +j +1 +1 -j -1 -j +j -j +j -j -1 -1 +j +1 -1 +j +j -1<br>-j -1 +1 -1 -j +1 +1 +j +j +j +1 -1 -1 +1 -1 -j +1 +1 +j +j +1 +1 -j +j -1 -j +1 +1 -1 -j -j +j -j +1 +j -1 -1 -1<br>+j -j -j -1 -1 +j +1 -1 +j -j +j -1 -j +j +1 +1 -j -1 +j -j +1 +j -1 +j +j +1 -j +1 -1 +1 +j -1 -1 +j +1 -j +j +1 -1<br>+1 +j -1 +j -j -1 -j +j +1 +1 +j -j -j +j +1 +j +j -1 -1 -1 +j +1 -1 +1 +j -1 -1 -j -j -j -1 -1 +1 -1 +1 +j -1 -1 -j -j<br>-1 -1 |

| The Sequence $Seq^3_{right}$, 176(k), to be transmitted from left to right, up to down |
|---|
| -1 -1 -j -j -j -1 -1 +j +1 -1 +1 -1 -1 -j -j -j -1 -1 +j +1 -1 +1 +1 -j -j +1 +1 +1 -j -j -1 +j -j +j +j +j -1 -1 -1 +j +j +1 -j +j +j<br>+j -1 -1 -1 +j +j +1 -j +j -j +j +j -1 -1 -1 +j +1 -1 -j +1 -j +j +1 +1 +j +j +j +1 +j -1 +1 -1 -1 -1 -j -j -j -1 -1 -j +1 -1 +1 +j<br>+1 -j +j -j +1 -1 -j +1 +1 +j +j -1 -j +j -1 -1 -1 +j -1 -1 -j -1 +j -1 +1 -1 +j -1 +1 +j +j -1 -1 +j +1 -1 -1 +j +j +1 +j +j -1<br>+1 -j -1 +1 -1 -j +j -1 -j -j +1 -1 +j +1 -1 +1 +j -j +1 +j +j -1 -j -1 -j -j +1 +j -j -1 +1 -j -1 -j -j -1 +j -j +1 -1 +j -1 -1 -j |

| The Sequence $Seq^4_{right}$, 176(k), to be transmitted from left to right, up to down |
|---|
| +1 -j -j -1 +j -j -1 +1 -1 -j +1 -j -1 -1 -1 +j +1 -1 +j +j -1 -j +j -j +j +j -1 -1 -1 +j +j -1 +1 -1 -j +1 +1 +j +j +j +1 +1<br>+1 -j -j -1 +j -j -1 +1 -1 -j +1 -j -1 -1 +j -1 +j +j -j -j +j -1 -j +1 +1 -j -j +1 -1 +1 +j -1 -1 -j -j -1 -1 -1<br>+j +j +j +j +1 -1 +1 +j -1 -j -1 -1 +j -1 +1 +j +j -1 -j +j +j -1 -j -j +1 +1 -1 -j -1 +1 -j +1 +1 +j +j +j +1 +1<br>+1 -j -j -1 +j -j -1 +1 -1 -j +1 +j +1 +1 -j -1 +1 -j +j +j +1 +j +j +j -1 -j -j +1 +1 -j -1 +1 -j +1 +1 +j +j +j +1<br>+1 |

| The Sequence $Seq^5_{right}$, 176(k), to be transmitted from left to right, up to down |
|---|
| -1 +1 -1 +j +1 +1 -j -j -j +1 +1 -1 -j -j +1 +j -j +1 -1 +1 -j -1 -1 +1 -1 +j +1 +1 -j -j -j +1 +1 -j -j +1 +j -j +1 -1 +1 -j-<br>1 +j -j +j +1 -j -j -1 -1 -j -j +1 -1 -j +1 -1 -j +1 -j +1 -j +j -j -1 +j +1 +1 +1 +j +j -j +1 +1 -j -1 +1 +j -j +1 -j<br>+j -j +j +1 -j -j -1 -1 -j -j +1 +1 +1 +j -1 +1 +j -j +1 -j -j +j -1 +j +j +1 +1 +1 +j +j -j -1 -j +1 -j +j -j -1 +j<br>+1 -1 +1 -j -1 -1 -1 +j +j -1 -1 -1 -j +j +j +1 -1 +1 -j -1 +1 -1 +j -1 -j +j -1 -1 -1 -j +j +j +1 -1 +1 -j -1 |

| The Sequence $Seq^6_{right}$, 176(k), to be transmitted from left to right, up to down |
|---|
| -1 -j +1 -1 +1 -j +j +1 -j -j -1 +1 +j -1 +1 -1 -j -1 +j +j +1 +j -j +j -j -1 +j -j -1 -1 +j -j +j +j +j +1 -1 +j +1 -1 -j<br>-j -j -1 -1 -1 -j -j +1 +j -j +j -j -1 -1 -1 -j -j +1 +j -j +j -j -1 -1 +j +j -1 -1 -j +1 -1 +1 -1 -1 -1 +j +j -j -1 -j +1 -1 +1 -j<br>+1 +j -j +j +1 -1 +j +1 +1 -j -j +1 +j -j +j -1 +j +1 +1 -j +j -1 -1 -1 -j -j -1 -j +j +j +1 +1 -1 +1 -1 -j -j -1 +j<br>+1 +1 +1 -j -j -j +1 +1 +j -1 +1 -1 -1 -1 -1 +j +j -j -1 -1 -j +1 -1 -j +1 -1 +j +j +1 +1 +1 +j -1 -j -j -j -1 -1 -1 -j -j +j -j<br>+j |

| The Sequence $Seq^7_{right}$, 176(k), to be transmitted from left to right, up to down |
|---|
| +j +1 -j +j -j -1 -j +1 +j -j -j +1 +1 -j -j -1 +j +j -1 +j +1 -1 +1 +j -j +1 +j +j -1 +1 +1 +j +j +j +1 -j -1 +1<br>-1 +1 -j -1 +1 -1 -j +j -1 -j -j +1 -1 -1 -j -j -j -1 -1 +1 -1 -1 -j -j +j -j -1 +j -1 -j -1 +j -1 -1 +j +j +1 -1 +j +j<br>-1 +j -1 -1 +1 +j -j +1 +j +j -1 -1 -1 -j -j -j -1 -1 -1 +1 -1 +1 +j +j -j +j +1 -1 +j +1 +j -j -1 -1 +j +j +1 -1 +j +j<br>+j +1 -j +j -j +1 -1 -j +1 +1 +j +j -1 -1 -1 +j +1 -j +j -j -1 +j -1 +1 -1 +j +j -j +j -1 -1 -1 -j -j -j -1 -1 -j +j -1 -1 +1 |

| The Sequence $Seq^8_{right}$, 176(k), to be transmitted from left to right, up to down |
|---|
| -1 +1 -1 -j +1 +1 +j +j +j +1 -1 +1 +j -1 -j -j -1 -j -j +j +j +1 -j +j -1 +j +j -j +1 -1 +j +1 +1 -j -1 -1<br>1 +1 -1 -j +1 +1 +j +j +j +1 -j +j -j +1 +j +j -1 -1 -1 +j +j -j -j +j +j -1 -1 -1 +j +1 -1 +1 +j -1 -1 -j -j -j -1 -1<br>-j -1 -1 +j +1 -1 +j -j +j -1 -j -1 +j +j +1 -j +j +1 -1 +1 +j -1 +j -1 -1 -j -1 +j -1 -1 +j +j -1 -1 +j +1 -1 -1 +j +1 -1 +j +j -1 -j -j<br>-1 -1 +j +1 -1 +j +j -1 -j +1 -j -j -1 +1 -j -j +1 -1 +j +1 -1 +j +j -1 +j +1 -1 +1 +j -1 -j -1 -1 +j +1 -1 +j +j -1 -j |

FIG. 13

| The Sequence Seq$^1_{left}$, 385(k), to be transmitted from left to right, up to down |
|---|
| -1 -1 +j -1 +1 +1 -1 +j +1 +j +j +j -j -j -1 -j +j +j -j +1 -j +1 +1 +1 -1 -1 +j -1 +1 +1 -1 +j +1 +j +j +j -j +1 -j -j +j -<br>1 +j -1 -1 -1 +1 +1 -j +1 -1 -1 +1 -j -1 -j -j -j +j +j +1 +j -j -j +j -1 +j -1 -1 -1 +1 -1 +j -1 +1 +1 -1 +j +1 +j +j +j -j +j +1<br>+j -j -j +j -1 +j -1 -1 -1 +1 -1 +j -1 +1 +1 -1 +j +1 +j +j +j -j -j -1 -j +j +j -j +1 -j +1 +1 +1 -1 -1 +j -1 +1 +1 -1 +j +1 +j<br>+j +j -j +j +1 +j -j -j +j -1 +j -1 -1 -1 +1 -1 +j -1 +1 +1 -1 +j +1 +j +j +j -j -j -1 -j +j +j -j +1 -j +1 +1 +1 -1 +1 -j +1 -1 -<br>1 +1 -j -1 -j -j -j +j +j -1 -j +j +j -j +1 +j +1 +1 -1 -j -1 -j +j +j -j -1 +j -1 -1 -1 +1 +1 -j +1 -1 -1 +1 +j +1 +j +j +j -j -j<br>-1 -j +j +j -j -1 +j -1 -1 -1 +1 -1 +j -1 +1 +1 -1 -j -1 -j -j -j +j +j -1 -j +j +j -j +1 -j +1 +1 +1 -1 -1 +j -1 +1 +1 -1 -j -1 -j -<br>j -j +j +j -j -1 -j +j +j -j -1 +j -1 -1 -1 +1 -1 +j -1 +1 +1 -1 -j -1 -j -j -j +j +j +1 +j -j -j +j +1 -j +1 +1 -1 -1 +j -1 +1 +1 -1<br>-j -1 -j -j -j +j +j +j +1 +j -j -j +j -1 +j +1 +1 -1 -1 +j -1 -1 -1 +1 +j +1 +j +j +j -j +j +1 +j -j -j +j -1 +j +1 +1 +1 -1 -1<br>+j -1 +1 +1 -1 -j -1 -j -j -j +j -j -1 -j +j +j -j -1 -1 -1 +1 -1 +j -1 +1 +1 -1 -j -1 -j -j -j +j |

| The Sequence Seq$^2_{left}$, 385(k), to be transmitted from left to right, up to down |
|---|
| -j +1 -1 -1 -1 +j -1 -j +j +j +j +1 +j +j -j -j +j +1 +j -1 +1 +1 -1 +j -1 -1 +1 +1 +1 -j +1 +j -j -j -1 -j +j +j -j -j +1 -<br>1 -1 +1 -j +1 +1 -1 -1 -1 +j -1 -j +j +j +1 +j +j -j -j +j +1 +j -1 +1 +1 -1 +j -1 -1 -1 -1 +j -1 -j +j +j +j +1 +j +j -j -j<br>+j +1 -j +1 +1 -1 +j -1 +1 -1 -1 -1 +j -1 -j +j +j +j +1 +j +j -j -j +j +1 +j -1 +1 +1 -1 +j -1 +1 -1 -1 -1 +j -1 -j +j +j<br>+1 +j +j -j -j +j +1 +j -1 +1 +1 -1 +j -1 +1 -1 -1 -1 +j -1 -j +j +j +1 +j +j -j -j +j +1 +j -1 +1 +1 -1 +j -1 +1 +1 +1 -j<br>+1 +j -j -j -j -1 -j +j +j -j -1 +j +1 -1 -1 +1 +j +1 +j -j -j -j -1 +1 +1 +1 +j +1 -1 +1 +1 -1 +j -1 +j -j -j +j +1 +j +j<br>+j +j +1 +j +1 -1 -1 -1 +j -1 +1 -1 -1 +1 +j +1 -j +j +j -j -1 -j +j +j -j -1 -1 +1 +1 +1 +j +1 -1 +1 +1 -1 +j -1 +j -j -j +j<br>+1 +j +j -j -j -j -1 -j +1 +1 +1 -j +1 -1 +1 +1 -1 +j -1 +j -j -j +j +1 +j -j +j +j +1 +j +1 -1 -1 +j -1 +1 -1 -1 +1 +j<br>+1 -j +j +j -j -1 -j +j +j +1 +j +1 -1 -1 +j -1 +1 -1 -1 +1 -j +1 +j +j -j -1 -j +j +j +1 +j +1 -1 -1 +j -1 +1<br>-1 -1 +1 -j +1 -j +j +j -j -1 -j +j -j -j -j -1 -j -1 +1 +1 -j +1 -1 +1 +1 -1 +j -1 +j -j -j +j +1 +j |

| The Sequence Seq$^3_{left}$, 385(k), to be transmitted from left to right, up to down |
|---|
| +1 -1 +j -1 +1 -j +1 +j +1 +j -j -1 -j +1 -j +1 -1 +j -1 +j +1 +j -j -1 -j +1 -j -1 +j +1<br>+j +1 +j -j -1 -j +1 +1 -1 -1 -1 +1 -j -j +j +j -j +1 -1 -1 -1 +1 +j -j -j -j +j -1 -1 +1 +1 +1 -1 -j -j +j +j -j -1 -1<br>+1 +1 +1 -1 +j +j -j -j +j +j +1 +j -j -1 -j +1 -j +1 -1 +j -1 -j -1 -j +j +1 +1 -j +1 -j -1 +j +1 +j -j -1 -j -1 +1<br>-j +1 -j -1 -j +j +1 +j -1 +j -1 +1 +j +1 -j -j +j +j -j -1 -1 +1 +1 +1 -1 -j -j +j +j -j +1 -1 -1 -1 +1 -j -j +j +j -j<br>+1 +1 -1 -1 -1 +1 -j -j +j +j -j -1 -1 +1 +1 -1 +j +1 +j +j +j +1 -j +1 +j -1 -j -j -1 -j +1 -j +1 +1 +j -j -<br>1 -j -j -1 -j +1 -j +1 +1 -j +1 +j +1 +j +1 +j +1 -j +1 +1 -j -j +j -j -j -1 -1 +1 -1 -1 +1 -j -j +j -j +j +1 +1 -1<br>+1 +1 -1 +j +j -j +j +j -j -1 -1 +1 -1 -1 +1 +j -j +j +j +1 +1 -1 +1 +1 -1 -1 -j -1 -j +1 +j +j +1 +j +1 -j +1<br>+1 -j +1 +j +1 +j +j +1 +j -1 +j -1 -1 +j -1 -j -j -j -1 +j -j +1 -1 +j +1 -j -j -j -1 +j +1 -1 +1 +1 -1 -j -j +j -j -j +j<br>+1 +1 -1 +1 +1 -1 +j +j -j +j -j +1 +1 -1 +1 +1 -1 +j -j +j +j -j +1 -1 +1 +1 -1 -j -j +j -j -j +j |

| The Sequence Seq$^4_{left}$, 385(k), to be transmitted from left to right, up to down |
|---|
| -1 -1 +j -1 +j +1 +j +1 +1 -1 -j -j +j -j -1 -j +1 -j +1 +j +j -j -1 -1 +1 +j +1 -j -1 -j -1 -1 +1 +j -j -j +j +1 +j -1 +j -1 -j -<br>j +j +1 +1 -1 -j -1 -j -1 +j -1 -j -j +j -1 -1 +1 +1 -j +1 +j +1 +j +1 +1 -1 +j -j +j +1 +j +1 -j +1 +j -j +j +1 +1 -1 -1 +j<br>-1 -j -1 -j -1 -1 +1 -j -j +j -1 +j -1 +1 +1 +j +1 +1 -1 -j -j +j -1 +j +1 +j +j -j -1 -1 +1 -1 +j -1 +j +1 +1 +1 -1 -j<br>-j +j -j -1 -j +1 +j +1 +j +1 +j +j -j -1 -1 +1 +j +1 +j +1 +1 -1 -1 +j -1 -j -1 -j -1 -1 +1 -j -j +j +j +1 +1 +j +1 +j +1<br>+j +j -j +1 +1 -1 -1 +j -1 -j -1 +j -1 -1 -1 +1 -j -j +j +j +1 +j -1 +j -1 -j +j +1 +1 -1 -1 -j -1 +j +1 +1 +1 -1 -j -j +j +1<br>+j -1 +j -1 -j -j +j +1 +1 -1 +j -1 +j +1 +j +1 +1 -1 -j -j +j +j -1 +j -1 -j -1 -j -1 -1 +1 -j -j +j -j -1 -j +1 -j +j -1 -1<br>+1 -1 +j -1 -j -1 -j -1 -1 +1 -j -j +j -j -1 -j +1 -1 -1 +1 +j -1 -j -1 -j -1 -j +j +1 -1 -1 -j -1 +j +1 +j +1 +1 -1 -1<br>-1 -j -j +j -1 -j +1 -j +1 +j +j -j -1 -1 +1 +1 +1 -j +1 -j -1 -1 -1 +1 +j -j +j -1 +j +1 +1 -1 +j +j -j +j +1<br>-j +1 +j +j +j +1 +1 -1 -1 +j -1 -j -1 -1 -1 +1 +j -j +j -1 -j -1 -j -j +j +1 -1 -1 +1 |

FIG. 14

The Sequence Seq$^5_{left}$, 385(k), to be transmitted from left to right, up to down

-j -1 +1 +1 -1 +1 +1 +j -j -j +j -j -j +j +j +j +j -j -j -1 +1 +1 +1 -1 -1 -1 +1 +1 +1 -1 -1 +j -j -j -j +j +j -j +j -j +j -j -1 +1
+1 -1 +1 +1 +1 -1 -1 +1 -1 -1 +j -j +j +j -j +j +j -j -j +j +j -1 +1 +1 +1 -1 -1 +1 -1 -1 -1 +1 +1 +j -j -j +j +j +j -j -j +j
-j -j -1 +1 +1 -1 +1 +1 -j +j +j -j +j +j +1 -1 -1 +1 -1 -1 +1 -1 -1 -1 +1 +1 +j -j -j -j +j +j -j -j -j +j +j -1 +1 +1 +1 -1 -1
-1 +1 +1 -1 +1 +1 -j +j +j -j +j +j -j -j +j -j -j +1 -1 -1 +1 -1 -1 -1 +1 +1 +1 -1 -1 +j -j -j -j +j +j -j +j +j -j -j -1 +1 +1
+1 -1 -1 +1 -1 -1 +1 -1 -1 -j +j -j +j -j +j +1 -j +1 +1 -j +1 -j -j -j -1 -j +j +1 +j -j -1 +j +1 -j +1 -1 +j -1 +1 -j
+1 -1 +j -j -j -1 -j +j +1 +j +j +1 +j +j +1 +j -1 +j +1 +1 +j +1 +1 +j -1 +j +1 -j +1 +j +j +1 +j +j +1 +j +j +1 +j +j -1 -j -1 +j -1
+1 -j +1 +1 -j +1 -1 +j -1 +j +1 +j -j -1 -j +j +1 +j +j +1 +j -1 +j -1 -1 +j -1 +j +1 +j +j +1 +j -1 +j -1 -1 +j -1 -1 +j -1 +1
-j +1 -j -1 -j +1 +1 +j -j -1 -j +j +1 +j +1 -j +1 -1 +j -1 +1 -j +1 +1 -j +1 -j +1 +j +j +1 +j +j +1 +j +1 +j +1 -j +1 +1 -j
+1 -1 +j -1 +1 -j +1 +j +1 +j -j -1 -j -j -1 -j +j +1 +j -1 -j -1 +1 -j +1 +1 -j +1 +1 -j +1 +1 -j +1 -j -1 -j -j -1 -j

The Sequence Seq$^6_{left}$, 385(k), to be transmitted from left to right, up to down

+j -1 +j -1 +j +1 +j -1 +j -1 +j +1 +j -j -1 -j -1 +j -1 -j -1 -j -1 +j -1 -1 +j -1 -j -1 -j -1 +j -1 -j -1 -j +j +1 +j -1 +j -1 +j +1
+j -1 +j -1 -j -1 -j -1 +j -1 +j +1 +j +1 +j +1 -j +1 -j -1 -j -1 +j -1 +j +1 +j -j -1 -j +1 +j +1 +j +j +1 +j -1 -1 -1 +j -1 -j -1
-j +1 -j +1 +j +1 +j +j +j -1 +1 +1 -j +j -j -1 +1 +1 -1 -1 -j +j +j +1 -1 -j +j -j +j +j +1 -1 -1 -j +j +j +1 -1 -1
-1 +1 +1 -j +j +j -1 +1 +1 -j +j +j -1 +1 +1 +j -j -j +1 -1 -1 -j +j +j -j +j +j -1 +1 +1 +j -j -j +1 -1 -1 -1 +1 +1 -j +j +j +1 -1
-1 +j -j -j +j -j -j -1 +1 +1 -j +j +j +1 -1 -1 +1 -j +1 +1 +j -1 +j -1 -j +j +1 -j -1 -j -1 -j +j +1 +j +1 +1 +j +1 -j
-j -1 +j -1 +j +j -j -1 -j -1 +j -1 +j +1 +j -1 +j +1 +j +1 +j -1 +j -1 +j +1 +j -1 +j -1 -1 +j -1 -j -1 -j -1 -j -1 -j -1 -j +j
+1 +j +1 -j +1 +j +1 +j +j +1 +j +1 +1 +j +1 -j -1 -j +j +1 +j -1 -j +j -j -j -1 +1 +1 -j +j +1 -1 -1 -1 +1 +1 -j +j +1 -1
-1 +j -j -j +j -j -j +1 -1 -1 -j +j -j -1 +1 +1 +1 -1 -1 -j +j +j -1 +1 +1 +j -j -j +1 -1 -1 +j -j -j +1 -1 -1 +j -j -j +j -j -j -1 +1
+1 +j -j -j -1 +1 +1 +1 -1 -1 -j +j +j +1 -1 -1 -j +j +j -j +j -1 +1 +1 -j +j -j +1 +1

The Sequence Seq$^7_{left}$, 385(k), to be transmitted from left to right, up to down

-1 +1 -1 -1 +j -j -j +1 -1 -1 +j -j -j +1 -1 -1 -j +j +j +1 -1 -1 -j +j +j +j +1 +j -1 +j -1 +j -j -1 +j -1 -j -1 +j +1 +j +1 +j +1
+j +1 +j +1 -j +1 +j -j -j -1 +1 +1 -j +j +j +1 -1 -1 +j -j +j -1 +1 +1 +1 -j +1 +j +1 +j +j +1 -j -1 -j -1 -j +1 -
j +1 -j -1 -j -1 +j -1 +j +1 -j -1 +1 +1 +1 +j -j -j -1 +1 +1 +j -j -j -1 +1 +1 -j +j -1 +1 +1 -j +j +j -1 -j -1 -j -1 -j -1
+j -1 -j -1 -j +j -1 -j +1 +j -j +j +j -1 +1 +1 +j -j -j +1 -1 -1 -j +j +j +1 -1 -1 +1 +1 -1 -j +j +1 +j
+1 -j +j -j -1 -j +j -1 -j +1 +j +1 +j +1 +j -j -j -1 +1 +1 -j +j +j +1 -1 -1 -j +j +j -1 +1 +1 +j -j -j -1 -1 -1 +j
-1 -j -1 -j +1 -j +1 +j +1 +j +1 +j -1 -j +1 -j -1 +1 +j -j +1 -1 +1 +j +j +1 -1 -1 -j +j +j +1 -1 -1
-j +j +j +j +1 +j -1 -j -1 +j +1 -j -1 +j -1 -j -1 +j -1 -j -1 -j -1 -j +j -1 +1 +1 +j -j -j +1 -1 -1 +j -j -j -1 +1 +1
-j +j +j +1 -1 -1 +1 -j +1 -j -1 -j -1 +j -1 +j -1 -j -1 -j -1 -j +1 -j +1 +j +1 +j +1 -1 -1 -j +j +j +1 -1 -1 +j -j -j -1 +1
+1 -j +j +j -1 +1 +1 -j +j +j -j -1 -j +1 -1 +j -1 -j -1 -j -1 +j +1 +j -1 +j -1 +j +1 +j -1 +j -1

The Sequence Seq$^8_{left}$, 385(k), to be transmitted from left to right, up to down

| The Sequence $Seq^1_{right}$, 385(k), to be transmitted from left to right, up to down |
|---|
| +1 -j +1 -1 -1 +1 -j -1 -j -j -j +tj +tj +1 +tj -j -j -j +tj -1 +tj -1 -1 -1 +1 +1 -j +1 -1 -1 +1 -j -1 -j -j -j +tj -j -1 -j +tj -j +1 -j +1<br>+1 +1 -1 -1 +tj -1 +1 +1 -1 +tj +1 +tj +tj +tj -j -j -1 -j +tj +tj -j +1 -j +1 +1 -1 -1 +1 -j +1 -1 -1 +1 -j -1 -j -j -j +tj -j -1 -j +tj<br>-j +1 -j +1 +1 +1 -1 +1 -j +1 -1 -1 +1 -j -1 -j -j -j +tj +tj +1 +tj -j -j -j +tj -1 +tj -1 -1 -1 +1 +1 -j +1 -1 -1 +1 -j -1 -j -j -j +tj -j -1<br>-j +tj +tj -j +1 -j +1 +1 +1 -1 +1 -j +1 -1 -1 +1 -j -1 -j -j -j +tj +tj +1 +tj -j -j -j +tj -1 +tj -1 -1 -1 +1 -1 -j +1 +1 -1 -j +1 +tj +tj<br>+tj -j -j +tj +1 +tj -j -j +tj -1 +tj -1 -1 -1 +1 -j -1 -j +tj -j -1 +tj -1 -1 -1 +1 +1 -j +1 -1 -1 +1 +tj +1 +tj +tj +tj -j -j -1 -j +tj +tj -j -1<br>+tj -1 -1 -1 +1 -1 +tj -1 +1 +1 -1 -j -1 -j -j -j +tj +tj +1 +tj -j -j -j +tj +1 -j +1 +1 -1 -1 +tj -j +1 +1 -1 -j -1 -j -j -j +tj -j +tj<br>+tj -j -1 +tj -1 -1 -1 +1 -1 +tj -1 +1 +1 -1 -j -1 -j -j -j +tj +tj +1 +tj -j -j -j +tj +1 -j +1 +1 -1 -1 -1 +tj -j +1 +1 -1 -j -1 -j -j -j +tj<br>+tj +1 +tj +tj -j -j +tj +1 -j +1 +1 -1 -1 +1 -j +1 -1 -1 +1 +1 +tj +tj +tj -j -j +tj +1 +tj -j -j +tj -1 +tj -j +1 +1 -1 -1 +tj -1 +1 +1 -1 -j<br>-1 -j -j -j +tj -j -1 -j +tj -j -1 +tj -1 -1 -1 +1 -1 +tj -1 +1 +1 -1 -j -1 -j -j -j +tj +tj |

| The Sequence $Seq^2_{right}$, 385(k), to be transmitted from left to right, up to down |
|---|
| -1 +1 +1 +1 -j +1 +tj -j -j -j -1 -j -j +tj +tj -j -j -1 -j +1 -1 -1 +1 -j +1 +1 -1 -1 -1 +tj -1 -j +tj +tj +1 +tj +tj -j -j +tj +1 +tj -j -1 +1<br>+1 -1 +tj -1 +1 -1 -1 -1 +tj -1 -j +tj +tj +1 +tj +tj -j -j +tj +1 +tj -1 +1 +1 -1 +tj -1 +1 -1 -1 -1 +tj -1 -j +tj +tj +1 +tj +tj -j -j -j +tj<br>+1 +tj -1 +1 +1 -1 +tj -1 -1 +1 +1 +1 -j +1 +tj -j -j -j -1 -j -j +tj +tj -j -1 -j +1 -1 -1 +1 -j +1 -1 +1 +1 +1 -j +1 +tj -j -j -j -1 -j<br>-j +tj +tj -j -1 -j +1 -1 -1 +1 -j +1 +1 -1 -1 -1 +tj -1 -j +tj +tj +1 +tj +tj -j -j +tj +1 +tj -1 +1 +1 -1 -1 -1 +1 +1 +1 -j +1 +tj -j<br>-j -j -1 -j -j +tj +tj -j -1 -j +1 -1 -1 +1 -j +1 +tj +tj +1 +tj +1 -1 -1 -1 +tj -1 -1 -1 +1 +tj -1 -j +tj +tj -j -1 +tj -j -j -j -1 -j<br>-1 +1 +1 +1 -j +1 -1 +1 +1 -1 -j -1 +tj -j -j +tj +1 +tj +tj -j -j -j -1 -j -1 +1 +1 -1 +1 +1 -1 -1 +1 -j -1 +tj -j -j -j +tj +1 +tj<br>-j -j -j -1 -j +1 +1 +1 -j +1 -1 +1 +1 -1 -j -1 +tj -j -j +tj +1 +tj +tj -j -j -j -1 -j -1 +1 +1 -1 +1 +1 -1 -1 +1 -j -1 +tj -j -j -j<br>+tj +1 +tj -j -j -j -1 -j -1 +1 +1 -1 +1 -1 -1 +1 -1 -j -1 +tj -j -j +tj +1 +tj +tj -j -j +tj +1 +1 -1 -1 -j -1 +1 -1 -1 +1 -j<br>+1 -j +tj +tj -j -1 -j +tj -j -j -j -1 -j -1 +1 +1 -j +1 -1 +1 +1 -1 +tj -1 +tj -j -j +tj +1 +tj -j |

| The Sequence $Seq^3_{right}$, 385(k), to be transmitted from left to right, up to down |
|---|
| +1 -j +1 +1 -j +1 -j -1 -j -j -1 -j -1 +tj -1 -1 +tj -1 -j -1 -j -j -1 -j +tj -1 -1 +tj -j -1 -j -j -j +1 -j +1 +1 -j +1 -j -1 -j -j -1<br>-j -1 -1 +1 -1 -1 -1 +1 +tj +tj -j +tj +tj -j -1 -1 +1 -1 -1 +1 -j -j +tj -j -j +tj +1 +1 -1 +1 +1 -1 +tj -j -j +tj +tj -j +1 +1 -1 +1 +1 -1<br>-j -j +tj -j -j +tj -1 -j -j -1 -j -1 +tj -1 -1 +tj -1 +1 +1 +tj +1 +tj -1 +tj -1 -1 +tj -1 -j -1 -j -j -1 -j +1 -j +1 +1 -j +1 +tj +1 +tj<br>+1 +1 +tj -j +1 +1 -j +1 +tj -j +tj -j +tj -j +1 -1 -1 +1 +1 -1 +tj -j +1 +tj -j -1 -1 +1 -1 -1 -1 +tj -j -j +tj +tj -j -1 +1 -1 -1 -1<br>+1 +tj -j -j +tj +tj -j +1 +1 -1 +1 +1 -1 -j -1 -j +tj +1 +tj -j -1 +tj -1 -1 +tj +1 +1 -j -1 -1 +tj -1 +1 +tj +1 +tj +tj -j -1 -j -1<br>+tj -1 -1 +tj -j -1 -j +tj +1 -1 +tj -1 -1 +1 -j +tj +tj -j -j -j +tj +1 -1 -1 -1 +1 +tj -j -j -j +tj -1 -1 +1 +1 -1 -1 -j -j +tj<br>+tj +tj -j +1 +1 -1 -1 -1 +1 -j -j +tj +tj -j -1 -1 +1 +1 -1 +1 -j +tj +1 -j +1 -1 +1 -1 -j -1 -j +tj -j -1 -j -1 -1 +1 -j -1 -j +tj +1<br>+tj +1 -j +1 -1 +tj -1 -j +1 +tj -j -1 -j -1 +tj -1 -j +1 +tj +tj -j -1 -j -1 -1 +1 +1 +1 -1 +1 +tj -j -j -j +tj -1 -1 +1 +1 +1 -1 -j<br>-j +tj +tj -j -1 -1 +1 +1 +1 -1 -j -j +tj +tj -j -1 -1 +1 +1 +1 -1 +tj -j -j -j +tj |

| The Sequence $Seq^4_{right}$, 385(k), to be transmitted from left to right, up to down |
|---|
| +1 -j +1 -j -1 -j -1 -1 +1 +tj +tj -j -j -1 -j +1 -j +tj +tj -j -1 -1 +1 -1 -j -1 +tj +1 +tj +1 +1 -1 -j -j +tj +tj -j +1 -j -1 -j -j +tj<br>+1 +1 -1 +tj +1 +tj +1 -j +1 +tj +tj -j +1 -1 +1 -j +1 +tj +1 +1 +1 -1 +tj -j -j -1 -j -1 -j -j +tj -1 -1 +1 -1 +tj -1 -j<br>-1 -j -1 -1 +1 -j -j +tj +tj +1 -j -1 -j -1 -1 +1 +tj -j -j -j +tj -j +1 +tj +tj -j -1 +1 +1 -j +1 -j -1 -j -1 -1 +1 +tj +tj -j<br>-1 -j +1 -j +1 +tj +tj -j -1 -1 +1 -j -1 -j -1 -j +tj -j -j +tj -1 -1 +1 -1 -j -1 -j -1 -1 +1 -j -j +tj -j -j -1 -j -1 -j -j +tj -1 -1<br>+1 -1 +tj -1 -j -1 -1 +1 -j -j +tj -1 -j +1 +tj +tj -j -1 -1 +tj -1 +1 +tj +tj +1 -1 -j -j +tj -j -1 -j +1 +tj -j +tj<br>-j -1 -1 +1 -1 +tj -1 +tj +1 +tj +1 -1 -j -j +tj -1 -j +1 +tj +1 +tj +1 -1 +tj -j -j -1 -j -1 -j -1 -1 +1 -1 +tj +1 -j +tj<br>+1 +tj +1 +1 -1 +tj -j -j -1 -j -1 -j -j +tj -1 -1 +1 -j -1 -j +1 +tj +tj -j -1 +1 -1 -1 -j -1 -j +1 +tj +tj +1 -1 -j -j +tj<br>+tj +1 +tj -1 +tj -1 -j -j +tj +1 -1 -1 -1 +tj -j -1 -j -1 -j -1 -1 -1 +1 -1 +tj -j -1 +tj -1 -j -1 -j -1 -1 +1 -j -j +tj +1 +tj +1 +tj -j<br>+1 +1 -1 +1 -j +1 +tj -j +1 +1 -1 +tj -j -j -1 -j -1 +tj -1 -j -j +tj -1 -1 +1 -j |

FIG. 16

| The Sequence $Seq^5_{right}$, 385(k), to be transmitted from left to right, up to down |
|---|
| +1 -1 -1 +1 -1 -1 -j +j +j -j +j -j +j +j -j -j -1 +1 +1 +1 -1 -1 +1 -1 -1 -1 +1 +1 -j +j +j -j -j -j +j +j -j +j -j +1<br>+1 -1 +1 +1 -1 +1 +1 -1 +1 +1 -j +j +j -j +j +j -j -j -j +j -1 +1 +1 +1 -1 -1 -1 +1 +1 +1 -1 -1 -j +j +j -j -j +j +j -j +j<br>-j -j -1 +1 +1 -1 +1 +1 +j -j -j +j -j -j -1 +1 +1 -1 +1 +1 -1 -1 -1 +1 +1 +j -j -j +j +j -j +j +j -j -j +j -1 -1 -1 +1 +1<br>-1 +1 +1 -1 +1 +1 -j +j +j -j +j -j +j -j +j -j -1 +1 +1 -1 +1 +1 -1 +1 +1 +1 -1 -1 -j -j -j -j +j +j -j -j -j +j +j<br>+1 -1 -1 -1 +1 +1 +1 -1 -1 +1 -1 -1 -j +j +j -j +j +j -1 +j -1 -1 +j -1 +j +1 +j +j +1 +j +j +1 +j -j -1 +j +1 +j -1 +j -1 -1<br>+j -1 +1 +j -1 +j +1 +j -j -1 -j +j +1 +j +j +1 +j +1 -j +1 +1 +j +1 -1 +j -1 -1 +j -1 +j -1 -j -j -1 -j +j +1 +j -j -1 -j -1 +j -1<br>+1 -j +1 -1 +j -1 +1 -j +1 -j -1 -j +j +1 +j +j +1 +j +j +1 +j -1 +j -1 -1 +j -1 -j -1 -j -j -1 -j +1 -j +1 +j -j +1 -1 +j -1 +j -1 +j<br>+1 -j -1 -j +j +1 +j +j +1 +j -j -1 -j -1 +1 -j +1 +j +1 +j -1 +j +1 +j +1 +j +j +1 +j -j -1 -j -j -1 -j -1 +j -1 -1 +j -1 -1<br>+j -1 +1 -j +1 +j +1 +j -j -1 -j +j +1 +j -j -1 -j +1 -j +1 -1 +j -1 +1 -j +1 +1 -j +1 -j -1 -j -j -1 -j -j |

| The Sequence $Seq^6_{right}$, 385(k), to be transmitted from left to right, up to down |
|---|
| +1 -j +1 -j -1 -j +j +1 -j -1 -j -j -1 -j -1 +j -1 -j -1 -1 +j -1 +1 -j +1 +j +1 +j -j +1 +j +1 +j +j +1 +j -1 -j -1 +j +1<br>+j -1 +j -1 +j +1 +j +1 -j +1 -j -1 -j -1 +j -1 +1 -j +1 -j +1 +j +j +1 +j -1 +j -1 -j -j +1 +j +1 -1 +j -1 -j<br>-1 -j +1 -j +1 +j +1 +j +j -j -j +1 -1 -1 +j -j -j +1 -1 -1 +1 -1 -1 -j +j +j +1 -1 -1 -j +j +j -j -j -1 +1 +1 +j -j -j -1 +1 +1<br>-1 +1 +1 -j +j -1 +1 +1 -j +j +j +1 -1 -1 -j +j +j -1 +1 +1 +j -j -j +j -j -1 +1 +1 +j -j -j +1 -1 -1 +1 -1 -1 -j -j -j -1 +1<br>+1 -j +j +j -j -j -1 +1 +1 -j +j +j +1 -1 -1 -1 +j -j -1 -j +1 -j +1 +j +1 +j -1 +j -1 -j -1 -j -1 +j -1 -j +1 +j -1 -1 +j<br>+1 +j +1 -j +1 -j -1 -j -1 -j -1 +j -1 +1 +j -1 +j +1 +j -1 -j +1 -j +1 -j -1 +j +1 -1 +j -1 -j -1 -j -1 -j -j<br>-1 -j -1 +j -1 -j -1 -j -1 +j -1 +1 -j +1 -j -1 -j +j -j -1 -j -j -j +j +1 -1 -1 +j -j -j -1 +1 +1 -1 +1 +1 -j +j +j +1 -1 -1 +j<br>-j -j -j +j +j -1 +1 +1 +j -j -j +1 -1 -1 +1 -1 -1 -j +j +j -1 +1 +1 +j -j -j -1 +1 +1 -j +j +j -j -j -1 +1 +1<br>+j -j -j -1 +1 +1 -1 +1 +1 +j -j -j -1 +1 +1 +j -j +j -1 +1 +1 -j +j +j -1 +1 +1 -j |

| The Sequence $Seq^7_{right}$, 385(k), to be transmitted from left to right, up to down |
|---|
| -1 +1 +1 -j +j +j -1 +1 +1 -j +j +j -1 +1 +1 +j -j -j -1 +1 +1 +j -j -j -1 -j +1 -j +1 +j -1 +j +1 +j -1 -j -1 +j -1 -j -1 -j<br>-1 +j -1 -j +j +1 -1 -1 +j -j -j -1 +1 +1 -j +j +j -1 +1 +1 +j -j -j +1 -1 -1 -j -1 -j -1 -j +1 +j +1 +j -1 +j -1 +j +1<br>+j +1 -j +1 -j -1 -1 +1 +1 +j -j -j -1 +1 +1 +j -j -j -1 +1 +1 +j +j -1 +1 +1 -j +j +j -1 -j -1 -j -1 -j -j -1 -j -1 -j -1<br>-j +1 -j +1 -j -1 -j +1 +j +1 -j +j -1 +1 +1 +j -j -j +1 -1 -1 +j +j +j -1 -1 +j +j -j +1 -1 +1 -j +1 +j +1 +j -1<br>-1 -j -1 +j -1 -j +1 +j +1 +j +j -1 +1 -1 +j +j -j +1 -1 +1 +j +j +j -1 -1 +j +j -1 +1 +1 +j +j +1 +j +1 +j<br>-1 +j -1 -j -1 -j +1 +j +1 -j +1 -j +1 -1 +j -j +j +1 -1 +1 +j +j +j -1 +1 +1 +j -j -j -1 -j<br>+1 -j +1 -j -1 -j +1 +j +1 +j -j +1 +j -j +j +j +1 -j +j +j -1 +1 +1 +j -j +j -1 -1 +j -j -j -1 +1 +1 -j +j +j +1<br>-1 -1 +1 -j +1 -j -1 -j -1 +j -1 +j +1 +j -1 +j -1 -j -1 -j +1 -j +1 +j +1 +j +1 -1 -1 -j +j +j +1 -1 -1 -j +j +j -1 +1 +1 -j +j +j<br>-1 +1 +1 -j +j +j -j -j -1 -j -1 +j -1 -j -1 +j +1 +j -1 +j -1 +j +1 +j -1 +j -1 +1 |

| The Sequence $Seq^8_{right}$, 385(k), to be transmitted from left to right, up to down |
|---|
| -1 +j -1 +j +1 +j -1 +j -1 -j -1 -j +1 -1 -1 -j +j +j +1 -1 -1 +j -j -j +1 -j +1 +j +1 +j +1 +j -1 -j -1 +1 +1 -j +j -1 +1<br>+1 +j -j -j -1 +j -1 +j +1 +j -1 +j -1 -j -1 -1 -j +j +j +1 -1 -1 +j -j -j +1 -j +1 +j +1 +j +1 +j -1 -j -1 +1 +1 -j<br>+j +j -1 +1 +1 +j -j -j +1 -j +1 -j -1 -j -1 -j -1 +j +1 -1 -1 -j +j +j -1 +1 +j +j -1 +j -1 -j -1 +j +1 +j -1 -j -1<br>+1 +1 -j +j +j +1 -1 -1 -j +j +j +j +1 -j +1 -j -1 +j -1 -j -1 -j +1 -1 -1 -j +j +j -1 +1 +1 +j +j -1 -j -1 -j -1 +j +j +1 -j<br>-1 -j -1 +1 +1 -j +j +j +1 -1 -1 -j +j +j +j +1 -j +1 +j +1 +j -1 -j -1 -j +j -j +1 -1 +1 -j +j +j +1 -1 -1 +j +j +1 -1 +j<br>-1 +j +1 +j +1 -j +j +j +1 -1 -1 -j +j +j -1 +1 +1 +j -1 -j -1 -j -1 +j +1 +j +j -j +1 -1 -1 -j -j -1 +1 +1 -j<br>-1 -j +1 +j +1 -j -1 -j -1 +j -j -j +1 -1 +1 -j -j -j +1 -1 -1 -j -1 -j -1 +j +1 +j +1 +j -1 -j -j +j +j -1 +1 +1 +j -j -j -1<br>+1 +1 -j -1 +j +1 +j +1 +j +1 -j +j +j +1 -1 -1 +j -j -j +1 -1 -1 +1 +j +1 +j +1 -j -1 +j +1 +j -j -j +1 -1 -1<br>-j +j +j +1 -1 -1 +j +j +j -1 +j -1 -j -1 -j +j -j -j -1 +1 +1 -j +j +j -1 +1 +1 +1 |

FIG. 17

| The Sequence $Seq^1_{left}$, 595(k), to be transmitted from left to right, up to down |
|---|
| +j +1 -1 +j +1 +j -j -1 -1 +j +j -1 -1 +1 +1 +j -j -1 +1 -j +1 -1 -1 +1 -j -1 -j -j +j +j +1 +j -j +j -1 +j -1 -1 +1 +1<br>-j +1 -1 -1 +1 -j -1 -j -j -j +j -j -1 -j +j +j -j +1 -j +1 +1 +1 -1 -1 +j -1 +1 +1 -1 +j +1 +j +j +j -j -1 -j +j +j -1 +j +1 +1<br>+1 -1 +1 -j +1 -1 -1 +1 -j -1 -j -j -j +j -j -1 -j +j +j -j +1 -j +1 +1 +1 -1 -j -1 +j +j -j -1 +j -1 -1 +1 +1 -j +1 -1 -1 +1<br>+j +1 +j +j +j -j -j -1 -j +j +j -j -1 +j -1 -1 -1 +1 -1 +j -1 +1 +1 -1 -j -1 -j -j -j +j -j -1 -j +j +j -j -1 +j -1 -1 +1 +1 -j +1<br>-1 -1 +1 +j +1 +j +j +j -j +j +1 +j -j -j +j +j +1 -j +1 +1 +1 -1 +j +1 -1 -1 +1 +j +1 +j +j +j -j +1 -j +1 -1 -1 +1 -j -1 -j -j<br>-j +j +j +1 +j -j -j -j -1 +j -1 -1 -1 +1 +1 -j +1 -1 -1 +1 -j -1 -j -j -j +j -j -1 -j +j +j -j +1 -j +1 +1 +1 -1 -1 +j -1 +1 +1 -1<br>+j +1 +j +j +j -j -j -1 -j +j +j -j +1 -j +1 +1 +1 -1 -1 +j +1 -1 -1 +1 -j -1 -j -j -j +j -j -1 -j +j +j -j +1 -j +1 +1 +1 -1 -j -1 -j<br>+j +j -j -1 +j -1 -1 -1 +1 +1 -j +1 -1 -1 +1 +j +1 +j +j +j -j -j -1 -j +j +j -j -1 +j -1 -1 -1 +1 -1 +j -1 +1 +1 -1 -j -1 -j -j -j +j<br>-j -1 -j +j +j -j -1 +j -1 -1 -1 +1 +1 -j +1 -1 -1 +1 +j +1 +j +j +j -j +j +1 +j -j -j +j +j +1 -j +1 +1 +1 -1 +1 -j +1 -1 -1 +1 +j<br>+1 +j +j +j -j -1 +j -1 +1 +1 -1 -j +1 +j +j +j -j -j -1 -j +j +j -j +1 -j +1 +1 +1 -1 -1 +j -1 +1 +1 -1 +j +1 +j +j +j -j +j +1<br>+j -j -j +j -1 +j -1 -1 -1 +1 +1 -j +1 -1 -1 +1 -j -1 -j -j -j +j +j +1 +j -j -j +j -1 +j -1 -1 +1 -1 -j -1 +1 +1 -1 +j +1 +j +j<br>+j -j +j +1 +j -j -j +j -1 +j -1 -1 +1 +j +1 +j -j -j +j +1 -j +1 +1 +1 -1 -1 +j -1 +1 +1 -1 -j -1 -j -j -j +j +j +1 +j -j -j +j<br>+1 -j +1 +1 +1 -1 -1 +j +1 -1 -1 +1 +j +1 +j +j +j -j +1 +j -j -j +j +1 -j +1 +1 +1 -1 -1 +j -1 +1 +1 -1 -j -1 -j -j -j +j -j<br>-1 -j +j +j -j -1 +j -1 -1 -1 +1 -1 +j -1 +1 +1 -1 -j -1 -j -j -j +j |

| The Sequence $Seq^2_{left}$, 595(k), to be transmitted from left to right, up to down |
|---|
| -1 +1 -j +1 -j -1 +j +j +j -1 -1 +1 -1 -1 +j +1 +j -j -1 +1 -j +1 -1 +j -1 +1 -j +1 -j +1 +1 +j -1 -j -1 -1 +j -1 -1 +j<br>-1 -j -1 -j +j +1 +j -j -1 -j -j -1 -j +j +1 +j -j -1 -j -j -1 -j -1 -j -1 +j -1 +1 -j +1 -1 +j -1 -1 +j -1 -1 +j -1 +j +1 +1 -j<br>+1 +1 -j +1 -j -1 -j +j +1 +j -j -1 -j -j -1 -j +j +1 +j -j -1 -j -j -1 -j -j -1 -j +j +j +j +j -j +j +j -j +j +j -j -j -j -j -j<br>+j -j -j +j +1 +1 -1 -1 -1 +1 +1 +1 -1 +1 +1 -1 -1 -1 +1 +1 +1 -1 +1 +1 -1 +1 +1 -1 +1 +1 -1 +j +j -j -j +j +j -j +j +j -j +j -j<br>-j -j +j -j -j +j +j -j -1 +1 +1 +1 -1 -1 -1 +1 -1 -1 +1 +1 -1 -1 -1 +1 -1 -1 +1 -1 -1 -1 +1 +1 +j -1 -j +1 -j -1 +1 -j +1 +1<br>-j +1 +1 -j +1 -1 +j -1 -1 +j -1 -1 +j -1 -j -1 -j -j +j +1 +j -j -1 -j -j -1 -j +j +1 +j -j -1 -j -j -1 -j -j -1 -j +1 -1 +j +1 -1 +j<br>-1 -1 +j -1 +j -1 +j -1 +j +1 -j +1 +j +1 +j -j -1 -j +j +j -j -1 -j -j -1 -j +j +j -j -1 -j -j -1 -j -j -1 -j +j +j -j -j -j -j<br>+j +j +j -j +j +j -j -j -1 +j -j -j -1 -j +j -1 +j +1 -1 -1 -1 +1 +1 -1 +1 +1 -1 -1 -1 +1 +1 -1 -1 +1 +1 -1 +1 +1 -1 +1 +1 -1 +j<br>+j -j -j -j +j +j -j +j +j -j -j -1 -j +j -j -j -1 -j +1 -1 +1 +1 -1 -1 -1 +1 -1 -1 +1 +1 -1 -1 +1 +1 -1 -1 -1 +1 -1 -1 +1 -1<br>-1 +1 -1 -j -1 +1 -j -1 -j -1 -j -1 -1 -j -1 +1 -j +1 +j -1 +j +1 -1 +j +1 -j +j +1 +j +j -j -1 -j +j -j +j +1 +j -j -1 -j +j +1<br>+j +j +1 -j +j -1 +j +1 -j -1 +j -1 +1 -j -1 +j -1 -j -1 -j -1 -j -1 +j +1 +j -j -1 -j +j +1 +j +j +1 +j<br>-j -1 -j +j +1 +j +j +1 +j +j +1 -j -j -j +j -j -j -j +j -j +j +j +j +j +j +j -j +j +j -1 -1 +1 +1 +1 -1 -1 -1 +1 -1<br>-1 +1 +1 +1 -1 -1 -1 +1 -1 -1 +1 -1 -1 +1 -j -j +j +j -j -j -j +j -j -j +j +j -j -j +j -j +j +j -j -j +j -1 +1 -1 -1 -1 +1 +1<br>+1 -1 +1 +1 -1 -1 -1 +1 +1 +1 -1 +1 +1 -1 +1 +1 -1 |

| The Sequence $Seq^3_{left}$, 595(k), to be transmitted from left to right, up to down |
|---|
| -j -j -j -j -j +j -j +1 -j -j -j +j -j +j +1 -1 +j -1 +1 -1 -j +1 +j +1 +j +1 -j +1 -j -1 -j -j -1 -j -1 -j -1 +j -j +1 -1 +j -1<br>-j -1 -j -1 +j -1 +j +1 +j -j -1 -j -1 +j -1 -j -1 -j +1 -j +1 -1 -1 +1 -j -j +j -1 -1 +1 +j -j +j -j +j +1 -1 -1 +j +j -j -1 -1 +1<br>-1 -1 +1 -j -j +j -1 -1 +1 +1 +j -j -j -j +j -1 -1 +1 -j -j +j +1 -1 +j +1 +j -1 +j -1 -1 -j -1 +j -1 +j +1 +j -1 -j -1 +j -1<br>-j -1 -j -j -1 -j +1 -j +1 +j +j +1 -j +1 +j +1 +j -1 -j -1 +j -1 -j -1 -j -j +j +1 -1 -1 +j +j +j +1 -1 -1 -1 +1 +j +j -j<br>+1 +1 -1 +j +j -j -j -j +j +1 -1 -j +j -j +1 -1 +j +1 -1 -1 +j -j -j +j -1 -1 +j -j +j +j +1 -j -1 -j +j +1 +j +1 +j +1 +1<br>-j +1 -j -1 -j +1 +j +j +1 +j -j -1 -j +1 +j -j -1 -j +1 -1 +1 -j +1 +j +j +1 +j -j -j +j +1 -1 -j -j +j -1<br>-1 +1 -1 -1 +1 +j +j -j -1 -1 +1 -j -j +j -j +j +j +1 -1 -j -j +j -1 -1 +1 +1 -1 -j -j +j +1 +1 -1 +j +j -j -1 +j -1 -j -1 +j +1<br>-j +1 -j -1 -j +j +j +1 -j +1 -1 -j +1 -j +1 +1 +j +1 +j -j +j -1 +j +1 +j +j +1 +j +1 -j -1 -j +j +1 +1 +1<br>-1 +j +j -j -1 -1 +1 +j +j -j -j -j +j -1 -1 +1 +j +j -j -1 -1 +1 +1 +1 -1 +j +j -j -1 -1 +j +j +j +j +1 +1 -1 -j -j +j +1<br>+1 -1 +1 -j +1 +j +1 +j -1 +j -1 -j -j -1 -j -1 +j -j -1 -j +1 -j -1 -j -1 -j -1 +j -1 +j +1 +j +j -1 -j -1 -j<br>-1 -j +1 -j +1 -1 -1 +1 -j -j +j -1 -1 +1 +j +j -j +j +j -j +1 -1 +j -j -1 -1 +1 -1 -1 +1 -j -j +j -1 -1 +1 +j +j -j -j -j +j -1<br>-1 +1 -j -j -j +j +1 +1 -1 +j +j -1 -j +1 -j -1 -j -1 -j -j -1 -j +1 -j -1 -j -1 -j -1 -j -j -1 -j +1 -1 +j +j +1 +j +1<br>-j +1 -1 -j -j +j -1 -j -1 -j -j -j -j +j +1 -1 +j +j +j +1 -1 -1 -1 +1 +j +j -j +j +1 -1 +j +j -j -j +j +1 -1 +j +j -j<br>+1 +1 -1 +1 +1 -1 -j -j +j -1 -1 +1 -j -j +j |

FIG. 18

The Sequence $Seq^4_{left}$, 595(k), to be transmitted from left to right, up to down +1+1+1-1-j-1+1-1-j-1-j-j-1-j+j+1+j-1+1+1-j+1+j+1+j+j+1+j+1-j+1+1+1-1+j-j-j+j-j+1+1-1
+j+1+j+1-j+1-1+j-1-j-1-j-j-j+j-1-1+1+1-1+j+j-1+j-1-j-1-j-j-1-j-1+j-1-1-1+1-j-j+j-j+j-1
-1+1-j-1-j-1+j-1+1-j+1+j+1+j+1+j+j+1+1-1-1-1+1-j-j+j+1-j+1+j+1+j-j-1-j-1+j-1+1+1-1+j
+j-j-j-j+j-1-1+1+j+1+j+1-j+1+1+1-j+1+j+1+j-j+j-1-1+1-1-1+1-j-j+j+1-j+1+j+1+j-j-1-j-1+j-1
+1+1-1+j+j-j-j+j-1-1+1+j+1+j+1-j+1+1-j+1+j+1+j-j+1+j-j-j+j-1-1+1-1-1+1-j-j+j+1+j-1+j-1-1
+j-1+j+1+j+j+j-j-1-1+1-1-1+1+j+j-1-j-1+j+1+j-j-1-j+1+j+1+1+1-1-j-j+j+j+j-1-1+1-j-1-j
+1-j+1+1-j+1-j-1-j-j-j+j+1+1-1+1+1-1-j-j+j+1-j+1-j-1-j+j+1+j-1+j-1-1-1+1+j+j-j-j-j+j+1+1
-1+j+1+j-1+j-1+1-j+1-j-1-j+j+j-j-1-1+1+1+1-1-j-j+j-1+j-1+j+1+j+j+1+j-1+j-1+1+1-1-j-j+j-j
-j+j+1+1-1+j+1+j-1+j-1+1-j+1-j-1-j+j+j-j-1-1+1+1+1-1-j-j+j-1+j-1+j+1+j+j+1+j-1+j-1+1+1
-1-j-j+j-j+j+1+1-1+1-j+1+j+1+j+j+1+j+1-j+1+1+1-1+j-j-j+j-j+1+1-1+j+1+j+1-j+1-1+j-1
-j-1-j-j-j+j-1-1+1+1+1-1+j+j-1-j-1-j-j-1-j-1+j-1-1-1+1-j-j+j-j+j-1-1+1-j-1-j-1+j-1+1
-j+1+j+1+j+j+j+j+1-1-1-1+1-j-j+j+1-j+1+j+1+j-j-1-j-1+j-1+1+1-1+j+j-j-j+j-1-1+1+j+1
+j+1-j+1+1-j+1+j+1+j-j-j+j-1-1+1-1-1+1-j-j+j+1-j+1+j+1+j-j-1-j-1+j-1+1+1-1+j+j-j-j-j+j-1
-1+1+j+1+j+1-j+1+1+1-j+1+j+1+j-j-j+j-1-1+1-1-1+1-j-j+j The Sequence $Seq^5_{left}$, 595(k), to be transmitted from left to right, up to down +1-j+1-1+1-j-j-1-j+j-1+j+1+1+j-1+j+1+1-1+1-1-1+1-1-1-1+1+1+j-j-j+j-j-j+j-j-j+j-j+j-j
-1-j-j-1-j+j+1+j-j-1-j+1+j+1-j+1-1+j-1+1-j+1-j+j+1+j-j+j+j-j+j+j-j-1+1+1-1+1+1-1+1+1
+1-1-1-1-1+j-1-1+j-1+j+1-1+j-1+j+1+j+j+1+j-j-1-j+j+1+j-1+1+1-1-1-1+1+1-1+1+1-j+j
+j-j-j-j+j+j-j+j+j+1+j-j-1-j-j-1-j-1-j-1+j-1+1-j+1+1+j+1+j+1+j+j+j+j-j-j-j-j+j-j-j+j-1
+1+1+1-1-1-1+1+1-1+1+1-1+j-1+1-j+j+1+j-1+j+1-j+1+j+j-1-j-j-1-j-j-1-j+j-j-j+j-j-j+j
-j+j+j-1+1+1-1+1+1-1+1+1-1-1+1+j+1+j+j+1+j-1-j-1+j+1+j+j+1+j-j-1-j+j+1+j+1-1-1
+1-1-1+1-1-1-1+1+1-j+j-j+j-j+j+j+j-j-j-1-j-j-1-j+j-1-j-1-j+1-1-j-1-j+1-1-j+1-
-j+j+j-j-j-j+j+j-j+j+j+1-1-1-1+1+1+1-1-1+1-1-1-j-1+j-1-j+1-j+1+j-1-j-j+j+1+j
+1+j+j+1+j+1-1-1-1+1+1+1-1-1+1-1-j+j+j+j-j-j-j+j-j-j-j-1-j+j+1-j+j+1+j+j+1+j-1+j-
1+1-j+1+1-j+1+1-j+1+1-1-1+1-1-1+1-1-1-1+1+1+j-j-j+j-j+j-j-j-j-j-j+j-1-j-j-1+j+1+j-j-1
-j+1-j+1+1-j+1-1+j-1+j+1+j+j+j+j+j+j+j+j+j+j-j-1+1+1-1+1+1-1+1+1-1-1-1+j-1-1+j-1
+1-j+1-1+j-1+j+1+j+j+1+j-j-1-j+j+1+j-1+1+1-1-1+1+1-1+1+1+j-j+j-j-j-j+j+j-j+j+j
+1+j-j-1-j-j-1-j-j-1-j-1+j-1+1-j+1-j+1+j+1+j+1-j+j+j-j-j+j+j-j+j+j-1+1+1-1-1-1+1+1-
1+1+1-1+j-1+j-1+1+1-j+1+1-j+1+j+j+j+1+j-1-j-1-j-1-j The Sequence $Seq^6_{left}$, 595(k), to be transmitted from left to right, up to down +1-j+1+1-j+j+1-1-j+j-j-1+j+j+1-1+1+1-1+1-1-1-j+j+j-1+j-1+j+1+j+j+j-1+1+1+j+1+j+1-j
+1+1-1-1-j+j+j-1+j-1+j+1+j+j-j-j+1-1-1-j-1-j+1-j+j-j-1+1+1-j-1+j+1-j+1-1+1+1-j+j+j+1
-j+1+j+1+j-j-j-1+1+1-j-1+j-j+1+1-1-1+j-j-j-1+j-1-j-1-1+1+j+j+j-1+j-1-j-1-j+j-j-j-1
+1+1+j+1+j-1+j-1-1+1+1-j+j-j-1+j-1-j-1-j-j+j+1-1-1-j-1-j+1+j-1+j-j+1+1+j-1-j-1-j-1
+1-1-1-j+j+j+1+j-1-j-1-j-j+j-1+1+1-1-j-1+j-1-1+1+1+j-j-j-1+j-1+j+1+j+j-j-j+1-1-1-j-1-j
-1+j-1+1-1-1+j+j-j-1+j-1+j+1+j+j-j-j-1-1-j-1-j-1+j-1-1+1+1+j-j-j+j+1-j-1-j-1+1+1-j+j
+j+1-j+1+j+1-j-j+j+j+1-1-1+j+1+j-1+j-1-1+1+j-j+j-1+j+1+j-j+j+j-1-1+1-j-1-j+1-j+1+j+1
-j+j+j+1-1-j-1-j+1-j+1-1+1+1-j+j+j-1-j-1-j-1-j-j+j+1-1-1-j-1-j+1+j+1+1-1-1+j-j-j-1+j+1
+j+1+j+1-1-1-j+j+j+1-j-1-j-j-j+1-1-1+j+j+j+1-j+1-1-1-j-j+j+1+j-1-j-1-j-1+j-j-j-j+1
+1-j-1-j-1+j+1-1-1-j+j+j-1+j-1+j+1+j+j+j-1+1+1+j+1+1-j+1-1-1-j+j+j-1+j-1+j+1+j
+j-j-j-1-1-j-1-j-1+j-j-j-1+1+1-j-1+j+1+j-1+1+1+j+1+j+1+1-1-1-j+j+j-1+j-1+j+1+j
+1-j+1-1-1+j+j+j-1+j-1-j-1-j-j-j+1-1-1+j+1+1+j+1-j-1-1-1+1+1+j+j+j-1+j-1-j+1+j+j
+j-1+j-1-j-1-j+j+j+1-1-1-j-1-j-1+j+j+j-1+1+1-j-1+j-1-1-1+1+1-j+j+j+1+j-1-j-1-j-j+j
+j-1+1+1-j-1-j-1+j-1-1+1+1+j-j-j-1+j-1+j+1+j

FIG. 19

| The Sequence $Seq^7_{left}$, 595(k), to be transmitted from left to right, up to down |
|---|
| +j -j +j -1 -1 +1 +j +1 -1 -j +j -j -j -j -j -1 +1 +1 +1 +1 -1 -1 -1 +1 +1 -j +j +j +j -j -j +j -j -j +j -j -j +1 -1 -1 +1 -1 -1 -j +j<br>+j +j -j -j +1 -1 -1 -1 +1 +1 +1 -1 -1 +1 -1 -1 +j -j -j +j -j -j +j -j -j -j +j +j -1 +1 +1 +1 -1 -1 +1 -1 -1 +1 -1 -1 +j -j -j +j -<br>j -j +1 -1 -1 -1 +1 +1 -j +j +j +j -j -j -j +j +j -j +j +j -1 +1 +1 -1 +1 +1 +1 -j +1 +1 -j +1 -j -1 -j -j -1 -j +j +1 +j -j -1 -j +1<br>-j +1 -1 +j -1 -j -1 -j -j -1 -j +1 -j +1 +1 -j +1 +1 -j +1 -1 +j -1 +j +1 +j -j -1 -j +j +1 +j +j +1 +j -1 +j -1 -1 +j -1 +1 -j +1<br>-1 +j -1 +j +1 +j -j -1 -j +1 -j +1 +1 -j +1 -j -1 -j -j -1 -j -j -1 -j +j +1 +j -1 +j -1 +1 -j +1 +1 -1 -1 -1 +1 +1 -j +j +j +j -j -j<br>+j -j -j +j -j +j +1 -1 -1 +1 -1 -1 -j +j +j +j -j -j +j +1 -1 -1 -1 +1 +1 -1 -1 +1 -1 -1 +j -j -j +j -j -j +j -j -j +j +j -1 +1 +1<br>+1 -1 -1 +1 -1 -1 +1 -1 -1 +j -j -j +j -j -j +1 -1 -1 -1 +1 +1 -j +j +j +j -j -j -j +j +j -j +j +j -1 +1 +1 -1 +1 +1 +1 -j +1 +1 -j<br>+1 -j -1 -j -j -1 -j +j +1 +j -j -1 -j +1 -j +1 -1 +j -1 -j -1 -j -j -1 -j +1 -j +1 +1 -j +1 +1 -j +1 -1 +j -1 +j +1 +j -j -1 -j +j +1<br>+j +j +1 +j -1 +j -1 -1 +j -1 +1 -j +1 +j +1 -1 +j -1 +j +1 +j -j -1 -j +1 -j +1 +1 +j -1 -j -j -1 -j -j -1 -j +j +1 +j -1 +j -1 +1<br>-j +1 -1 +1 +1 +1 -1 -1 +j -j -j -j +j +j -j +j +j -j +j +j -1 +1 +1 -1 +1 +1 +j -j -j -j +j +j -1 +1 +1 +1 -1 -1 -1 +1 +1 -1<br>+1 +1 -j +j +j -j +j +j -j +j +j +j -j -j +j -1 -1 -1 +1 +1 -1 +1 +1 -1 +1 +1 -j +j +j -j +j -j -1 +1 +1 +1 -1 -1 +j -j -j -j +j<br>+j +j -j -j +j -j -j +1 -1 -1 +1 -1 -1 -1 +j -1 -1 +j -1 +j +1 +j +j +j +1 +j -j -1 -j +j +1 -j -1 +j -1 +1 -j +1 +j +1 +j +j +1 +j -1<br>+j -1 -1 -j +j -1 -1 +j -1 +1 -j +1 -j -1 -j +j +1 +j -j -1 -j -j -1 -j +1 -j +1 +1 +j +1 -1 +j -1 +1 -j +1 -j -1 -j +j +1 +j -1 +j -1<br>-1 +j -1 +j +1 +j +j +1 +j +j +1 +j -j -1 -j +1 -j +1 -1 +j -1 |

| The Sequence $Seq^8_{left}$, 595(k), to be transmitted from left to right, up to down |
|---|
| -1 +j +j +1 +1 -1 -j +j -j -1 -j +j -1 +j -j +j -1 +j +1 +1 -1 -1 -1 +1 +1 +j -j -j -j +j +j -1 +j -1 -1 +j -1 -j -1 -j -j -1 -j +j<br>+j +j -j -j -1 +1 +1 +1 -1 -1 +j +1 +j +j +1 +j +1 -j +1 +1 -j +1 -j +j +j -j +j -1 +1 +1 -1 +1 +1 +j +1 +j -j -1 -j +1 -j<br>+1 -1 +j -1 -1 +1 +1 -1 +1 +1 -j +j +j -j +j +j +1 -j +1 -1 -j -1 +j +1 +j -j -1 -j +1 -1 -1 +1 +1 +j -j -j +j +j -1 +j -1 -<br>1 +j -1 -j -1 -j -j -1 -j +j -j -j -j +j +j +1 -1 -1 -1 +1 +1 -j -1 -j -j -1 -j +1 -1 -1 +j -1 -j +j +j +j +j +j -1 +1 +1 -1 +1 +1<br>+j +1 +j -j -1 -j +1 -j +1 -1 +j -1 +1 -1 -1 +1 -1 -1 +j -j -j -j -j -1 +j -1 +1 -j +1 -j -1 -j +j +1 -1 -1 -1 +1 +1 +j -j<br>-j -j +j -j -1 +j -1 -1 +j -1 -j -1 -j -j -1 -j +j +j -j -j -1 +1 +1 -1 -1 +j +1 +j +j +1 +j -1 -j +1 +1 -j +1 -j +j +j -j +j<br>+j -1 +1 +1 -1 +1 +1 +j +1 +j -j -1 -j +1 +j +1 -1 +j -1 +1 +1 -1 +1 +1 +j +j -j +j +j +1 -j +1 -1 +j -1 +j +1 +j -j -1 -j<br>+1 -1 -1 -1 +1 +1 +j -j -j -j +j +j -1 +j -1 -1 +j -1 -j -1 -j -j -1 -j +j +j +j -j -j +1 -1 -1 +1 +1 -j -1 -j -j -1 -j +1 -1 -1<br>+j -1 -j +j +j +j +j -1 +1 +1 -1 +1 +1 +j +1 +j -j -1 -j +1 -j +1 -1 +j -1 +1 -1 -1 +1 -1 -1 +j -j -j -j +j +j -1 +j -1 +1 -j +1<br>-j -1 -j +j +1 -1 +1 +1 -1 -1 -j +j +j -j -j +1 -j +1 +1 +j +1 +j +j +1 +j +j -j -j +j +j +1 -1 -1 -1 +1 +1 -j -<br>1 -j -j -1 -j +1 -1 -1 +j -1 -j +j +j +j +j +1 -1 -1 +1 -1 -1 -j -1 +j +1 +j -1 +j -1 +j +1 -1 -1 +1 -1 -1 +j -j -j +j -<br>j -j -1 +j -1 +1 -j +1 -j -1 -j +j +1 +j -1 +1 +1 +1 -1 -1 -j +j +j -j -j +j -1 +1 +1 -j +1 +j +1 +j +j +j +1 +j -j -j +j -<br>1 +1 +1 +1 -1 -1 +j +1 +j +j +1 +j +1 -j +1 +1 -j +j -j -j +j -j -j +1 -1 -1 +1 -1 -1 -j -1 -j +j +1 +j -1 +j -1 +1 -j +1 -1<br>+1 +1 -1 +1 +1 -j +j +j -j +j +j +1 -j +1 -1 +j -1 +j +1 +j -j -1 -j |

FIG. 20

The Sequence Seq$^1_{right}$, 595(k), to be transmitted from left to right, up to down -j -1 -j +j -j -j -1 +j -1 -1 -1 +1 -1 +1 -j +1 -1 -1 +1 +j +1 +j +j +j -j -j -1 -j +j +j -j -1 +j -1 -1 -1 +1 -1 +j -1 +1 +1 -1 -j -1 -j
-j -j +j +j +1 +j -j -j +j +1 -j +1 +1 +1 -1 -1 -1 +j -1 +1 +1 -1 -j -1 -j -j -j +j -j -1 -j +j +j -j -1 +j -1 -1 -1 +1 -1 +j -1 +1 +1 -1
-j -1 -j -j -j +j -j +1 -1 -1 +1 -j -1 -j -j -j +j +j +1 +j -j -j +j -1 +j -1 -1 -1 +1 +j -1 -1 -1 +1 -j -1 -j -j -j +j -j -1 -j +j
+j -j +1 -j +1 +1 -1 -1 +j -j +1 -1 -1 +1 -j -1 -j -j -j +j +j +1 +j -j -j +j -1 +j -1 -1 -1 +1 -1 +j -1 +1 +1 -1 +j +1 +j +j +j -j
+j +1 +j -j -j +j -1 +j -1 -1 -1 +1 -1 +j -1 -1 -1 +1 -j -1 -j -j -j +j +j +1 +j -j -j +j -1 +j -1 -1 -1 +1 +j -1 -1 -1 +1 -j -1 -j
-j -j +j -1 -j +j +j -j +1 -j +1 +1 +1 -1 -1 +j -1 +1 +1 -1 +j +1 +j +j -j -j -1 -j +j +j -j +1 -j +1 +1 +1 -1 +1 -j +1 -1 -1
+1 -j -1 -j -j -j +j -j -1 -j +j +j -j +1 -j +1 +1 +1 -1 +j +1 +j -j -j +j -j +1 +1 +1 -1 -1 +j -1 +1 +1 -1 -j -1 -j -j -j +j +j +1
+j -j -j +j +j -j +1 +1 -1 -1 +j -1 +1 -1 -1 +1 +j +1 +j +j -j +j +1 +j -j -j +j -j +1 +1 -1 -1 +j -1 +1 +1 -1 -j -1 -j
-j -j +j -1 -j +j +j -j -1 +j -1 -1 -1 +1 -1 +j -1 +1 +1 -1 -j -1 -j -j -j +j -j -1 -j +j +j -j -1 -1 -1 +1 +j -1 -1 -1 +1
+j +1 +j +j +j -j -1 -j +j +j -j -1 +j -1 -1 -1 +1 -1 +j -1 +1 +1 -1 -j -1 -j -j -j +j +j +1 +j -j +1 +1 -1 -1 +j -1
+1 +1 -1 -j -1 -j -j -j +j -j -1 -j +j +j -j -1 -1 -1 +1 -1 +j -1 +1 +1 -1 -j -1 -j -j -j +j +1 -j -1 -1 +1 -j -1 -j -j +j
+1 +j -j +j +j -j -1 +j -1 -1 -1 +1 +j +1 -1 -1 +1 -j -1 -j -j -j +j -j +1 +j +1 +j +1 +1 -1 -1 +j +1 -1 -1 +1 -j -1 -j -j
-j +j +j +1 +j -j -j +j -1 +j -1 -1 -1 +1 -1 -j -1 +j +1 +1 -1 +j +1 +j +j +j +j +j +1 +j -j -j -j -1 +j -1 -1 -1 +1 -1 +1 +j +j -1
+1 +1 +j -j +j -1 +j +1 +1 +j +1 +j -1 -j The Sequence Seq$^2_{right}$, 595(k), to be transmitted from left to right, up to down -j -1 -j -j -1 -j -j -1 -j +j +1 +j -j -1 -j -j -1 -j +j +1 +j -j -1 -j -1 +j -1 -1 +j -1 -1 +j -1 +j +1 +j +1 +j +1 +1 +j +1 -1 +j -1
+1 -j +1 +j +1 +j +j +1 +j +j +1 +j -j -1 -j +j +1 +j +j +1 +j -j -1 -j +j +1 -j -1 -1 +j -1 -1 -j +1 +j +1 +j +1 +1 +j +1 +1
-j +1 -1 +j -1 +j +1 +1 -1 +1 +1 -1 +1 +1 -1 -1 -1 +1 +1 +1 -1 +1 +1 -1 -1 -1 +1 +1 +1 -1 -j -j -j -j -j -j +j
+j -j -j +j -j +j -j -j -j +j +j -j -j +1 +1 -1 +1 +1 -1 +1 +1 -1 -1 -1 +1 +1 -1 +1 +1 -1 -1 -1 +1 +1 +1 -1 +j -j -j +j
-j +j -j -j -j +j -j -j -j +j +j +j -j -j -j +j +1 +1 -j +1 +1 -j +1 +1 -j +1 +1 +1 -j -j +1 -j +1 +1 -j -1 +j +1 -j -1
-j -j -1 -j -j -1 -j +j +1 +j +j +1 +j +j -j -1 -j +j +1 -j -1 -1 +j -1 -1 +j -1 +1 -j +1 -1 +j -1 -1 +j -1 +j +1 -1
+j -1 -j -1 -j -j -1 -j -j -1 -j +j +j +j +1 +j +j +1 +j +j -1 -j +j +j +j +j +j +j -j -j -j -j -j -j -j +j +j -j -j -j +j
+j +j -j +1 -1 +j +1 -1 +1 +1 -1 -1 -1 +1 -1 +1 -1 -1 +1 -1 +1 +1 -1 -1 +1 +j +j -j +j +j +j +j -j -j -j +j +j -j
+j -j -j -j +j +j +j -j -1 +1 -1 -1 +1 -1 -1 +1 +1 +1 -1 +1 +1 -1 +1 +1 -1 +1 -1 -1 -1 +1 +1 -1 -j -1 -j -j -1 -j -j -1 -j +j +1
+j -j -1 -j -j -1 -j +j +1 -j +1 +j -1 -j +1 -1 +j -1 -1 +j -1 -1 +j -1 +1 +j +1 -1 +j -1 -j -1 -j +j +1 +j +1 +j +1 +1 +j
+1 +j -j -1 -j +j +1 +j +1 +j +j -j -1 -j +j +j -j -1 +j -1 -1 +j -1 -1 +j -1 -1 +j +1 +1 +j +1 -1 +j -1 -1 +j +1 +1 +1
-1 +1 +1 -1 +1 +1 -1 -1 -1 +1 +1 +1 -1 +1 +1 -1 -1 -1 +1 +1 +1 -1 -j -j +j -j +j -j -j +j -j +j +j -j +j -j -j -j +j
+j -j +1 +1 -1 +1 +1 -1 -1 +1 +1 -1 -1 -1 +1 +1 +1 -1 +1 +1 -1 -1 -1 +1 +1 +1 -1 +j -j +j +j -j +j +j -j -j +j -j -j -j
+j +j +j -j -1 -j +j -1 +1 -1 -1 +j -1 +j -j -1 +1 +1 -1 +1 -j -j +1

The Sequence Seq$^3_{right}$, 595(k), to be transmitted from left to right, up to down +1 -j +1 +j +1 +j +1 -j +j -1 -j -j -1 -j -1 +j -j -1 -j +1 -j +1 -1 +j -1 -j -1 -j -1 +j -1 +j +j -j -1 -j -1 +j -1 -j -1 -j
+1 -j +1 -1 -1 +1 -j -j +j -1 -1 +1 +j -j -j +j -j +1 -1 +j +j -j -1 +1 -1 -1 +1 -j -j +j -1 -1 +1 +j -j -j -j +j -1 -1
+1 -j -j +j +1 -1 -j -1 -j +1 -j +1 +j +1 +j +j -1 +j -1 +j +1 +j +1 -j +1 +j +j -1 -j -1 -j -1 -j -1
-1 +j -1 +j +1 +j -1 +j +1 +j +1 +j +j -j -1 -1 +1 -j -j +1 -1 +1 +1 -1 -j -j -1 -1 +1 -j -j +j +j -j -1 -1 +1 -j -j
+j -1 -1 +1 -1 -1 +1 +j +j -j +1 -1 +j +j -j -1 +j -1 -j -1 -j -1 -j -1 +j -1 +j +j +1 +j -1 +1 +j +j +j +j -1 -j -1 +j +1
+j +1 +j +1 -j -1 -j +j +1 +j +j -1 +j +1 +j +j +1 -j -1 +1 +1 -1 +j +j +1 +1 -1 -j -j +j +j +j -1 -1 +1 -j -j +j +j +1
-1 +1 +1 -1 +j +j -j +1 -1 -j -j +j +j -1 +1 -1 +j +j -j -1 +1 +j -1 +j -1 -j -1 -j -1 +j +1 -j -1 -j -1
+j -1 -j -1 -j -j -1 +j -1 +j -1 +j +j -1 +j -1 +j +1 +j -j -1 -j -1 -j -1 -j -j -j +j +1 -1 +j +j +j +1 -1 -1 -1 +1 +j
+j -j +1 -1 +j -j -j -j +j +1 +1 -1 +j -j +j -1 -1 +1 -1 +1 -1 -j -j +1 -1 +j +j -j -1 -j -1 -j -1 +j -1 +j +1 +j
+j +1 +j +1 -j +j -j +1 -j +1 +1 +j -1 +j -1 +j +j -1 +j -1 +j +1 -j +j -j -1 -j -1 +1 +1 -1 +j +j -j
+1 +1 -1 -j +j -j -j -j -j -1 +1 -1 +j -j +j +1 +1 -1 +1 -1 -j -j +j +j -1 +j +1 -1 +1 +j +j -j -j +j -j -j -1 -1 +j +j +1
+j -1 +j -1 -j -1 -j -1 +j -1 +j +j -1 -j -1 +1 +j +1 -j +1 -j +j -j +1 -1 +j +j -j -j +1 -1 -j +j
-j -j -j +1 +1 -1 +j -j -j +j +1 -1 -1 -1 +1 +j -j +j +1 -j +j -j -j -1 +j -1 +j -1 -1 +j +1 -1 +1 -1 -j -j +j -1
-1 +1 -j -j +j -j -j +1 -1 -1 -j +j +j -j -1 +j +1 +1 -1 +1 -1 -j

FIG. 21

The Sequence $Seq^4_{right}$, 595(k), to be transmitted from left to right, up to down +1 -j +1 +j +1 +j +j +1 +j +1 -j +1 +1 +1 -1 +j +j -j +j +j -j +1 +1 -1 +j +1 +j +1 -j +1 -1 +j -1 -j -1 -j -j -j +j -1 -1 +1 +1
+1 -1 +j +j -j +1 -j +1 +j +1 +j +j +1 +j +1 -j +1 +1 -1 +j +j -j +j -j +1 +1 -1 +j +1 +j +1 -j +1 -1 +j -1 -j -1 -j -j
+j -1 -1 +1 +1 +1 -1 +j +j -j +1 -j +1 +j +1 +j -j -1 -j -1 +j -1 +1 +1 -1 +j +j -j -j +j -1 -1 +1 +j +1 +j +1 -j +1 +1 -j +1
+j +1 +j -j -j +j -1 -1 +1 -1 -1 +1 -j -j +1 +j -1 -j -1 -j +j +1 +j +1 -j +1 -1 -1 +1 -j -j +j +j -j +1 +1 -1 -j -1 -j -1
-1 +j -1 -j -1 -j +j -j +1 +1 -1 +1 +1 -1 +j +j -j -1 +j -1 -j -1 -j -j -1 -j -1 -1 -1 +1 -j +j +j +j -1 -1 +1 -j -1 -j -1
+j -1 +1 -j +1 +j +1 +j +j +j -j +1 +1 -1 -1 -1 +1 -j -j +j -1 +j -1 -j -1 -j -j -1 -j +j -1 -1 -1 +1 -j -j +j +j +j -1 -1 +1 -j
-1 -j -1 +j -1 +1 -j +1 +j +1 +j +j +j -j +1 +1 -1 -1 -1 +1 -j -j +j -1 +j -1 -j -1 -j +j +1 +j +1 -j -1 -1 +1 -j -j +j +j -j
+1 +1 -1 -j -1 -j -1 +j -1 -1 +j -1 -j -1 -j -j +j +j -j +1 +1 -1 +1 +1 -1 +j +j -j +1 -j +1 +j +1 +j +j -j -1 -j -1 +j -1 +1 -1 -j +j
-j -j -j +j -1 -1 +1 +j +j +j +1 -j +1 +j +1 +j +j +j +j -j -j +j -1 -1 +1 -1 -1 +1 -j -j +j -1 -j -1 -j -j -j -j -j -1 -1 -1
+1 -j -j +j -j +j -1 -1 +1 -j -1 -j -1 -j -1 +j -j +1 +j +j -j +j -j +1 +1 -1 -1 -1 +1 -j -j +1 -j -1 -j -1 -j -j -1 -j -1 +j -1
-1 -1 +1 -j -j +j -j -j +j -1 -1 +1 -j -1 -j -1 -j -1 +1 -j +1 +j +1 +j +j -j +j -j +1 +1 -1 -1 -1 +1 -j -j +j -1 -j -1 -j -1 -j +1 +j
+1 -j +1 -1 -1 +1 -j -j +j +j -j +j +j +1 +1 -1 -j -1 -j -1 +j -1 -1 +j -1 -j -1 -j +j +j +1 +1 -1 +1 +1 -1 +j +j +1 -j +1 +j +1
+j -j -1 -j -1 +j -1 +1 +1 -1 +j +j -j -j +j -1 -1 +1 -j +1 +j +1 -j +1 +1 -j +1 +j +j +1 +j +1 +j +j +j -j -1 -1 +1 -1 -1 +1 -j -j +j -j
-1 +j +1 +j -1 +1 +1 +j +1 -j -j +1 +1 +1 +j +1 -1 -1

The Sequence $Seq^5_{right}$, 595(k), to be transmitted from left to right, up to down +1 -1 -1 +1 -1 -1 +1 -1 -1 -1 +1 +1 -j +j +j -j +j +j -j +j +j -j -j -j -1 -j -j -1 -j +1 +j -j -1 -j -1 +j -1 -1 +j -1 -j +1
-1 +j -1 -j +j +j -j +j +j +j +j -j +j +1 -1 -1 +1 -1 -1 +1 -1 -1 -1 +1 +1 -1 -1 +j -1 -1 +j -1 +1 +j +1 -1 -j -1 -j -1 -j -j -1 -j
+j +1 +j -j -1 -j -1 +1 +1 -1 -1 -1 +1 +1 -1 +1 +1 +j -j -j -j +j +j -j -j +j +j -1 +j +j -1 -j -j -1 -j -j -1 -j +1 -j +1
-1 +j -1 -1 +j -1 -1 +j -1 -j +j +j -j -j -j +j -j +j -j +j +1 -1 -1 -1 +1 +1 -1 -1 -1 -1 -1 +j -1 +1 -j +1 +1 -1 +j +1 -j
+1 -j -1 -j +j +1 +j +j +1 +j +j +1 +j -1 +1 +1 -1 +1 +1 -1 +1 +1 -1 -1 +j -j -j -j +j -j -j +j -j +j +j +j +j +j -j +1 +j
-j -1 -j +j +j +1 -j +1 +1 -j +1 -1 +j -1 +1 -j +1 +j -j -j +j -j -j +j +j -j -1 +1 +1 -1 +1 +1 -1 +1 +1 +1 -1 -1 +1 -j
+1 +1 -j +1 -1 -j -1 +j -1 +j +1 +j +1 +j +j +j -j -1 -j +j +j +1 -1 -1 -1 +1 +1 +1 -1 -1 -1 -j +j +j -j -j -j +j +j
-j +j +j -j -1 -j +j +j +j +1 +j +j +1 +j -j +1 -j -1 -1 +1 -j +1 +1 -j +1 +j +j +j +j +1 +j +j -j -j +j -j -j +j -1 +1 +1 -1
-1 -1 +1 +1 -1 +1 +1 +1 -j +1 -1 -j -1 -1 +j -1 +j +1 +j +j -1 -j -j -1 -j -1 -j -1 +1 +1 -1 +1 +1 -1 +1 +1 +1 -1 -1 -1
+j -j -j +j -j -j +j -j -j +j +j +1 +j +j +j +1 +j -j -1 -j +j +j +1 -j +1 +1 -j +1 -j -1 +j -1 +j +1 +j +j +j -j -j -j -j -j -j
+j +j -1 +1 +1 -1 +1 +1 -1 +1 +1 +1 -1 -1 +1 -j +j +1 -j -1 +j -1 +1 -j +1 +j +1 +1 +j +1 +j -j -1 -j +1 +j +1 -1 -1 -1
+1 +1 +1 -1 -1 +1 -1 -1 -j +j +j +j -j +j +j -j -j -j +j -j +1 +j +j +1 +j +j +1 +j -1 +j -1 +1 -j +1 +1 -j +1 +1 -j
+1 +j +j +j +j +j +j +j -j -j +j -j -1 +1 +1 -1 -1 -1 +1 +1 -1 +1 +1 +1 -j -1 +1 -j -1 -1 +j -1 -1 +j -1 -j +j +1 -j -1 -j +j
-1 -j -j -1 -j -1 +j +1 -j -1 +1 +j -j -1 +j +1 +1 -1 +j +j +j The Sequence $Seq^6_{right}$, 595(k), to be transmitted from left to right, up to down +1 -1 -1 -j +j +j -1 +j -1 +j +1 +j -j +j +j -1 +1 +1 +j +1 +j +1 -j +1 -1 +1 +1 +j -j -j +1 -j +1 -j -1 -j -j +j -1 +1 +1 +j
+1 +j +1 -j +1 +j -j -j -1 +1 +1 -j -1 +j +1 -j -1 +1 +1 -j +j +j +1 -j +1 +j +1 +j +j -j +j -j -1 -1 +j +1 +j -1 -j -1 -1 +1
+1 -j +j +j +1 -j +1 +j +1 -j -1 +1 +1 +j +j +j -1 -j -1 -j -1 +j +j -1 -1 +1 +1 +j +1 +j -1 +j -1 +1 -1 -1 +j -j -j +1 -j +1 +j
+1 +j +j -j -j -1 +1 +1 +j +1 +j -1 +j -1 -j +j -j -1 +1 +1 -j -1 -j -1 +1 -1 +1 -1 -1 -j -j +j +j -1 -j -1 -j -j -j -j +1 -1 -1
+j +1 +j +1 -j +1 -1 -1 -j +j +j +1 +j -1 -j -1 +1 +1 -j +j +j -j +1 -j -1 -j +j -j +j -1 -1 -j -1 -j -1 +j -1 -1 -1
-j +j +j -1 +j -1 +j +1 +j +j -j -j -1 -1 -j -1 -j -1 +j -1 +j +j -1 -1 -j +j -1 +j -1 -1 -1 -1 +j -j -j -1 +j -1 -j -1 -j
+j -j -j -1 +1 +1 -j -1 -j +1 -j +1 -1 -1 +j -j -j -j -1 -j -1 +j -1 -1 -j +j -j +j +1 +j +1 +j +j +j -j +j -j -1 -1 -j -1 -j
+1 -j +1 -1 +1 +1 -j +j +j -1 -j -1 -j -1 -j -j +j +j +1 -1 -j -1 -j +1 +j +1 +j +j +j +1 -1 +j +1 -j -j +1 -1 -1 +1 +j +j
-j -1 +j -1 +j +1 +j +j +j -j -1 +1 +1 -j -1 -j -1 +j -1 -1 +1 +1 +j +j +j -1 +j +1 -j +j +j +1 +j -j -j +j +1 -1 -j +j -j
-j +1 -1 -1 -j -1 -j +j -1 +1 -1 -1 -j +j -1 -1 -j +1 +j +1 +j +j -j +1 -1 -1 -1 -j -1 -j +j -1 -1 +j +1 +j +j -1 -1 +j +j -1 -j
-1 +1 -1 -1 +j -j -j -1 +j -1 -j +j -j -j +1 +1 -1 -j -1 +j +1 +j +1 -1 -1 +j +j -j -1 +j -1 -j +1 -1 -1 +j +j -j -j +j
+j +1 -j -j +j +j +1 -1 -1 -j -1 -j +j -1 +j -1 +1 -1 -1 +j +j +j -1 -j -1 -j +j +j +j +1 -1 -1 -j -1 -j +1 +j +1 +j +j +j -j -1 -1
+j +1 +j +1 -j +1 -1 +1 +1 +j -j -j -1 -j +1 +j +j +j -1 +1 +1 -j -1 -j -1 -1 -1 +1 +1 +1 -j +j -j -1 +j -1 +j +1
+1 +1 +j +j -1 +j -1 -j +1 +j -1 +1 +1 +1 -j -j +j +j

FIG. 22

The Sequence $Seq^7_{right}$, 595(k), to be transmitted from left to right, up to down -j +j +j +j -j -j -1 +1 +1 +1 -1 -1 +1 -1 -1 +1 -1 -1 -j +j +j -j +j +j +1 -1 -1 -1 +1 +1 +j -j -j +j +j +j -j -j +j -j -j -1 +1 +1
-1 +1 +1 +1 -1 -1 -1 +1 +1 +j -j -j -j +j +j -j +j +j -j +j +j +1 -1 -1 +1 -1 -1 +j -j -j -j +j +j +1 -1 -1 -1 +1 +1 +1 -1 -1 +1
-1 -1 -j +j +j -j +j +j -1 -j -j -1 -j -1 +j -1 -1 +j -1 +1 -j +1 -1 +j -1 -j -1 -j +j +1 +j +1 -j +1 +1 -j +1 +j +1 +j +j +1 +j +j
+1 +j -j -1 -j -1 +j -1 +1 -j +1 +1 -j +1 +1 -j +1 +j +1 +j +j +1 +j -j -1 -j +j +1 +j -1 +j -1 -1 +j -1 +j +1 +j +j +1 +j +1 -j
+1 +1 -j +1 +1 -j +1 -1 +j -1 -j -1 -j +j +1 +j +1 -1 -1 -1 +1 +1 -j +j +j -j -j +j -j -j +j -j -j +1 -1 -1 +1 -1 -1 +j -j -j -j +j
+j -1 +1 +1 +1 -1 -1 -1 +1 +1 -1 +1 +1 -j +j +j -j +j +j -j -j -j +j -j -1 +1 +1 +1 -1 -1 +1 -1 -1 +1 -1 -1 +j -j -j +j -j
-1 +1 +1 +1 -1 -1 +j -j -j -j +j +j +j -j -j +j -j -j +1 -1 -1 +1 -1 -1 +1 -j +1 +1 -j +1 -j -1 -j -1 -j +j +1 +j -j -1 -j +1 -j +1
-1 +j -1 +j +1 +j +j +1 +j -1 +j -1 -1 +j -1 -1 +j -1 +1 +j +1 -j -1 -j +j +j +1 +j +j +1 +j -1 +j -1 -1 +j -1 +1 -j +1 -1
+j -1 +j +1 +j -j -1 -j -1 +j -1 -1 +j -1 +j +1 +j +j +1 +j +j +1 +j -j -1 -j +1 -j +1 -1 +j -1 -j +j +j -j -1 +1 +1 +1 -1 -1
+1 -1 -1 +1 -1 -1 -j +j +j -j +j +j +1 -1 -1 -1 +1 +1 +j -j -j -j +j +j -j -j -j +j -j -1 +1 +1 -1 +1 +1 +1 -1 -1 -1 +1 +1 +j
-j -j -j +j +j -j +j -j -j +j +j +j +1 -1 -1 +1 -1 -1 +j -j -j -j +j +j +1 -1 -1 -1 +1 +1 +1 -1 -1 +1 -1 -1 -j +j +j -j +j +j -j -1 -j -j
-1 -j -1 +j -1 -1 +j -1 +j +1 -1 +j -1 -j -1 -j +j +1 +j +1 -j +1 -j +1 +j +j +1 +j +j +1 +j +j -1 -j -1 +j -1 +1 -j +1
+1 -j +1 +1 -j +1 +j +1 +j +j +1 +j +j -j -1 -j +j +1 +j +1 -j +1 -1 +j -1 +j +1 +j +j +1 +j -j +1 +1 -j +1 -j +1 -1 +j -1
-j -1 -j +j +1 +j -1 +1 -1 +1 +j +j -1 -1 -j +1 -1 +j +1 +1 -1 -j +j +j +1

The Sequence $Seq^8_{right}$, 595(k), to be transmitted from left to right, up to down -j +j +j +j -j -j +1 -1 -1 -1 +1 +1 +j +1 +j +j +1 +j -1 +j -1 -1 +j -1 -1 +1 +1 +1 -1 -1 +j -j -j -j +j +j +1 -j +1 +1 -j +1 -j
-1 -j -j -1 -j -1 +1 +1 -1 +1 +1 +j -j -j +j -j -j +1 -j +1 -1 +j -1 -j -1 -j +j +1 +j +j -j -j +j -j -j -1 +1 +1 -1 +1 +1 -j -1 -j +j
+1 +j +1 -j +1 -1 +j -1 +j -j -j -j +j +j -1 +1 +1 +1 -1 -1 -j -j -j -1 +j +1 +j +1 -j +1 -1 +1 +1 +1 -1 -1 +j -j -j -j +j
+1 -j +1 +1 -j +1 -j -1 -j -j -1 -j +1 -1 -1 +1 -1 -1 -j +j +j -j +j -1 +j -1 +1 -j +1 +j +1 +j -j -1 -j +j +j -j -j -j -1 +1 +1
-1 +1 +1 -j -1 -j +j +1 +j +1 -j +1 -1 +j -1 +1 -1 -1 -1 +1 +1 +j -j -j -j +j +j -1 +j -1 -1 +j -j -1 -j -j -1 -j +j +j -j -j -j
-1 +1 +1 +1 -1 -1 +j +1 +j +j +1 +j +1 -j +1 +j -j +j -j +j +j -j -1 +1 +1 -1 +1 +1 +j +1 +j -j -1 +j -j +1 -j -1
-1 +1 +1 -1 +1 +1 -j +j +j -j +j +j +1 -j +1 -1 +j -1 +j +1 +j -j -1 -j -1 +1 +1 +1 -1 -1 +j +j +j -j -j +j -j +1 +j +1 -j +1 +j
+1 +j +j +1 +j -j +j +j -j -j -1 +1 +1 +1 -1 -1 +j +1 +j +j +1 +j +1 -j +1 +j -1 +j +j -j -j +j -j -1 +1 +1 -1 -1 +1 -1 -1 -j -1 -j
+j +1 +j -1 +j -1 +1 -j +1 -1 +1 -1 +1 +j -j +j -j +j +j +1 -j +1 -1 +j -1 +j +1 +j -j -1 -j -j +j +j -j -j -j +1 -1 -1 -1 +1
+1 +j +1 +j +j +1 +j -1 +j -1 -1 +j -1 -1 +1 +1 +1 -1 -1 +j -j -j -j +j +j +1 -j +1 +1 +j -1 -j -1 -j -1 +1 +1 -1 +1 +1
+j -j -j +j -j -j +1 -j +1 -1 +j -1 -1 -j +j +1 +j +j -j -j -j -1 +1 +1 -1 +1 +1 -j -1 -j +j +j +1 +j +1 -j +1 -1 +j -1 -j -j -j -j
+j +j -1 +1 +1 +1 -1 -1 -j -1 -j -j -1 -j +1 +j +1 +j +1 -1 +1 +1 +1 -1 -1 +j -j -j -j +j +j +1 +j +j +1 +j -1 -j -1 -j -j -j -1 -j
+1 -1 -1 +1 -1 -1 -j +j +j -j +j +j -1 +j -1 +1 +j +1 +j +1 -j +1 -j -j +j +j +j +1 -1 -1 +1 +1 -1 -j +j +j +1 -j +j +j -1 -j
+1 -1 +j -1 +j +1 -1 +1 +1 -1 +1 -1 +j +j -1 -1 +1 +1 -1 -j -j -j +1

FIG. 23

| The Sequence $Seq^1_{left}$, 804(k), to be transmitted from left to right, up to down |
|---|
| -j +j +1 -1 +j -1 -j -j -1 +j -j +j +1 +1 +1 +j -1 -1 +j -1 +1 -1 +j +j -1 -j +1 +1 -j -1 +1 -1 +j +j -j +1 +j +j +1 +j -j +j +1<br>+1 +j -1 -j -j -1 +j -j +j +1 +1 +1 +j -1 -1 +j -1 +1 -1 +j +j +1 +j -1 -1 +j +1 -1 +1 -j -j +j -1 -j -j -1 -j +j -j -1 -1 -j +1 +j<br>+j +1 -j +j -j -1 -1 -1 -j +1 +1 -j +1 -1 +1 -j -j +1 +j -1 -1 +j +1 -1 +1 -j -j +j -1 -j -j -1 -j +j -j -1 -1 +j -1 -j -j -1 +j -j +j +1<br>+1 +1 +j -1 -1 +j -1 +1 -1 +j +j +1 +j -1 -1 +j +1 -1 +1 -j -j +j -1 -j -j -1 -j +j -j -1 -1 +j -1 -j -j -1 +j -j +j +1 +1 +1 +j -1<br>-1 +j -1 +1 -1 +j +j -1 -j +1 +1 -j -1 +1 -1 +j +j -j +1 +j +j +1 +j -j +j +1 +1 +j -1 -j -j -1 +j -j +j +1 +1 +1 +j -1 -1 +j -1<br>+1 -1 +j +j +1 +j -1 -1 +j +1 -1 +1 -j -j +j -1 -j -j -1 -j +j -j -1 -1 -j +1 +j +j +1 -j +j -j -1 -1 -1 -j +1 +1 -j +1 -1 +1 -j -j +1<br>+j -1 -1 +j +1 -1 +1 -j -j +j -1 -j -j -1 -j +j -j -1 -1 +j -1 -j -j -1 +j -j +j +1 +1 +1 +j -1 -1 +j -1 +1 -1 +j +j +1 +j -1 -1 +j<br>+1 -1 +1 -j -j +j -1 -j -j -1 -j +j -j -1 -1 +1 +j -1 -1 +j +1 -1 +1 -j -j -j +1 +j +j +1 +j -j +j +1 +1 -j +1 -1 -j -j -1 +j -j +j +1 +1<br>-1 -j +1 +1 -j +1 -1 +1 -j -j +j +1 +j -1 -1 +j +1 -1 +1 -j -j -j +1 +j +j +1 +j -j +j +1 +1 -j +1 +j +j +1 -j +j -j -1 -1 +1 +j -1<br>-1 +j -1 +1 -1 +j +j -1 -j +1 +1 -j -1 +1 -1 +j +j +j -1 -j -j -1 -j +j -j -1 -1 +1 +j +j +1 -j +j -j -1 -1 +1 +j -1 -1 +j -1 +1<br>-1 +j +j +1 +j -1 -1 +j +1 -1 +1 -j -j -j +1 +j +j +1 +j -j +j +1 +1 -j +1 +j +j +1 -j +j -j -1 -1 +1 +j -1 -1 +j -1 +1 -1 +j +j<br>-1 -j +1 +1 -j -1 +1 -1 +j +j +j -1 -j -j -1 -j +j -j -1 -1 +j +1 +j +j +1 -j +j -j -1 -1 +1 +j -1 -1 +j -1 +1 -1 +j +j -1 -j +1 +1 -j<br>-1 +1 -1 +j +j +j -1 -j -j -1 -j +j -j -1 -1 +j -1 -j -j -1 +j +j +1 +1 -1 -j +1 +1 -j +1 -1 +1 -j -j +1 +j -1 -1 +j +1 -1 +1 -j -j<br>-j +1 +j +j +1 +j -j +j +1 +1 +j -1 -j -j -1 +j -j +j +1 +1 -1 -j +1 +1 -j -1 +1 -1 +1 -j -j -1 -j +1 +1 -j -1 +1 -1 +j +j -j -1 -j -j<br>-1 -j +j -j -1 -1 +j -1 -j -j -1 +j -j +j +1 +1 -1 -j +1 +1 -j +1 -1 +1 -j -j +1 +j -1 -1 +j +1 -1 +1 -j -j -j +1 +j +j +1 +j -j +j<br>+1 +1 +j -1 -j -j -1 +j -j +j +1 +1 -1 -j +1 +1 -j +1 -1 +1 -j -j +1 +j -1 -1 +j +1 -1 +1 -j -j -j +1 +j +j +1 +j -j +j +1 +1 -j +1<br>+j +j +1 -j +j -j -1 -1 +1 +j -1 -1 +j -1 +1 -1 +j +j -j -1 +j +1 -j -1 +1 -1 +j +j -j -1 -j -j -1 -j +j -j -1 -1 +j +1 +j +j +1 -j<br>+j -j -1 -1 +1 +j -1 -1 +j -1 +1 -1 +j +j +1 +j -1 -1 +j +1 -1 +1 -j -j -j +1 +j +j +1 +j -j +j +1 +1 -j +1 +j +j +1 -j +j -j -1<br>-1 +1 +j -1 -1 +j -1 +1 -1 +j +j |

| The Sequence $Seq^2_{left}$, 804(k), to be transmitted from left to right, up to down |
|---|
| +1 -1 -1 +1 +j -1 -j -j -1 +j -1 -j -j -1 +1 +j -1 -1 +j +1 +j -1 -1 +j -j +1 +j +j +1 -j +1 +j +j +1 +1 +j -1 -1 +j +1 +j -1 -1<br>+j +j -1 -j -j -1 -j +1 +j +j +1 -1 -j +1 +1 -j +1 +j -1 -1 +j +1 +j +j +1 +j -1 -j -1 -1 -j +1 +1 -j +1 +j -1 -1 +j +1 -1 +1<br>-j -j +1 -1 +1 -j -j +j -j -1 -1 -j +j -j -1 -1 +1 -1 +1 -j -j +1 -1 +1 -j -j +j -j +1 +j +1 +1 +j -j +j +1 +1 +1 -1 +1 -j -j -1 +1 -1<br>+j +j +j -j +j +1 +1 -j +j -1 -1 +1 -1 +1 -j -j -1 +1 -1 +j +j -j -j -1 -1 +j -j +j +1 +1 +j -1 -j -j -1 +j -1 -j -j -1 +1 +j -1<br>-1 +j +1 +j -1 -1 +j -j +1 +j +j +1 -j +1 +j +j +1 +1 +j -1 -1 +j +1 -1 -1 +j -j -j -1 -j +1 +j +j +1 -1 -j +1 +1 -j +1 -j +1<br>+j -1 -1 +j -j +1 +j +j +1 +j -1 -j -j -1 -1 -j +1 +1 -j +1 -1 +1 -j -j +1 +j -1 +1 -j -j -j +j +j -1 -1 -j +j -j -1 -1 +1<br>-1 +1 -j -j +1 -1 +1 -j -j +j -j +j +1 +1 +j -j +j +1 +1 +1 -1 +1 -j -j -1 +1 -1 +j +j +j -j +1 +1 +j -j -j -1 -1 +1 -1 +1 -j -j<br>-1 +1 -1 +j +j -j +j -1 -1 +j -j +j +1 +1 +1 +j -1 -1 +j +1 -j -1 -1 +j +j +j +1 +j +j +1 -1 +j +1 -j +1 +1 -j -1 +j +1<br>+1 -j -j +1 +j +j +1 -j +1 +j +j +1 +1 +j -1 -1 +j -1 +j +1 +j -1 -j -1 -1 +1 +j +j +1 -1 -j +1 +1 -j +1 -j +1 -1 +j +j -1<br>-j -j -1 -j +1 +j +j +1 -j +j -1 -1 -j +j -1 -1 -1 +1 -1 +j +j -1 +1 -1 +j +j -j -j -1 -1 -j +j -j -1 -1 +1 -1 +1 -j -j +1 -1<br>+1 -j -j -j +j -1 -1 +j -j +j +1 +1 -1 +1 -j -j -1 +1 -1 +j +j -j +j -1 -1 +j +j +j -1 -1 +j -j +j +1 +1 -1 -1 +j +1 -1 -j -j -1 -j<br>+1 +1 -j -1 +j +1 +1 -j +j -1 -j -j -1 -j -1 -j -j -1 +j -1 -1 +j +1 +j -1 -1 +j -j -1 -j -j -1 -j -j -1 -j +1 +j +1 +j<br>-1 -1 -j -j +1 +j +j +1 +j -1 -j -j -1 +1 +j -1 -1 +j -1 +j +1 +j -j -1 -1 +j -j +j +1 +1 -j -j +j +j +1 +j +1 +1<br>-1 +1 -j -j +1 -1 +1 -j -j +j -j +j +1 +1 +j -j +1 +1 -1 -1 +j -j -1 +1 -1 +j +j -j -j +1 +j -j -1 -1 -1 +1 -1 +j<br>+j +1 -1 +1 -j -j +j -j +j +1 +1 +j -j -1 -1 -1 +1 -j -j +1 -1 -1 +j +j +1 +j -1 -1 +j +1 +j -1 -1 +j +j +1 -j +1<br>+j +j +1 -1 -j +1 +1 -j -1 +j +1 +1 -j +j +j +1 +j +1 +j +j +1 +1 +j -1 -1 +j -1 +j +1 +j -1 -j -j -1 -j +j +j +1<br>-1 -j +1 +1 -j +1 +j -1 -1 +j -j -1 -j -j -1 -j +1 +j +j +1 -j +j -1 -1 -j +j -1 -1 +1 -1 +j -1 +1 -1 +j +j -j -j -1<br>-j +j -j -1 -1 +1 -1 +1 -j -j +1 -1 +1 -j -j -j +j -j -1 -1 +j -j +j +1 +1 -1 +1 -j -j -1 +1 -1 +j +j -j +j -1 -1 +j -j +j +1 +1<br>-1 +1 -1 +j +j +1 -1 +1 -j -j |

FIG. 24

| The Sequence $Seq^3_{left}$, 804(k), to be transmitted from left to right, up to down |
|---|
| -j -1 -1 -1 +j -1 -j -j -1 +j -j +j +1 +1 -1 -j +1 +1 -j -1 +1 -1 +j -j +1 +j +j +1 +j -j +j +1 +1 +1 +j -1 -1 +j -1 +1 -1 +j +j<br>+1 +j -1 -1 +j +1 -1 +1 -j -j -j +1 +j +j +1 -j +j -j -1 -1 +1 +j -1 -1 +j -1 +1 -1 +j +j -j +1 +j +j +1 +j -j +j +1 +1 +j -1 -j -j<br>-1 +j -j +j +1 +1 +1 +j -1 -1 +j +1 -1 +1 -j -j -j +1 +j +j +1 +j -j +j +1 +1 -1 -j +1 +1 -j +1 -1 +1 -j -j +1 +j -1 -1 +j +1 -1<br>+1 -j -j +j -1 -j -j -1 +j -j +j +1 +1 +1 +j -1 -1 +j -1 +1 -1 +j +j -j -1 -j -1 -j +j -j -1 -1 -j +1 +j +j +1 -j +j -j -1 -1 +1 +j<br>-1 -1 +j +1 -1 +1 -j -j +j -1 -j -j -1 -j +j -j -1 -1 -1 -j +1 +1 -j +1 -1 +1 -j -j -1 -j +1 +j -1 +1 -1 -1 +j +j +j -1 -j -j -1 +j -j +j<br>+1 +1 -1 -j +1 +1 -j +1 -1 +1 -j -j +j -1 -j -j -1 -j +j -j -1 -1 -1 -j +1 +j +j +1 -j +j -j -1 -1 -1 -j +1 +1 -j -1 +1 -1 +j +j +j -1 -j<br>-j -1 -j +j -j -1 -1 +1 +j -1 -1 +j -1 +1 -1 +j +j -1 -j +1 +1 -j -1 +1 -1 +j +j -j +1 +j +j +1 -j +j -j -1 -1 -1 -j +1 +1 -j +1 -1<br>+1 -j -j -j +1 +j +j +1 +j -j +j +1 +1 +j -1 -j -j -1 +j -j +j +1 -1 -j +1 +1 -j -1 +1 -1 +j +j -j +1 +j +j +1 +j -j +j +1 +1<br>+1 +j -1 -1 +j -1 +1 -1 +j +j +1 +j -1 -1 +j +1 -1 +1 -j -j -j +1 +j +j +1 -j +j -j -1 -1 +1 +j -1 -1 +j -1 +1 -1 +j +j -j +1 +j<br>+j +1 +j -j +j +1 +1 +j -1 -j -j -1 +j -j +j +1 +1 +1 +j -1 -1 +j -1 +1 -1 +j -j -j -j +1 +j +j +1 +j -j +j +1 +1 -1 -j +1 +1 -j +1<br>-1 +1 -j -j +1 +j -1 -1 +j +1 -1 +1 -j -j +j -1 -j -j -1 -j +j +1 +1 +1 +j -1 -1 +j -1 +1 -1 +j +j +j -1 -j -j -1 +j +j -1 -1 -1<br>-j +1 +1 -j -1 +1 -1 +j +j +j +1 +j +j +1 -j +j -1 -1 +1 +j -1 -1 +j -1 +1 -1 +j +j -j -1 -j -j -1 +j -j -1 +j -1 -1 +j -1 -j -j -1 +j<br>-j +j +1 +1 +1 +j -1 -1 +j +1 -1 +1 -j -j +j -1 -j -j -1 +j -j -1 -1 +1 +j -1 -1 +j -1 +1 -1 +j -j -1 -j +1 +j -1 -1 +1 -1 +j<br>+j -1 -j -j -1 +j -j +j +1 +1 +1 +j -1 -1 +j -1 +1 -1 +j +j -j +1 +j +j +1 +j -j +j +1 +1 +j -1 -j -j -1 +j -j +j +1 +1 -1 -j +1 +1<br>-j -1 +1 -1 +j +j -j -1 -j -j -1 -j +j -j -1 -1 -1 -j +1 +1 -j +1 -1 +1 -j -j -1 -j +1 +j -1 +1 -1 -1 +j +j +j +1 +j +j +1 -j +j -j -1<br>-1 +1 +j -1 -1 +j -1 +1 -1 +j +j +j -1 -j -j -1 +j -j -1 -1 +j -1 -j -j -1 +j +j +1 +1 +1 +j -1 -1 +j +1 -1 +1 -j -j +j -1 -j -j<br>-1 -j +j -j -1 -1 +1 +j -1 -1 +j -1 +1 -1 +j +j -j -1 +j +1 -1 -1 -1 +j -1 +1 -1 +j +j -j -1 -j -j -1 +j +j +1 +1 +1 +j -1 -1 +j -1 +1 -1<br>+j +j -j +1 +j +j +1 +j -j +j +1 +1 +j -1 -j -j -1 +j -j +j +1 -1 -1 +j +1 +1 -j -1 +1 -1 +j +j -j -1 -j -j -1 +j -j -1 -1 -1 -j +1<br>+1 -j +1 -1 +1 -j -j |

| The Sequence $Seq^4_{left}$, 804(k), to be transmitted from left to right, up to down |
|---|
| +1 +j +j -j +j -1 -j -j -1 +j -1 -j -j -1 -j +j -j -1 -1 -j +j -j -1 -1 -1 -j +1 +1 -j -1 -j +1 -1 +j -1 +1 -1 +1 -j -j +1 -1 +1 -j -j -1 -j<br>+1 +1 -j +1 +j -1 -1 +j +1 -1 -1 +1 -j -j -1 +1 -1 +j +j +j -1 -j -j -1 -j +j +j +1 -j +j -j -1 -1 +j -j +j +1 -1 -j +j +1 -1 -j +1 +1 -j -1<br>-j +1 +1 -j -1 +1 -1 +j +j -j -1 +1 -1 +j +j +j -1 -j -j -1 +j -1 -j -j -1 +j -j +j +1 +1 +j +j +j +1 -j +1 +j +j +1 +j -1 -j -j -1 -j<br>+j -j -1 -1 +j -j +j +1 +1 +1 +j -1 -1 +j -1 -j +1 +1 -j +1 -1 +1 -j -j -1 +1 -1 +j -j +j +1 +j +j +1 -j +1 +j +j +1 +j -j +j +1<br>+1 +j -j +j +1 +1 +1 +j -1 -1 +j +1 +j -1 -1 +j -1 +1 -1 +j -1 +1 -1 +j +j +1 +j -1 -1 +j -1 -j +1 +1 -j -1 +1 -1 +1 -j +1 -1 +j +j +1<br>-1 +1 -j -j -j +1 +j +j +1 +j -1 -j -j -1 +j -j +j +1 +1 -j +j -j -1 -1 +1 +j -1 -1 +j +1 -1 +j +1 -1 -1 +j -j -1 -1 +1 -j -j -j<br>+1 +j +j +1 -j +1 +j +j +1 -j +j -j -1 -1 -j +j -j -1 -1 +j -1 -j -j -1 +j +1 +j +j +1 +j -j +j +1 +1 -j -j -1 -1 -j +1 +1 -j +1<br>+j -1 -1 +j -1 +1 -1 +j +j +1 -1 +1 -j -j +j -1 -j -j -1 -j +j -j -1 -1 -j +j -j -1 -1 -1 -j +1 +1 -j -1 -j +1 +1 +j<br>-1 +1 -j -j +j -1 -1 +j -j -1 -j +1 +1 +j +1 +j -1 -1 +j +1 -1 -1 +j -j -1 -1 -1 +j +j +j -1 -j -j -1 +j +j +1 -j +j -j -1 -1 +j<br>-j +j +1 +1 -1 -j +1 +1 -j -1 +j +1 +1 -j -1 -1 -1 +j +j -j -1 +1 -1 -1 -1 -j -j +j +1 +1 +j -j +1 +1<br>-j +1 +j +j +1 +j -1 -j -j -1 -j +j -1 -1 +j -j +j +1 +1 +j -1 -1 +j -1 +j +1 +j -1 +1 -j -j -1 +1 -1 +j -j -1 +j +1<br>-j -1 -j +1 +1 -j +1 -1 +1 -j -j +1 -1 +1 -j -j -j +1 +j +j +1 -j +j +j +1 +j -j +j +1 +1 +j +j +j +1 -j +j +j +1 -j -1<br>-j -j -1 +j -j +j +1 +1 -j +j -j -1 -1 -1 -j +1 +1 -j +1 -1 +j +1 -1 -1 +j -1 -j +1 +1 -j +j +1 -j +1 +j +j +1 -j<br>+j -j -1 -1 -j +j -j -1 -1 -1 -j +1 +1 -j -1 -j +1 -1 +j +1 -j -1 -1 +j -1 -j +1 +j +1 -j -1 -1 -1 -j +1 +1 -j +1 -1 +j +1 -1 +1 -j -j<br>-1 +1 -1 -j +j +j -1 -j -j -1 +j +1 +j +j +1 -j +j +1 -1 +j +j -1 -1 -1 -j +1 +1 -j -1 +j +1 -1 +1 -j -j +1 -1 +1 -j<br>-j -j +1 +j +j -1 +j +j +j +1 +j -j +j +1 +j -j +1 -1 +1 +j -1 +j +j +j +j -1 -j -j -1 +j +j +1 -1 +j -j -1 -1 -1 +j +1<br>+1 -j +1 +j -1 -1 +j +1 -1 +1 -j -j -1 -1 -1 +j +j -1 +j +j +j +1 -j +j +j +1 -j +j -j -1 -1 -1 -j +j -j -1 -1 -1 -j +1 +1 -j -1 -j<br>+1 +1 -j -1 +1 -1 +j +j -1 +1 -1 +j +j +1 +j -1 -1 +j -1 +1 -1 +1 -j +1 -1 -j -j -1 +1 -1 +j +j +j -1 -j -j -1 -j +1 +j +j +1<br>+j -j +j +1 +1 -j +j -j -1 -1 |

FIG. 25

| The Sequence $Seq^5_{left}$, 804(k), to be transmitted from left to right, up to down |
|---|
| -j -j +1 -j -1 -1 -j +j -j -1 -1 -j +j -j +1 +1 +j -j +j -1 -1 -j +j -j -j +1 +1 -j -1 -j +1 +1 -j -1 +j -1 -1 +j +1 -j +1 +1 -j -1 -1 -1 -j +j -j +1 +1 +j -j +j +1 +1 +j -j +j +1 +1 +j -j +j +j -1 -1 +j +1 -j +1 +1 -j -1 -j +1 +1 -j -1 -j +1 +1 -j -1 +j +1 +1 -j -1 +j +j -1 +1 -1 +j +j -1 +1 -1 -j -j +1 -1 +1 -1 -j -j -1 +j -1 -j -j -1 +j -1 +j -j +1 +j +j +1 -j +j -j -1 +1 -1 -j -j +1 -1 +1 +j +j -1 +1 -1 -1 +j +j -1 +1 -1 +1 +j +j +1 -j -1 -j -j -1 +j +1 +j +j +1 -j +1 +j +j +1 -j -1 -1 -j +j -j -1 -1 -j +j -j +1 +1 +j -j +j -1 -1 -j +j +j +1 +1 -j -1 -j +1 +1 -j -1 +j -1 -1 +j +1 +1 -j -j +j +j -1 -1 +j +1 -j +1 +1 +j -1 -j +1 +1 -j -1 +j +1 +1 -j -1 +j -j -1 +1 -1 +j +j -1 +1 -1 +j +j -1 +1 -1 -j +j +1 -1 +1 -j -j -1 +j -1 -j -j -1 +j -1 -j -j -1 +j +1 +j +j +1 -j +j -1 +1 -1 -j -j +1 -1 +1 +j +j -1 +1 -1 -j -j -1 +j -1 -j -j -1 +j -j -j -1 +j +1 +j +j +1 -j +1 +j +j +1 -j +j -1 +1 -1 +j +j -1 +1 -1 -j -j -1 +j -1 -j -j -1 +j +1 +j +j +1 -j -1 -j -j -1 +j -1 -j -j -1 +j -1 -j -j -1 +j -1 -j -j -1 +j ... |

| The Sequence $Seq^6_{left}$, 804(k), to be transmitted from left to right, up to down |
|---|
| [sequence of +1, -1, +j, -j values] |

FIG. 26

| The Sequence $Seq^7_{left}$, 804(k), to be transmitted from left to right, up to down |
|---|
| +j -j -1 -1 -1 -j +j -j +1 +1 +j -j +j +1 +j +j +1 -j +1 +j +j +1 -j -j -j +1 -1 +1 +j -j -1 +1 -1 +j -1 -1 +j +1 +j -1 -1 +j +1<br>+j +j -1 +1 -1 -j -j +1 -1 +1 -j +1 +1 -j -1 -j +1 +1 -j -1 +1 +1 +j -j +j -1 -1 -j +j -j -1 -j -j -1 +j -j -j -1 +j -j +1 -1 +1<br>-j -j +1 -1 +1 +j -1 -1 +j +1 -j +1 +1 -j -1 -1 -j +j -j -1 -j +j -j +1 +j +j +1 -j -1 -j -j -1 +j -1 -1 -j +j -j -1 -1 -j +j -j +1<br>+j +j +1 -j -1 -j -j -1 +j -j +1 -1 +1 -j -j +1 -1 +1 +j -1 -1 +j +1 -j +1 +1 -j -1 +1 +1 +j +j -j -1 -j +j -j -1 -j -j -1 +j -1<br>-j -j -1 +j +j +j -1 +1 -1 -j -j +1 -1 +1 -j +1 +1 -j -1 +j +1 -j -1 -j +j +1 -1 +1 +j -1 +1 -1 +j -1 -1 +j +1 +j -1 -1 +j +1<br>-1 -1 -j +j -j +1 +1 +j -j +j +1 +j -j +1 -j +1 +j +j +1 -j +j -j -1 +1 -1 +j +j -1 +1 -1 -j +1 +1 -j -1 +j -1 -1 +j +1 +1 +1 +j<br>-j +j +1 +1 +j -j +j -1 -j -j -1 +j +1 +1 +j -j +j +1 -j +1 +1 +j -j +j +1 +1 +j -j +1 -j -j -1 +j +1 +j +j +1 -j +j -j -1 +1 -1 +j +j<br>-1 +1 -1 -j +1 +1 -j -1 +j -1 -1 +j +1 -1 -1 -j +j -j +1 +1 +j -j +j +1 +j +j +1 -j +1 +j +j +1 -j -j -j +1 -1 +1 +j -j -1 +1 -1<br>+j -1 -1 +j +1 +j -1 -1 +j +1 +j +j -1 +1 -1 -j -j +1 -1 +1 -j +1 +1 -j -1 -j +1 +1 -j -1 +1 +1 +j -j +j -1 -1 -j +j -j -1 -j -j -1<br>+j -1 -j -j -1 +j -j -j +1 -1 +1 -j -j +1 -1 +1 +j -1 -1 +j +1 -j +1 +1 -j -1 -1 -1 -j +j -j -1 -1 -j +j -j +1 +j +j +1 -j -1 -j -j -1<br>+j -1 -1 -j +j -j -1 -1 -j +j -j +1 +j +j +1 -j -1 -j -j -1 +j -j +1 -1 +1 -j -j +1 -1 +1 +j -1 -1 +j +1 +j +j +1 -j -1 -j +1 -1<br>+1 +j +j -1 +1 -1 +j -j -1 +j +1 +j -1 -1 +j +1 +1 +1 +j -j +j -1 -1 -j +j -j -1 -j -j -1 +j -1 -j -j -1 +j -1 -1 -j +j -j +1 +1 +j<br>-j +j +1 +j +j +1 -j +1 +j +j +1 -j +j -j -1 +1 -1 -j -j +1 -1 +1 -j +1 +1 -j -1 -j +1 +1 -j -1 +1 +1 +j -j +j +1 +1 +j -j +j -1<br>-j -j -1 +j +1 +j +j +1 -j -j -j +1 -1 +1 -j -j +1 -1 +1 +j -1 -1 +j +1 -j +1 +1 -j -1 -j -j +1 -1 +1 -j -j +1 -1 +1 +j -1 -1 +j +1<br>-j +1 +1 -j -1 +1 +1 -j -j +j +1 +j +j -j -1 -j -j -1 +j +1 +j +j +1 -j -j -j +1 -1 +1 +j -j -1 +1 -1 +j -1 -1 +j +1 +j -1 -1<br>+j +1 +1 +1 +j -j +j -1 -1 -j +j -j -1 -j -j -1 +j -1 -j -j -1 +j -1 -1 -j +j -j +1 +j +j +1 -j +j +1 +j +j +1 -j +1 +j +j +1 -j +j -j -1<br>+1 -1 -j -j +1 -1 +1 -j +1 +1 -j -1 -j +1 +1 -j -1 +1 +1 -j +j +1 +1 +j -j +j -1 -j -j -1 +j +1 +j +j +1 -j -j -j +1 -1 +1 -j -j<br>+1 -1 +1 +j -1 -1 +j +1 -j +1 +1 -j -1 -j -j +1 -1 +1 -j -j +1 -1 +1 +j -1 -1 +j +1 -j +1 +1 -j -1 +1 +1 -j -j +j +1 +1 +j -j<br>+j -1 -j -j -1 +j +1 +j +j +1 -j |

| The Sequence $Seq^8_{left}$, 804(k), to be transmitted from left to right, up to down |
|---|
| -1 +j +1 -1 -j -j +1 -1 +1 -1 -1 -j +j -j -1 -1 -j +j -j +j +j -1 +1 -1 -j +1 +1 -j -1 -1 -j -j -1 +j -1 -j -j -1 +j +j -1 -1 +j +1 +1<br>+1 +j -j +j +j -1 +1 -1 +j -j -1 +1 -1 -1 -1 -j +j +1 +j +j +1 -j -j -1 -1 +j +1 -j -1 +j +1 -1 -j -j -1 +j +j -j -1 +1 -1<br>-1 -1 -j +j -j +1 +1 +j -j +j +j -1 +1 -1 -j +1 -j -1 +1 +j +j +1 -j -1 -j -j -1 +j +1 +1 -j -1 -1 -1 -j +j +j -j -1 +1 -1<br>-j -j +1 -1 +1 -1 -1 -j +j -j +1 +j +j +1 -j -j +1 +1 -j -1 +j -1 -1 +j +1 +1 +j +j +1 -j +j -j -1 +1 -1 +1 +1 +j -j +j +1 +1 +j<br>-j +j -j -j +1 -1 +1 +j -1 -1 +j +1 +1 +j +j +1 -j +j +j +1 -j -j +1 -1 -1 -1 -j +j -j -j -j +1 -1 +1 -j -j +1 -1 +1 +1 +1<br>+j -j +j -1 -j -j -1 +j -j +1 +1 -j -1 +j +1 -j -1 +1 +j +j +1 -j -j -j +1 -1 +1 +1 +j -j +1 -1 -j +j -j -j -j +1 -1 +1 +j -1<br>-1 +j +1 -1 -j -j -1 +j +1 +j +j +1 -j +j -1 -1 +j +1 +1 +1 +j -j +j -j -j +1 -1 +1 +j -j -1 +1 -1 +1 +1 +j -j +j -1 -j -j -1 +j +j<br>-1 -1 +j +1 -j +1 +1 +j -1 -1 -j -j -1 +j -j +j +1 -1 +1 -1 -1 -j +j -j -1 -1 -j +j -j +j -1 +1 -1 -j +1 +1 -j -1 -1 -j -j -1 +j -1<br>-j -j -1 +j +j -1 -1 +j +1 +1 +1 +j -j +j +j -j -1 +1 -1 +j -j -1 +1 -1 -1 -1 -j +j -j +1 +j +j +1 -j +j -1 -1 +j +1 +j -1 -1 +j +1<br>-1 -j -j -1 +j +j +j -1 +1 -1 -1 -1 -j +j -j +1 +1 +j -j +j +j -1 +1 -1 -j +1 +1 -j -1 +j +1 -j -1 -j -j -1 +j +j -j +1 +1 -j<br>-1 -1 -1 -j +j -j +j -j -1 +1 -1 -j -j +1 -1 +1 -1 -1 -j +j -j +1 +j +j +1 -j -j +1 +1 -j -1 -j +1 +1 +j +j +1 -j +1 +1 +j<br>-j +j -j -j +1 -1 +1 -j -j +1 -1 +1 -1 -1 -j +j -j +1 +j +j +1 -j -j +1 +1 -j -1 -j +1 +1 -j -1 -j -j +1 +j +j -1 +1 -1 -1 -1 -j<br>+j -j -1 -j +j -j -j +1 -1 +1 +j -1 -1 +j +1 -j -1 -j -j -1 +j -j -1 -j -j -1 +j -j +1 +1 -j -1 -1 -1 -j +j -j -j -j +1 -1 +1 +j -j -1 +1<br>-1 -1 -1 -j +j -j +1 +j +j +1 -j +j -1 -1 +j +1 -j +1 +1 -j -1 -1 +j +j +1 -j -j -j +1 -1 +1 -1 -1 -1 -j +j -j +1 +1 +j -j -j -j +1<br>-1 +1 +j -1 -1 +j +1 +1 +j +j +1 -j -1 -j -j -1 +j -j -1 -1 +j +1 +1 +j +j -j -j +1 -1 +1 -j -j +1 -1 +1 -1 -1 -1 -j +j -j +1 +1 +j<br>+j +1 -j -j +1 +1 -j -1 -j +1 +1 -j -1 -1 -j -j -1 +j +j -j -1 +1 -1 -1 -1 -j +j -j -1 -1 -j +j -j -j +j +1 -1 +1 +j -1 -1 +j +1 -1 -j<br>-j -1 +j -1 -j -j -1 +j +j +1 -j -1 -1 -1 -j +j -j -j +1 -1 +1 +j -j -1 +1 -1 -1 -1 -j +j -j +1 +j +j -j -1 +j +1 +1 -j -1 +j +1<br>+1 -j -1 +1 +j +j -1 -j -j -j +1 -1 +1 -1 -1 -j +j -j +1 +1 +j -j +j +j -j -1 +1 -1 -1 +j +1 +1 +j +j +1 -j -1 -j -j +j<br>-1 -1 +j +1 |

FIG. 27

| The Sequence Seq$^1_{right}$, 804(k), to be transmitted from left to right, up to down |
|---|
| -j +1 +j +j +1 -j +j -j -1 -1 -1 -j +1 +1 -j +1 -1 +1 -j -j +1 +j -1 -1 +j +1 -1 +1 -j -j +j -1 -j -j -1 -j +j -j -1 -1 -j +1 +j +j +1<br>-j +j -j -1 -1 -1 -j +1 +1 -j +1 -1 +1 -j -j -1 -j +1 +1 -j -1 +1 -1 +j +j -1 +1 +j +j +1 +1 -j +j +1 +1 -j +1 +j +j +1 -j +j -j -1<br>-1 -1 -j +1 +1 -j +1 -1 +1 -j -j +1 +j -1 -1 +j +1 -1 +1 -j -j +j -1 -j -j -1 -j +j -j -1 -1 +j -1 -j -j -1 +j -j +1 +1 +1 +j -1 -1<br>+j -1 +1 -1 +j +j +1 +j -1 -1 +j +1 -1 +1 -j -j +j -1 -j -j -1 -j +j -j -1 -1 -1 -j +1 +1 -j -1 +1 -1 +j +j -j -1 -j -j -1 -j +j -j -1<br>-1 -j +1 +j +j +1 -j +j -j -1 -1 +1 +j -1 -1 +j -1 +1 -1 +j +j -1 -j +1 +1 -j -1 +1 -1 +j +j +j -1 -j -j -1 -j +j -j -1 -1 +j -1 -j -j<br>-1 +j -j +j +1 +1 -1 -j +1 +1 -j +1 -1 +1 -j -j -1 -j +1 +1 -j -1 +1 -1 +j +j -j -1 -j -j -1 -j +j -j -1 -1 -j +1 +j +j +1 -j +j -j -1<br>-1 +1 +j -1 -1 +j -1 +1 -1 +j +j +1 +j -1 -1 +j +1 -1 +1 -j -j -j +1 +j +j +1 +j -j +j +1 +1 -j +1 +j +j +1 -j +j -j -1 -1 +1 +j<br>-1 -1 +j -1 +1 -1 +j +j -1 -j +1 +1 -j -1 +1 -1 +j +j -j -1 -j -j -1 -j +j -j -1 -1 -j +1 +j +j +1 -j +j -j -1 -1 +1 +j -1 -1 +j -1 +1<br>-1 +j +j -1 -j +1 +1 -j -1 +1 -1 +j +j +j -1 -j -j -1 -j +j -j -1 -1 +j -1 -j -j -1 +j -j +j +1 +1 -1 -j +1 +1 -j +1 -1 +1 -j -j -1 -j<br>+1 +1 -j -1 +1 -1 +j +j +j -1 -j -j -1 -j +j -j -1 -1 -j +1 +j +j +1 -j +j -j -1 -1 +1 +j -1 -1 +j -1 +1 -1 +j +j +1 +j -1 -1 +j +1<br>-1 +1 -j -j -j +1 +j +j +1 +j -j +j +1 +1 -j +1 +j +j +1 -j +j -j -1 -1 +1 +j -1 -1 +j -1 +1 -1 +j +j -j +1 +j +j +1 -j +j -j -1 -1<br>-1 -j +1 +1 -j +1 -1 +1 -j -j +j +1 -j -1 +j +1 -1 +1 -j -j +j -1 -j -j -1 -j +j -j -1 -1 -j +1 +j +j +1 -j +j -j -1 -1 -1 -j +1 +1 -j<br>+1 -1 +1 -j -j -1 -j +1 +1 -j -1 +1 -1 +j +j -j +1 +j +j +1 +j -j +j +1 -1 +j +1 +j +1 -j +j +1 -j -1 -1 -1 -j +1 +1 +j +1 -1 +1 -j<br>-j +1 +j -1 -1 +j +1 -1 +1 -j -j +j -1 -j -j -1 -j +j -j -1 -1 +j -1 -j -j -1 +j -j +j +1 +1 +1 +j -1 -1 +j -1 +1 -1 +j +j +j -j -1 -1<br>+j +1 -1 +1 -j -j +j -1 -j -j -1 -j +j -j -1 -1 +1 +j -1 -1 +j +1 -1 +1 -j -j -j +1 +j +j +1 +j -j +j +1 +1 -j -j -j -1 -j -j +j +j +1<br>+1 -1 -j +1 +1 -j +1 -1 +1 -j -j -j +1 +j -1 -1 +j +1 -1 +1 -j -j -j +1 +j +j +1 +j -j +j +1 +1 -j +1 +j +j +1 -j +j -j -1 -1 +1 +j<br>-1 -1 +j -1 +1 -1 +j +j +1 +j -1 -1 +j +1 -1 +1 -j -j -j +1 +j +j +1 +j -j +j +1 +1 +j -1 -j -j -1 +j -j +j +1 +1 -1 -j +1 +1 -j<br>+1 -1 +1 -j -j -1 -j +1 +1 -j -1 +1 -1 +j +j +j -1 -j -j -1 -j +j -j -1 -1 +j -1 -j -j -1 +j +j +1 +1 -1 -j +1 +1 -j +1 -1 +1 -j<br>-j +1 +1 +j -1 |

| The Sequence Seq$^2_{right}$, 804(k), to be transmitted from left to right, up to down |
|---|
| -j +1 +j +j +1 +j -1 -j -j -1 -1 -j +1 +1 -j +1 +j -1 -1 +j +j -1 -j -j -1 -j +1 +j +j +1 -1 -j +1 +1 -j +1 +j -1 -1 +j -j +1 +j +j<br>+1 -j +1 +j +j +1 +1 +j -1 -1 +j +1 +j -1 -1 +j +j -1 -j -j -1 +j -1 -j -j -1 +1 +j -1 -1 +j +1 +j -1 -1 +j -1 +1 -1 +j +j +1 -1<br>+1 -j -j +j -j +j +1 +1 -j +j -j -1 -1 -1 +1 -1 +j +j +1 -1 +1 -j -j +j -j -1 -1 +j +j +1 -1 +1 -1 -1 +j +j -j +1 -1 -1 +j +j -j<br>+j -j -1 -1 -j +j -j -1 -1 -1 +1 -1 +j +j -1 +1 -1 +j +j +j -j +1 +1 +j -j +j +1 +1 -j +1 +j +1 +j -1 -1 +j +j -1 -j -j -1<br>-j +1 +j +j +1 +1 +j -1 -1 +j -1 -j +1 +1 -j +j -1 -j -j -1 -j +1 +j +j +1 -1 -j +1 +1 -j +1 +j -1 -j +1 +1 -j +j +j +1 -j +j +j<br>+1 +1 +j -1 -1 +j +1 +j -1 -1 +j +1 +j +j +1 -j +1 +j +j +1 -j -j +j +1 -j +j -1 -1 +1 -1 +1 -j -j -1 +1 -1 +j +j +j -j<br>+j +1 +1 -j +j -j -1 -1 -1 +1 -1 +j +j +1 -1 +1 -j -j +j -j +j +1 +1 -j +j +j +1 +1 -1 +1 -1 +j +j -1 +1 -1 +j +j +j -j +j +1 +1<br>+j -j +j +1 +1 +1 -1 +1 -j -j +1 -1 +1 -j -j -1 -j +1 +1 +j +1 +j -1 -1 +j -j -1 -j -j -1 +j +1 +j +j +1 +1 -j -1 -j -1 +j +1 +1<br>-j +j -1 -j -j -1 -j +1 +j +j +1 -1 -j +1 +1 -j +1 +1 -j -1 +j +1 +j +j +1 +j -1 -1 +j +1 -j -1 +j +j +1 +j<br>+j +1 -j +1 +j +j +1 +j -j +j +1 +1 -j +j -j -1 -1 +1 -1 +1 -j -j -1 +1 -1 +j +j +j -j +j +1 +1 +j -j -1 -1 +1 -1 +j +j +1<br>-1 +1 -j -j +j -j +j +1 +1 +j -j +j +1 +1 -1 -1 +j -j -1 +1 -1 +j +j +j -j +j +1 +1 +j -j +j +1 +1 -1 -1 +j -j +1 -1 +1 -j<br>-j -j +1 +j +j +1 +j -1 -j -j -1 -j +1 +1 +j -1 -j +j -j -1 -1 +1 -1 +1 -j -j -1 +1 -1 +j +j +j -j +j +1 +1 -1 -1 +j -j +1 +j<br>+j +1 -j +1 +j +j +1 +1 +j -1 -1 +j +1 +j -1 -1 +j -j -1 -j -j -1 +j -1 -j -j -1 +1 +j -1 -1 +j +1 +j -1 -1 +j +1 -1 +j -1 +1 +j +j +1<br>-1 +1 -j -j +j -j +j +1 +1 +j -j -j -1 -1 +1 -1 +j +j +1 -1 +1 -j -j +j -j -1 -1 +j +j +1 -1 +1 -1 -1 +j +j -j +1 -1 -1 +j +j<br>-j +j -j -1 -1 -j +j -j -1 -1 -1 +1 -1 +j +j -1 +1 -1 +j +j +j -j +1 +1 +j -j +j +1 +1 -1 +j -1 +j +1 +1 -j -j +1 +j +j<br>+1 +j -1 -j -j -1 -j +1 +1 -j +1 -j +1 +j -1 -1 +j +j -1 -j -j -1 +j -1 -j -j -1 +1 +j -1 -1 +j +1 +j -1 -1 +j -1 -j +j -1 -j<br>-j -1 -1 -j +1 +1 -j -1 -j +1 +1 -j +j -1 -j -j -1 -j +1 +j +j -1 -1 +j +j +1 +1 -1 -1 +j +j -1 -1 +j -j +1 -1 +1 -j -j -j +j<br>-1 -1 +j -j +j +1 +1 +1 -1 +1 -j -j -1 +1 -1 +j +j -j -j -1 -1 +j -j -1 -1 +1 -1 +1 -j -j +1 -1 +j -j -j -j +j -j -1 -j +j -j<br>-1 -1 -1 +1 -1 +j +j -1 +1 -1 +j +j +j +j +j -j |

FIG. 28

| The Sequence $Seq^3_{right}$, 804(k), to be transmitted from left to right, up to down |
|---|
| +1 +j -1 -1 +j +1 -1 +1 -j -j +j -1 -j -j -1 +j -j +j +1 +1 -1 -j +1 +1 -j +1 -1 +1 -j -j -j +1 +j +j +1 +j -j +j +1 +1 -j +1 +j <br> +j +1 -j +j -j -1 -1 -1 -j +1 +1 -j -1 +1 -1 +j +j -j +1 +j +j +1 +j -j +j +1 +1 -1 -j +1 +1 -j +1 -1 +1 -j -j -1 -j +1 +1 -j -1 <br> +1 -1 +j +j +j -1 -j -j -1 +j -j +1 +1 +1 +j -1 -1 +j -1 +1 -1 +j +j -j +1 +j +j +1 +j -j +j +1 +1 +j -1 -j -j -1 +j -j +1 <br> +1 -1 -j +1 +1 -j -1 +1 -1 +j +j +j -1 -j -j -1 -j +j -j -1 -1 -1 -j +1 +1 -j +1 -1 +1 -j -j -j +1 +j +j +1 +j +j -j -1 -1 +1 +j -1 <br> -1 +j +1 -1 +1 -j -j +j -1 -j -j -1 -j +j -j -1 -1 -1 -j +1 +1 -j +1 -1 +1 -j -j -1 -j +1 +1 -j -1 +1 -1 +j +j -j -1 -j -j -1 +j -j +j <br> +1 +1 -1 -j +1 +1 -j +1 -1 +1 -j -j +j -1 -j -j -1 +j -j -1 -1 +j -1 -j -j -1 +j +j +1 +1 +1 +j -1 -1 +j -1 +1 -1 +j -j -j +1 <br> +j +j +1 +j -j +j +1 +1 -1 -j +1 +1 -j +1 -1 +1 -j -j +j -1 -1 +j +1 -1 +1 -j -j +j -1 -j -j -1 +j -j +j +1 +1 +1 +j -1 -1 +j - <br> 1 +1 -1 +j +j +j -1 -j -j -1 -j +j -j -1 -1 -1 -j +1 +1 -j -1 +1 -1 +j -j +j +1 +j +j +1 -j +j -j -1 -1 +1 +j -1 -1 +j -1 +1 -1 +j +j <br> +j -1 -j -j -1 -j +j -j -1 -1 +j -1 -j -j -1 +j +j +j +1 +1 +1 +j -1 -1 +j +1 -1 +1 -j -j +j -1 -j -j -1 +j -j +j -1 -1 +1 +j -1 -1 +j <br> -1 +1 -1 +j +j +1 +j -1 -1 +j +1 -1 +1 -j -j -j +1 +j +j +1 -j +j -j -1 -1 -1 -j +1 +1 -j +1 -1 +1 -j -j +j -1 -j -j -1 -j +j -j -1 -1 <br> -j +1 +j +j +1 -j +j -j -1 -1 +j +1 -1 -1 +j +1 -1 +1 -j -j -j +1 +j +j +1 +j -j +j +1 +1 +1 +j -1 -1 +j -1 +1 -1 +j +j -j -1 -j +1 <br> +1 -j -1 +1 -1 +j +j -j +1 +j +j +1 -j +j -j -1 -1 +1 +j -1 -1 +j -1 +1 -1 +j +j -j -1 -j -j -1 +j -j -1 -1 +j -1 -j -j -1 +j -j <br> +1 +1 +1 +j -1 -1 +j +1 -1 +1 -j -j +j -1 -j -j -1 -j +j -j -1 -1 +j -1 -1 +j -1 +1 -1 +j +j +j -1 -1 +j +1 -1 +1 -j -j -j +1 <br> +j +j +1 -j -j -1 -1 -1 -j +1 +1 -j +1 -1 +1 -j -j +j -1 -j -j -1 -j +j -1 -1 +j +j +j +1 +j -j +j +1 +1 -1 +1 +j -1 -1 +j +1 <br> -1 +1 -j -j -j +1 +j +j +1 +j -j +j +1 +1 +1 +j -1 -1 +j -1 +1 -1 +j +j -j +1 +j +j +1 +j -j -1 -1 +j -1 -1 +j +1 -1 +1 -j <br> -j +j -1 -j -j -1 +j +j -j -1 -1 -j +1 +1 -j +1 -1 +1 -j -j -1 -j +1 +1 -j -1 +1 -1 +j +j -j -1 -j -j -1 +j -j +j +1 +1 -1 -j +1 +1 <br> -j +1 -1 +1 -j -j +j -1 -j -j -1 -j +j -j -1 -1 +j -1 -j -j -1 +j -j +j +1 +1 +1 +j -1 -1 +j -1 +1 -1 +j -j -j +1 +j +j +1 +j -j +j +1 <br> +1 -1 -j +1 +1 -j +1 -1 +1 -j -j +j +1 +j -1 -1 +j +1 -1 +1 -j -j +j -1 -j -j -1 +j -j +j +1 +1 +1 +j -1 -1 +j -1 +1 -1 +j +j +j -1 <br> -j -j -1 -j +j -j -1 -1 -1 +1 -1 -j |

| The Sequence $Seq^4_{right}$, 804(k), to be transmitted from left to right, up to down |
|---|
| +1 +j -1 -1 +j -1 -j +1 +1 -j -1 +1 -1 +j +j +1 -1 +1 -j -j +j -1 -j -j -1 -j +1 +j +j +1 -j +j -j -1 -1 +j -j +j +1 +1 +j -1 -j -j <br> -1 +j -1 -j -j -1 -j +j -j -1 -1 -j +j -j -1 -1 +j +j -1 -1 +j +1 +j -1 -1 +j -1 +1 -1 +j +j -1 +1 -1 +j +j +j -1 -j -j -1 +j +j +j <br> +1 +j -j +j +1 +1 -j +j -j -1 -1 +1 +j -1 -1 +j -1 -j +1 +1 -j +1 -1 +1 -j -j -1 +1 -1 +j +j -1 -j +1 +1 -j -1 +j +1 -j -1 +1 <br> -1 +j +j -1 +1 -1 +j +j -j +1 +j +j +1 -j +1 +j +j +1 -j +j -j -1 -1 -j +j -j -1 -1 -j +1 +j +j +1 +j -1 -j -j -1 +j -j +j +1 -j <br> +j -j -1 -1 +1 +j -1 -1 +j -1 -j +1 +1 -j -1 +1 -1 +j +j +1 -1 +1 -j -j +j -1 -1 +j +j -1 -1 -j -1 -1 +j +j -j -1 +1 -1 +j <br> +j -j +1 +j +j +1 -j +1 +j +j +1 -j +j +1 +1 +j -j +j +1 +1 +1 +j -1 -1 +j -1 -j +1 +j -1 -1 +1 -j -j -1 +1 -1 +j +j -j +1 <br> +j +j +1 +j -1 -j -j -1 +j +j -j -1 -1 +j -j +j +1 +1 +j -1 -j -j -1 +j -1 -j -j -1 +j -j +j +1 +1 +j -j +j +1 +1 -1 -j +1 +j -1 -j <br> +1 +1 -j -1 +1 -1 +j +j -j +1 -1 -j +j -1 -j +1 +1 -j +1 -j +1 -1 +1 +j -1 -1 +1 -1 +j +j -j +1 +j +j +1 +j -1 -j -j -1 <br> +j -j +j +1 +1 -j +j -j -1 -1 +j +1 +j +j +1 -j +1 +j +j +1 +j -j +1 +1 +j -j +j +1 +1 -1 -j +1 +1 -j +1 +1 -j +1 +1 -j +1 -1 +1 <br> -j -j +1 -1 +1 -j -j +1 +j +j +1 +j -1 -j -j -1 +j +j -1 -1 +j +j +1 +1 -1 -j +1 +1 -j +1 -1 +1 -j +1 -1 +j +j +1 -1 <br> +1 -j -j +1 +j -1 -1 +j +1 +j -1 -1 +j +1 -1 +1 +j +j +1 -1 +1 -j -j +j -1 -j -j -1 +j -j +j +1 +1 +j -j +j +1 +1 -1 <br> -j +1 +1 -j +1 +j -1 -1 +j +1 -1 +1 -j -j -1 +1 -1 +j +j -j +1 +j +j +1 +j -j -j -1 -j +1 +j +j +1 <br> -j +1 +j +j +1 +j -j +j +1 +1 +j +j -1 -j +1 -j +1 +j -1 +j +1 -1 +1 -j -j +1 -1 +1 -j -j -j +1 +j +j +1 -j -1 -j <br> -j -1 -j +j -j -1 +j +j +j +1 +1 -j +j +1 +1 -j +j -1 -1 +j +j -1 -1 +j +j -1 -1 +j +j -1 -1 +j +j -1 -1 +j +1 -1 -1 +j +j -1 <br> +1 -j -j +1 -1 +1 -j -j +j -j -j -1 +j +j +1 +1 +j -j +j +1 +1 +j -1 -j -j -1 -j +j +j +1 -j +j <br> -j -1 -1 +1 +j -1 -1 +j -j +1 +1 -j -1 +1 -1 +j +j -1 +1 -j +j +j -1 -1 +j +1 -1 +1 -1 +j +j -1 +1 -1 +j +j <br> -j +1 +j +j +1 +j +j +1 +j +j +1 +j +j +1 +1 -j +1 -j -j -1 +j +1 +j +1 -1 +1 -j -j -1 +1 -1 +j +j -j +1 +j <br> +j +1 +j -1 -j -j -1 -j +j -j -1 +j +1 +1 +j -1 -j -j -1 -j +j +1 +1 +j -j +j +1 +1 -1 -j +1 -j -1 -j <br> +1 +1 -j -1 +1 -1 +j +j -1 +1 -1 +j +j +1 +1 -1 -j |

FIG. 29

| The Sequence Seq$^5_{right}$, 804(k), to be transmitted from left to right, up to down |
|---|
| +1 +1 +j -j +j +1 +1 +j -j +j -1 -1 -j +j -j +1 +1 +j -j +j -j -1 -1 +j +1 +j -1 -1 -j +j +1 -j +1 +1 -1 -j +j -1 -1 -j +j +1 -1 +1 +1 +j<br>-j +j -1 -1 -j +j -j -1 -1 -j +j -j -j -1 -1 -j +j -j -j +1 +1 -j -1 +j -1 -1 +j +1 +j -1 -1 +j +1 +j -1 -1 +j +1 -j +j -1 +1 -1 +j +j -1<br>+1 -1 +j +j -1 +1 -1 -j -j +1 -1 +1 -1 -j -j -1 +j -1 -j -j -1 +j -1 -j -j -1 +j +1 +j +j +1 -j +j +j -1 +1 -1 -j -j +1 -1 +1 +j +j<br>-1 +1 -1 +j +j -1 +1 -1 -1 +1 +j +j +1 -j -1 -j -j -1 +j +1 +j +j +1 -j +1 +j +j +1 -j -j -j +1 -1 +1 -j -j +1 -1 +1 +j +j -1 +1 -1<br>-j -j +1 -1 +1 +1 +j +j +1 -j +1 +j +j +1 -j -1 -j -j -1 +j +1 +j +j +1 -j -j -j +1 -1 +1 +j +j -1 +1 -1 -1 +j +j -1 +1 -1 +j +j -1<br>+1 -1 -1 -j -j -1 +j +1 +j +j +1 -j +1 +j +j +1 -j +1 +j +j +1 -j +1 +1 +j -j +j +1 +1 +j -j +j +1 +1 +j -j +j -1 -1 -j +j -j +j<br>-1 -1 +j +1 +j -1 -1 +j +1 +j -1 -1 +j +1 -j +1 +1 -1 -1 +1 +1 +j -j +j -1 -1 -j +j -j +1 +1 +j -j +j +1 +1 -j +j -j +j +1 +1 -j<br>-1 +j -1 -1 -j +1 -j +1 +1 -j -1 -j +1 +1 -j -1 -j -j +1 -1 +1 -j -j +1 -1 +1 +j +j +1 -j +1 +j<br>+j +j -1 -j -j -1 +j +1 +j +j +1 -j -j +1 -1 +1 +j +j -1 +1 -1 +j +j -1 +1 -1 -j -j -1 +j +1 +j +j +1 -j +1<br>+j +j +1 -j +1 +j +j +1 -j +1 +1 +j -j +j +1 +1 +j -j +j +1 +1 +j -j +j -1 -1 -j +j -j +j -1 -1 +j +1 +j -1 -1 +j +1 +j -1 -1 +j<br>+1 -j +1 +1 -j -1 +1 +1 +j -j +j -1 -1 -j +j -j +1 +1 +j -j +j +1 +1 +j -j +j +1 +1 -j -1 +j -1 -1 +j +1 -j +1 +1 -j -1 +j +1<br>+1 -j -1 +1 +1 +j -j +j +1 +1 +j -j +j -1 -1 -j +j -j +1 +1 +j -j +j -1 -1 +j +1 +j -1 -1 +j +1 +j +1 -j -1 -1 +j +1<br>+1 +1 +j -j +j -1 -1 -j +j -j -1 -1 -j +j -j -1 -1 -j +j -j +1 +1 -j -1 +j -1 -1 +j +1 +j -1 -1 +j +1 -j -1 -1 +j +1 +j -1 +1<br>-1 +j +j -1 +1 -1 +j +j -1 +1 -1 -j -j +1 -1 +1 -1 -j -j -1 +j -1 -j -j -1 +j -1 -j -j -1 +j +1 +j +j +1 -j +j -1 +1 -1 -j -j +1 -1<br>+1 +j +j -1 +1 -1 +j +j -1 +1 -1 +1 +j +j +1 -j -1 -j -j -1 +j +1 +j +j +1 -j +1 +j +j +1 -j +j -1 +1 -1 +j +j -1 +1 -1 -j -j<br>+1 -1 +1 +j +j -1 +1 -1 -1 -j -j -1 +j -1 -j -j -1 +j +1 +j +j +1 -j -1 -j -j -1 +j +j -1 +1 -1 -j -j +1 -1 +1 -j -j +1 -1 +1 -j -j<br>+1 -1 +1 +1 +j +j +1 -j -1 -j -j -1 +j -1 -j -j -1 +j -1 -j -j -1 +j -1 -1 -j -j -1 -1 -j +j -j +1 +1 +j -j +j -j +1 +1<br>-j -1 -j +1 +1 -j -1 -j +1 +1 -j -1 +j -1 -1 +j +1 -1 -1 -j +j -j +1 +1 +j -j +j -1 -1 -j +j -j -1 -1 -j +j -j -1 -1 +j +1 -j +1 +1<br>-j -1 +j -1 -1 +j +1 +j -1 -1 +j +1 +j -1 +1 +1 |

| The Sequence Seq$^6_{right}$, 804(k), to be transmitted from left to right, up to down |
|---|
| -1 -j -j -1 +j +j -1 -1 +j +1 +1 +j +j +1 -j +j -1 -1 +j +1 -j +1 +1 -j -1 -1 -j -j -1 +j +j -1 -1 +j +1 -1 -j -j -1 +j -1 -1 -j +j -j<br>+j +j -1 +1 -1 -1 -j +j -j -j -j +1 -1 +1 -j -j +1 -1 +1 -1 -1 -j +j -j -j -j +1 -1 +1 +1 +1 +j -j +j -j +1 +1 -j -1 +1 +j +j +1<br>-j +j -1 -1 +j +1 +1 +j +j +1 -j -1 -j -j -1 +j +j +1 -1 -1 +j +j +1 -j -j +1 +1 -1 -j -j +1 -1 +1 +1 +1 +j -j +j -j -j +1<br>-1 +1 -1 -1 -j +j -j -j -1 -1 -j +j -j -j -j +1 -1 +1 -1 -1 -j +j -j +j -1 +1 -1 +j -1 -1 +j +1 +1 +j +j +1 -j -j +1 +1 -j -1 +1 +j<br>+j +1 -j -1 -j -j -1 +j +j -1 -1 +j +1 +1 +j +j +1 -j +j -1 -1 +j +1 +j +j -1 +1 -1 +1 +1 +j -j +j +j +j -1 +1 -1 -1 -1 -j +j -j -<br>1 -1 -j +j -j +j +j -1 +1 -1 -1 -1 -j +j -j -j -j +1 -1 +1 -1 -j -j -1 +j -j +j +1 -j -1 +1 +j +j +1 -j -j +1 +1 -j -1 +j -1 -1 +j +1<br>-1 -j -j -1 +j -j +1 +1 -j -1 -1 -j -j -1 +j -1 -1 -j +j -j -j -j +1 -1 +1 -1 -1 -j +j +j +j -1 +1 -1 +j -1 +1 -1 -1 -1 -j +j -j +j<br>+j -1 +1 -1 +1 +1 +j -j +j +j -1 -1 +j +1 +1 +j +j +1 -j -1 +j +1 -1 -1 +j +j +1 -j -1 -j -j -1 +j +j -1 -1 +j +1 +1 +j +j +1<br>-j +j -1 -1 +j +1 +j +j -1 +1 -1 +1 +1 +1 +j +j +j +j +j -1 +1 -1 -1 -1 -j +j -j -1 -1 +j +j +j -j -1 +1 -1 -1 -1 -j +j -j -j +1 -1<br>+1 -1 -j -j -1 +j -j +1 +1 -j -1 +1 +j +j +1 -j -j +1 -1 -j -1 -1 +j +1 -1 -j -j -1 +j -j +1 +1 -j -1 -1 -j -j +1 -1 -1 -j +j -1 -1 -j +j<br>-j -j -j +1 -1 +1 -1 -1 -j +j -j +j -1 +1 -1 +j -1 -1 -1 -1 -j +j -j +j -1 +1 -1 +1 +1 +j -j +j -1 -j -j -1 +j -j -1 -1<br>+j +j +1 +1 +j +j +1 -j +j -1 -1 +j -1 +j +1 -1 -j -1 -j -j -1 +j -j -1 -1 +j -1 -j -j -1 +j -1 -1 -j +j +j +j -1 +1 -1 -1 -1<br>-j +j -j -j -j +1 -1 +1 -j -j +1 -1 +1 -1 -1 -j +j -j -j -j +1 -1 +1 +1 +1 +1 +j -j +j +j +1 -1 +1 -1 +1 +j +j +1 -j +j -1 -1 +j +1 +1<br>+j +j +1 -j -1 -j -j +1 +1 -j -1 +1 +j +j +1 -j -j +1 -1 -j -j +1 -1 +1 +1 +1 +j +j +j -j -j +1 -1 +1 -1 -1 -j +j -j<br>-1 -1 -j +j -j -j -j +1 -1 +1 -1 -1 -j +j -j -j +j -1 +1 -1 -j +1 +j -1 -1 -j -j -j +1 -1 +j +1 -1 -j -j -1 +j +1 +j +j -1 -j<br>-j +j +1 -j -1 -1 -j -j -1 +j -j +1 +1 -j -1 -j -j +1 -1 +1 -1 -1 -j +j -j -j -j +1 -1 +1 +1 +1 +j -j +j +1 +1 +j -j -j +j +1 -1<br>+1 +1 +1 +j -j +j +j +j -1 +1 -1 +1 +j +j +1 -j +j -1 -1 +j +1 -1 -j -j -1 +j -j -1 -1 +j +1 +j +1 -j -1 +1 +j +j +1 -j +j -1<br>-1 +j +1 +1 +j +j +1 -j +1 +1 +j -j +j +j -1 +1 -1 -1 +1 +j -j +j -j +1 -1 +j +j -1 +1 +1 +1 +j -j +j -j +1 -1 +1<br>-1 -1 -j +j -j -1 -j +1 +1 |

FIG. 30

| The Sequence $Seq^7_{right}$, 804(k), to be transmitted from left to right, up to down |
|---|
| +j +j -1 +1 -1 -j -j +1 -1 +1 -j +1 +1 -j -1 -j +1 +1 -j -1 -1 -1 -j +j -j +1 +1 +j -j +j +1 +j +j +1 -j +1 +j +j +1 -j -1 -1 -j +j<br>-j +1 +1 +j -j +j +1 +j +j +1 -j +1 +j +j +1 -j +j +j -1 +1 -1 -j -j +1 -1 +1 -j +1 +1 -j -1 -j +1 +1 -j -1 -1 -1 -j +j -j -1 -1 -j<br>+j -j +1 +j +j +1 -j -1 -j -j -1 +j +j +j -1 +1 -1 +j +j -1 +1 -1 -j +1 +1 -j -1 +j -1 -1 +j +1 -j -j +1 -1 +1 -j -j +1 -1 +1 +j -1<br>-1 +j +1 -j +1 +1 -j -1 +1 +1 +j -j +j +1 +1 +j -j +j -1 -j -j -1 +j +1 +j +j +1 -j +1 +1 +j -j +j -1 -1 -j +j -j -1 -j -j -1 +j -1<br>-j -j -1 +j +j +j -1 +1 -1 -j -j +1 -1 +1 -j +1 +1 -j -1 -j +1 +1 -j -1 +j +j -1 +1 -1 -j -j +1 -1 +1 -j +1 +1 -j -1 -j +1 +1 -j -1<br>+1 +1 +j -j +j -1 -1 -j +j -j -1 -j -j -1 +j -1 -j -j -1 +j +j +j -1 +1 -1 +j -j -1 +1 -1 -j +1 +1 -j -1 -j -1 -1 +j +1 +1 +1 +j -j<br>+j +1 +1 +j -j +j -1 -j -j -1 +j +1 +j +j +1 -j -1 -1 -j +j -j -1 -1 -j +j -j +1 +j +j +1 -j -1 -j -j -1 +j -j -j +1 -1 +1 -j -j +1 -1<br>+1 +j -1 -1 +j +1 -j +1 +1 -j -1 -j -j +1 -1 +1 +j +j -1 +1 -1 +j -1 -1 +j +1 +j -1 -1 +j +1 +1 +1 +j -j +j -1 -1 -j +j -j -1 -j<br>-j -1 +j -1 -j -j -1 +j +1 +1 +j -j +j -1 -1 -j +j -j -1 -j -j -1 +j -j -j +1 -1 +1 +j +j -1 +1 -1 +j -1 -1 +j +1 +j -1<br>-1 +j +1 +1 +1 +j -j +j +1 +1 +j -j +j -1 -j -j -1 +j +1 +j +j +1 -j -j -j +1 -1 +1 -j -j +1 -1 +1 +j -1 -1 +j +1 -j +1 +1 +j -1<br>+j +j -1 +1 -1 +j -j -1 +1 -1 -j +1 +1 -j -1 -j +1 -1 -1 -j +j -j -1 -j +j -j +1 +j +j +1 -j -1 -j -j -1 +j -j -j +1 -1<br>+1 +j +j -1 +1 -1 +j -1 -1 +j +1 +j -1 -1 +j +1 +1 +1 +j -j +j -1 -1 -j +j -j -1 -j -j -1 +j -1 -j -j -1 +j +1 +1 +j -j +j -1 -1 -j<br>+j -j -1 -j -j -1 +j -1 -j -j -1 +j -j -j +1 -1 +1 +j +j -1 +1 -1 +j -1 -1 +j +1 -j -1 -1 +j +1 +1 +1 +j -j +j +1 +1 +j -j +j -1 -j<br>-j -1 +j +1 +j +j +1 -j -j -j +1 -1 +1 -j -j +1 -1 +1 +j -1 -1 +j +1 -j +1 +1 +j -1 -1 +j -1 -1 +j +1 -j -1 -1 +j -1 -1 -j +1 +1 -j -1<br>+j -1 -1 +j +1 -1 -1 -j +j -1 -1 -j +j -j +1 +j +j +1 -j -1 -j -j -1 +j +1 +1 +j -j +j -1 -1 -j +j -j -1 -j -1 -j -j -1 +j +j<br>+j -1 +1 -1 -j -j +1 -1 +1 -j +1 +1 -j -1 -j +1 +1 -j -1 -1 -1 -j +j -1 +1 -1 +j +1 +1 -j -1 -j +1 +1 -j -1 +1 +1 +j -j<br>+j -1 -1 -j +j -j -1 -j -j -1 +j -1 -j -j -1 +j +j +j -1 +1 -1 +j -j -1 +1 -1 -j +1 -1 -j -1 -1 +j +1 +1 +1 +j -j +j +1 +1 +j<br>-j +j -1 -j -j -1 +j +1 +j +j +1 -j -1 -1 -j +j -j -1 -1 -j +j -j +1 +j +j +1 -j -1 -j -j -1 +j -j -j +1 -1 +1 -j -j +1 -1 +1 +j -1 -1<br>+j +1 -j +1 +1 -j -1 +j -j -1 -j |

| The Sequence $Seq^8_{right}$, 804(k), to be transmitted from left to right, up to down |
|---|
| +1 +1 +j -j +j -j -j +1 -1 +1 +j +j -1 +1 -1 +1 +1 +j -j +j +1 +j +j +1 -j -j +1 +1 -j -1 +j -1 -1 +j +1 +1 +j +j +1 -j +j -j -1<br>+1 -1 -1 -1 -j +j -j +1 +1 +j -j +j +j -1 +1 -1 +j -1 -1 +j +1 -1 -j -j -1 +j +1 +j +j +1 -j +j -1 -1 +j +1 -1 -1 -j +j -j -j<br>+1 -1 +1 -j -j +1 -1 +1 +1 +1 +j -j +j +1 +j +j +1 -j +j -1 -1 +j +1 -j -1 -1 +j -1 -j -j -1 +j -j -j +1 -1 +1 -1 -1 -j +j -j<br>-1 -1 -j +j -j +j +j -1 +1 -1 -j +1 -1 +1 +1 +j +j +1 -j +1 +j +j +1 -j -j +1 +1 -j -1 -j -j -1 +1 -1 -1 -j +j -j +1 +1 +j<br>-j +j -j -j +1 -1 +1 +j +1 +1 -j -1 -j -j -1 +j +1 +j +j +1 -j -j +1 +1 -j -1 +1 +j -j +j +j -1 +1 -1 -j -j +1 -1 +1 +1 +1<br>+j -j +j +1 +j +j +1 -j +j -1 -1 +j +1 -j +1 +1 -j -1 +j +j +1 -j +j -j -1 +1 -1 -1 -1 -j +j -j -1 -j +j -j -j +1 -1 +1 -j<br>+1 +1 -j -1 +1 +j +j +1 -j +1 +j +j +1 -j +j -1 -1 +j +1 -1 -1 -j +j -j +j -1 +1 -1 +j +j -1 +1 -1 +1 +1 +j -j +j +1 +j +j<br>+1 -j -j +1 +1 -j -1 -j +1 +1 -1 -1 -j -j -1 +j -1 -1 -j +j -j +j -1 +1 -1 -j -j +1 -1 +1 -1 -1 -1 -j +j -j -1 -j -j -1 +j +j -1 -1<br>+j +1 -j +1 +1 -j -1 -1 -j -j -1 +j -j -j +1 -1 +1 +1 +1 +j -j +j -1 -1 +j -j -j +1 -1 +1 +j -1 +1 +j +j +1 -j -1 -j<br>-j -1 +j -j +1 +1 -j -1 +1 +1 +j -j +j +j -1 +1 -1 +j -1 +1 -1 -1 -1 -j +j -j -1 -j -j -1 +j -j +1 +1 -j -1 +j +1 +1 -j -1 +1<br>+j +j +1 -j +j -1 -1 +1 -1 +1 +j -j +j +1 +1 +j -j +j -j -j +1 -1 +1 -j +1 +1 -j -1 -j -j -1 +j -1 -j -j -1 +j +j -1 -1 +j +1<br>-1 -1 -j +j -j +j -1 +1 -1 -j -j +1 -1 +1 -1 -1 -j +j -j -1 -j -j -1 +j +j -1 -1 +j +1 -j +1 +1 +j -1 -1 -j -j -1 +j -j -j +1 -1 +1<br>+1 +1 +j -j +j -1 -1 -j +j -j -j +1 -1 +1 +j +1 +1 -j -1 +1 +j +j +1 -j -1 -j -j -1 +j -1 -1 +j +1 +j +j +j -1 +1<br>-1 +j +j -1 +1 -1 -1 -1 -j +j -j -1 -j -j -1 +j +j +1 -j -1 +j +1 -j -1 -1 +j +j -1 +j +j -1 +1 -1 +1 +1 +j -j +j +1 +1<br>+j -j +j -j -j +1 -1 +1 -j +1 +1 -j -1 -1 -j -j -1 +j -1 -j -j -1 +j +j -1 -1 +j +j -1 +1 -1 -1 -1 -j +j -j -1 +1 +j -j +j -j -j<br>+1 -1 +1 -j +1 +1 -j -1 -1 -j -j -1 +j +1 +j +j +1 -j -j +1 +1 -j -1 +1 +1 +j -j +j +j -1 +1 -1 -1 -j -j +1 -1 +1 +1 +1 +j -j +j<br>+1 +j +j +1 -j +j -1 -1 +j +1 -j +1 +1 -j -1 +1 +j +j +1 -j +j -j -1 +1 -1 -1 -1 -j +j -j -1 -j -j -1 +j +j -j -j +1 -1 +1 -j +1 +1 -j<br>-1 +1 +j +j -j +1 +j +j +1 -j +j -1 -1 +j -1 -1 -j +j -j +j +j -1 +1 -1 -1 +1 +1 +j -j +j +1 +j +j +1 -j +1 -j +1<br>+1 -j -1 -j +1 +1 -j -1 -1 -j -j -1 +j -1 -1 +j -1 |

FIG. 31

| CP | IDFT(OFDM EDMG CEF) |

FIG. 32

| CP | CP | IDFT(OFDM EDMG CEF) | IDFT(OFDM EDMG CEF) |
|---|---|---|---|
| CP | IDFT(OFDM EDMG CEF) | CP | IDFT(OFDM EDMG CEF) |

FIG. 33

| CP | IDFT(OFDM EDMG CEF or good PAPR sequence) | CP | IDFT(OFDM EDMG CEF or good PAPR sequence) |

FIG. 34

| CP | IDFT(OFDM EDMG CEF) | CP | IDFT(OFDM EDMG CEF) | CP | IDFT(OFDM EDMG CEF) |
|----|---------------------|----|---------------------|----|---------------------|
| CP | IDFT(OFDM EDMG CEF) | CP | CP | IDFT(OFDM EDMG CEF) | IDFT(OFDM EDMG CEF) |
| CP | IDFT(OFDM EDMG CEF) | IDFT(OFDM EDMG CEF) | | CP | CP | IDFT(OFDM EDMG CEF) |
| CP | CP | IDFT(OFDM EDMG CEF) | IDFT(OFDM EDMG CEF) | CP | IDFT(OFDM EDMG CEF) |
| CP | CP | IDFT(OFDM EDMG CEF) | CP | IDFT(OFDM EDMG CEF) | IDFT(OFDM EDMG CEF) |
| CP | CP | CP | IDFT(OFDM EDMG CEF) | IDFT(OFDM EDMG CEF) | IDFT(OFDM EDMG CEF) |

| CP | IDFT(OFDM EDMG CEF) | IDFT(OFDM EDMG CEF) | CP | IDFT(OFDM EDMG CEF) | IDFT(OFDM EDMG CEF) |

| CP | IDFT(OFDM EDMG CEF) | IDFT(OFDM EDMG CEF) | CP | IDFT(OFDM EDMG CEF) | IDFT(OFDM EDMG CEF) |

METHOD FOR TRANSMITTING AND RECEIVING SIGNALS IN WIRELESS LAN SYSTEM AND APPARATUS THEREFOR

CROSS-REFERENCE TO RELATED APPLICATIONS

This application is a continuation of U.S. patent application Ser. No. 16/326,165, filed on Feb. 15, 2019, which is the National Stage filing under 35 U.S.C. 371 of International Application No. PCT/KR2018/004128, filed on Apr. 9, 2018, which claims the benefit of U.S. Provisional Application No. 62/531,307, filed on Jul. 11, 2017, 62/535,240, filed on Jul. 21, 2017, 62/550,717, filed on Aug. 28, 2017, 62/552,394, filed on Aug. 31, 2017, and 62/560,199, filed on Sep. 19, 2017, the contents of which are all hereby incorporated by reference herein in their entireties.

BACKGROUND OF THE INVENTION

Field of the Invention

The present invention relates to a method for transmitting and receiving signals by a station in a wireless LAN system and an apparatus for the method.

More specifically, the descriptions given below are related to a method for a station operating in the Orthogonal Frequency Division Multiplexing (OFDM) mode to transmit and receive signals including a training field and an apparatus for the method.

Related Art

A standard for the wireless LAN technology is being developed as an Institute of Electrical and Electronics Engineers (IEEE) 802.11 standard. IEEE 802.11a and b use an unlicensed band in 2.4. GHz or 5 GHz. And, IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. And, discussions are now being made on the IEEE 802.11ax standardization.

Meanwhile, the IEEE 802.11ad system regulates a capability enhancement for an ultra-high speed throughput in a 60 GHz band, and, for the first time, in the above-described IEEE 802.11ad system, discussions are being made on an IEEE 802.11 ay for adopting channel bonding and MIMO techniques.

SUMMARY OF THE INVENTION

The present invention provides a method for a station operating in the OFDM mode to transmit and receive signals including a training field and an apparatus for the method.

To solve the problem above, a method for transmitting signals from a first station (STA) to a second STA in a WLAN system according to one aspect of the present invention comprises generating a training subfield configured of/including a predetermined number of Orthogonal Frequency Division Multiplexing (OFDM) symbols; and transmitting a signal including a header field and the training subfield to the second STA, wherein the transmitted signal includes the training subfield, wherein the training subfield is transmitted repeatedly T times after a data field based on information indicated by/included in the header field, wherein T is a natural number.

To solve the problem above, a station apparatus for transmitting signals in a WLAN system according to another aspect of the present invention comprises a transceiver having one or more Radio Frequency (RF) chains and transmitting and receiving signals to and from other station apparatus; and a processor being coupled to the transceiver and processing signals transmitted and received to and from the other station apparatus, wherein the processor is configured to generate a training subfield configured of/including a predetermined number of Orthogonal Frequency Division Multiplexing (OFDM) symbols; and transmit a signal including a header field and the training subfield to the second STA, wherein the transmitted signal includes the training subfield, wherein the training subfield is transmitted repeatedly T times after a data field based on information indicated by/included in the header field, wherein T is a natural number.

In the composition above, the training subfield may be configured for each space-time stream.

At this time, the training subfield per space-time stream may be configured by using/based on a basic training subfield per space-time stream configured of M (where M is a natural number) OFDM symbols based on information indicated by a header field based on a rule determined by the total number of space-time streams.

As one specific example, when the basic training subfield per space-time stream is configured of/includes 1 OFDM symbol based on the information indicated by/included in the header field, the T may be 4; when the basic training subfield per space-time stream is configured of/includes 2 OFDM symbols based on the information indicated by/included in the header field, the T may be 2; and when the basic training subfield per space-time stream is configured of/includes 4 OFDM symbols based on the information indicated by/included in the header field, the T may be 1.

Also, one OFDM symbol included in the one, two, or four OFDM symbols may include a guard interval with a length of 72.72 ns or cyclic prefix (CP).

In the description above, the header field may include an Enhanced Directional Multi Gigabit (EDMG) training subfield sequence length field which indicates/including information on OFDM symbol length of the basic training subfield per space-time stream.

At this time, when the EDMG training subfield sequence length field indicates 0, the basic training subfield per space-time stream may be configured of two OFDM symbols, and the T may be 2; when the EDMG training subfield sequence length field indicates 1, the basic training subfield per space-time stream may be configured of four OFDM symbols, and the T may be 1; and when the EDMG training subfield sequence length field indicates 2, the basic training subfield per space-time stream may be configured of one OFDM symbol, and the T may be 4.

To solve the problem above, a method for a first STA to receive signals from a second STA in a WLAN system according to yet another aspect of the present invention comprises receiving a header field included in a transmitted signal; and receiving the signal by switching processing between a data field and a training field during a period within a period during which the signal is transmitted, wherein the training subfield is transmitted repeatedly T times after a data field based on the information indicated by/included in the header field during the period, wherein the training subfield is configured of/includes a predetermined number of Orthogonal Frequency Division Multiplexing (OFDM) symbols, wherein the T is a natural number.

To solve the problem above, a station apparatus for receiving signals in a WLAN system according to still another aspect of the present invention comprises a transceiver having one or more Radio Frequency (RF) chains and transmitting and receiving signals to and from other station apparatus; and a processor being coupled to the transceiver and processing signals transmitted and received to and from the other station apparatus, wherein the processor is configured to receive a header field included in a transmitted signal; and receive the signal by switching processing between a data field and a training field during a period within a period during which the signal is transmitted, wherein the training subfield is transmitted repeatedly T times after a data field based on the information indicated by/included in the header field during the period, wherein the training subfield is configured of/includes a predetermined number of Orthogonal Frequency Division Multiplexing (OFDM) symbols, wherein the T is a natural number.

The effect that can be obtained from the present invention is not limited to the above-described effects and the other effects will be understood by those skilled in the art from the following description.

Through the composition as described above, a station operating in the OFDM mode according to the present invention may transmit and receive signals including a training field.

In particular, according to the present invention, a station may transmit and receive signals including a training field of the OFDM mode which may be aligned with a training field structure of the SC mode.

The effect that can be obtained from the present invention is not limited to the above-described effects and the other effects will be understood by those skilled in the art from the following description.

BRIEF DESCRIPTION OF THE DRAWINGS

The appended drawings of this specification are presented to provide a further understanding of the present invention and are incorporated in and constitute a part of this application, illustrate embodiments of the invention and serve to explain the principle of the invention along with the description of the present invention.

FIG. 9 is a diagram showing a PPDU structure that can be applied to the present invention.

FIGS. 11 to 30 illustrate an EDMG-CEF sequence or a training sequence per space-time stream which may be applied to the present invention.

FIG. 31 illustrates a TRN subfield structure corresponding to one OFDM symbol.

FIGS. 32 and 33 illustrate a TRN subfield structure corresponding two OFDM symbols.

FIG. 34 illustrates a TRN subfield structure corresponding to three OFDM symbols.

FIGS. 35 and 36 illustrate a TRN subfield structure corresponding to four OFDM symbols.

DESCRIPTION OF EXEMPLARY EMBODIMENTS

Hereinafter, the preferred embodiment of the present invention will be described in detail with reference to the appended drawings. The detailed description that will hereinafter be disclosed along with the appended drawings will only be provided to describe an exemplary embodiment of the present invention. And, therefore, it should be understood that the exemplary embodiment presented herein will not represent the only embodiment for carrying out the present invention.

The following detailed description includes specific details for providing a full understanding of the present invention. However, it will be apparent to anyone skilled in the art that the present invention can be carried out without referring to the above-mentioned specific details. In some cases, in order to avoid any ambiguity in the concept of the present invention, the disclosed structure and device may be omitted, or the disclosed structure and device may be illustrated as a block diagram based on their core functions.

Although diverse mobile communication systems applying the present invention may exist, a wireless LAN (WLAN) system will hereinafter be described in detail as an example of such mobile communication system.

1. Wireless LAN (WLAN) System 1-1. General Wireless LAN (WLAN) System

Figure 1:
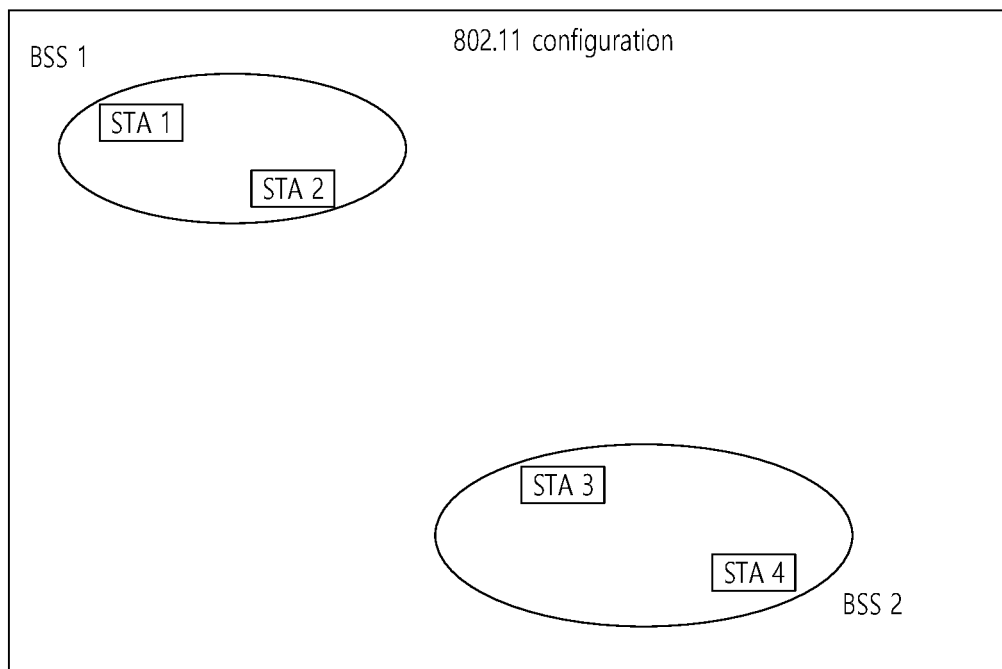
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP, access to the DS is not authorized (or approved), and, therefore, the IBSS functions as a self-contained network.

Figure 2:
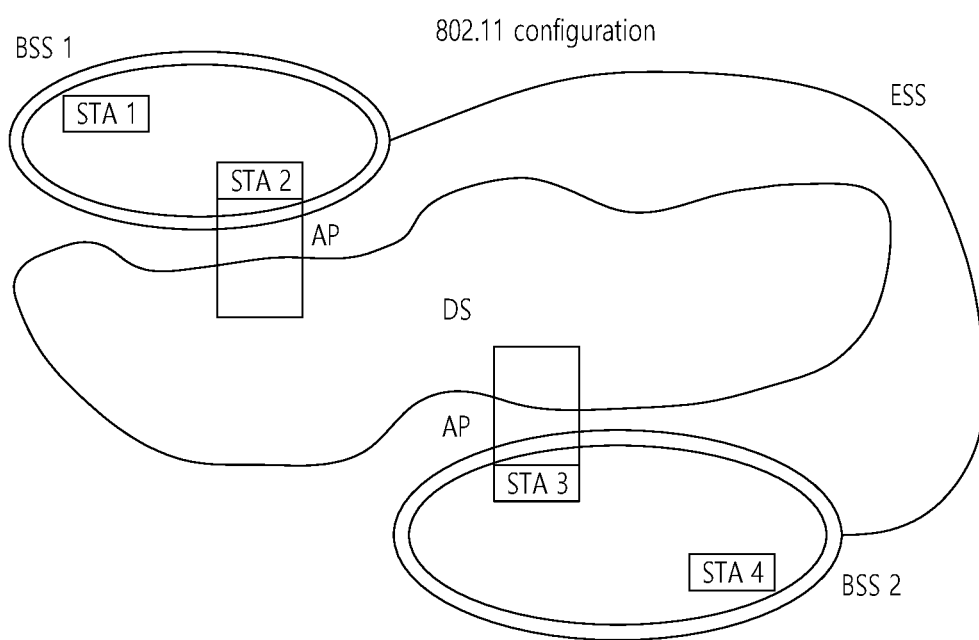
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Hereinafter, a channel bonding method that is performed in a wireless LAN system will hereinafter be described in detail based on the description presented above.

1-2. Channel Bonding in a Wireless LAN (WLAN) System

Figure 3:
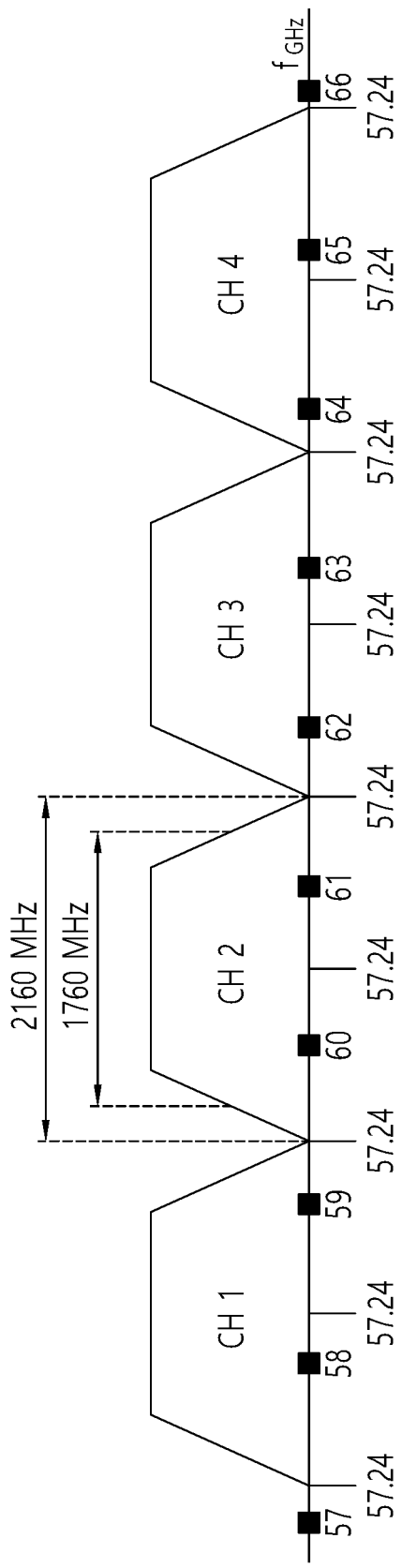
FIG. 3 is a diagram describing a channel in a 60 GHz band for describing a channel bonding operation according to an exemplary embodiment of the present invention.

FIG. 3 is a diagram describing a channel in a 60 GHz band for describing a channel bonding operation according to an exemplary embodiment of the present invention.

As shown in FIG. 3, 4 channels may be configured in a 60 GHz band, and a general channel bandwidth may be equal to 2.16 GHz. An ISM band (57 GHz 66 GHz), which is available for usage in 60 GHz, may be differently regulated in accordance with the circumstances (or situations) of each country. Generally, among the channels shown in FIG. 3, since Channel 2 is available for usage is all regions, Channel 2 may be used as a default channel. Channel 2 and Channel 3 may be used is most regions excluding Australia. And, accordingly, Channel 2 and Channel 3 may be used for channel bonding. However, it shall be understood that diverse channels may be used for channel bonding. And, therefore, the present invention will not be limited to only one or more specific channels.

Figure 4:
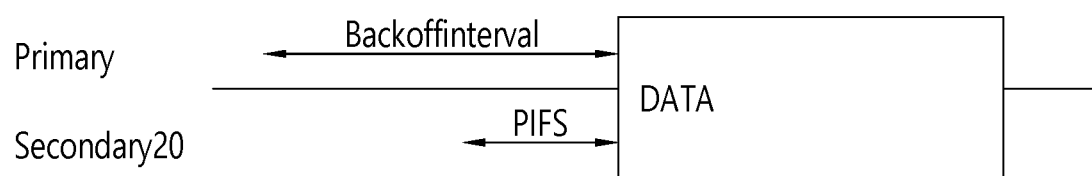
FIG. 4 is a diagram describing a basic method for performing channel bonding in a wireless LAN (WLAN) system.

FIG. 4 is a diagram describing a basic method for performing channel bonding in a wireless LAN (WLAN) system.

The example shown in FIG. 4 corresponds to an example of combining two 20 MHz channels and operating (or using) the combined channels for 40 MHz channel bonding in an IEEE 802.11n system. In case of an IEEE 802.11ac system, 40/80/160 MHz channel bonding may be performed.

The two exemplary channels of FIG. 4 include a primary channel and a secondary channel, and the STA may examine the channel status of the primary channel, among the two channels, by using a CSMA/CA method. If the primary channel is idle during a constant backoff interval, and, at a time point where the backoff count is equal to 0, if the secondary channel is idle during a predetermined period of time (e.g., PIFS), the STA may transmit data by combining the primary channel and the secondary channel.

However, in case of performing contention-based channel bonding, as shown in FIG. 4, as described above, since channel bonding can be performed only in a restricted case where the secondary channel maintains the idle state during a predetermined period of time at a time point where the backoff count for the primary channel is expired, the usage of channel bonding is very restricted (or limited). And, therefore, there lies a difficulty in that measures cannot be flexibly taken in accordance with the circumstances (or situation) of the medium.

Accordingly, in an aspect of the present invention, a solution (or method) for performing scheduling-based access by having the AP transmit scheduling information to the STAs is proposed. Meanwhile, in another aspect of the present invention, a solution (or method) for performing contention-based channel access based on the above-described scheduling or independently from the above-described scheduling is proposed. Furthermore, in yet another aspect of the present invention, a method for performing communication through a spatial sharing technique based on beamforming is proposed.

1-3. Beacon Interval Configuration

Figure 5:
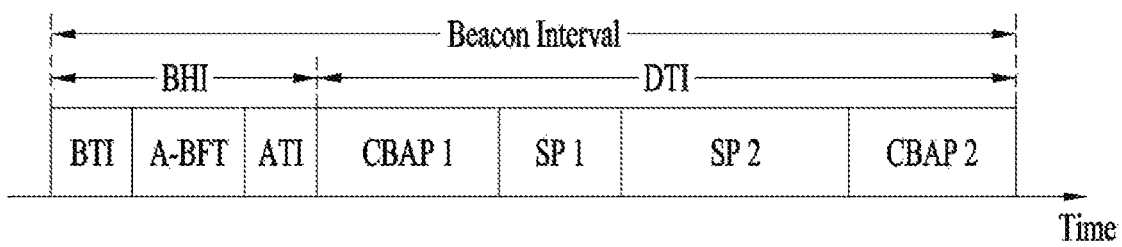
FIG. 5 is a diagram describing a configuration of a beacon interval.

FIG. 5 is a diagram describing a configuration of a beacon interval.

In an 11ad-based DMG BSS system, the time of medium may be divided into beacon intervals. A lower level period within the beacon interval may be referred to as an access period. Each of the different access periods within one beacon interval may have a different access rule. Such information on the access period may be transmitted by an AP or personal basic service set control point (PCP) to a non-AP STA or non-PCP.

As shown in the example of FIG. 5, one beacon interval may include one Beacon Header Interval (BHI) and one Data Transfer Interval (DTI). As shown in FIG. 4, the BHI may include a Beacon Transmission Interval (BTI), an Association Beamforming Training (A-BFT), and an Announcement Transmission Interval (ATI).

The BTI refers to a period (or section or duration) during which one more DMG beacon frames may be transmitted. The A-BFT refers to a period during which beamforming training is performed by an STA, which has transmitted a DMG beacon frame during a preceding BTI. The ATI refers to a request-response based management access period between PCP/AP and non-PCP/non-AP STA.

Meanwhile, the Data Transfer Interval (DTI) refers to a period during which a frame exchange is performed between the STAs. And, as shown FIG. 5, one or more Contention Based Access Periods (CBAPs) and one or more Service Periods (SPs) may be allocated (or assigned) to the DTI. Although FIG. 5 shows an example where 2 CBAPs and 2 SPs are allocated to the DCI, this is merely exemplary. And, therefore, the present invention is not necessarily required to be limited only to this.

Hereinafter, a physical layer configuration in a wireless LAN (WLAN) system, in which the present invention is to be applied, will be described in detail.

1-4. Physical Layer Configuration

It will be assumed that the wireless LAN (WLAN) system according to an exemplary embodiment of the present invention may provide 3 different modulations mode as shown below.

TABLE 1

| PHY | MCS | Note |
|---|---|---|
| Control PHY | 0 | |
| Single carrier PHY | 1 . . . 12 | (low power SC PHY) |
| (SC PHY) | 25 . . . 31 | |
| OFDM PHY | 13 . . . 24 | |

Such modulation modes may be used for satisfying different requirements (e.g., high throughput or stability). Depending upon the system, among the modulation modes presented above, only some of the modulation modes may be supported.

Figure 6:
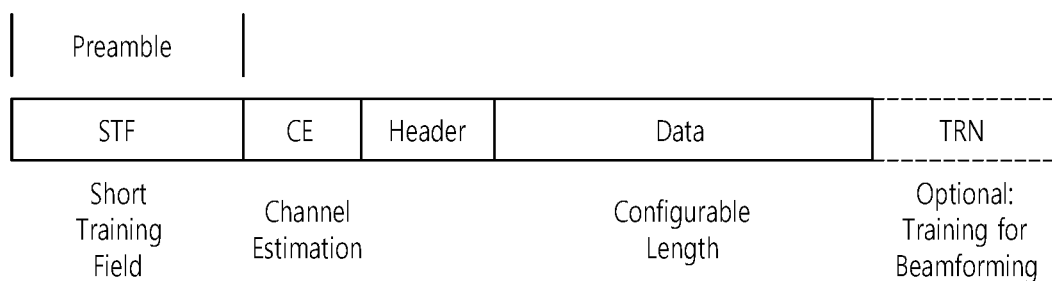
FIG. 6 is a diagram describing a physical configuration of a legacy radio frame.

FIG. 6 is a diagram describing a physical configuration of a legacy radio frame.

It will be assumed that all Directional Multi-Gigabit (DMG) physical layers commonly include the fields that are shown below in FIG. 6. However, a regulation method of each individual field and a modulation/coding scheme used in each field may vary depending upon each mode.

As shown in FIG. 6, a preamble of a radio frame may include a Short Training Field (STF) and a Channel Estimation (CE). Additionally, the radio frame may also include a header and a data field as a payload of the radio frame and may optionally include a training (TRN) field for beamforming.

Figure 7:
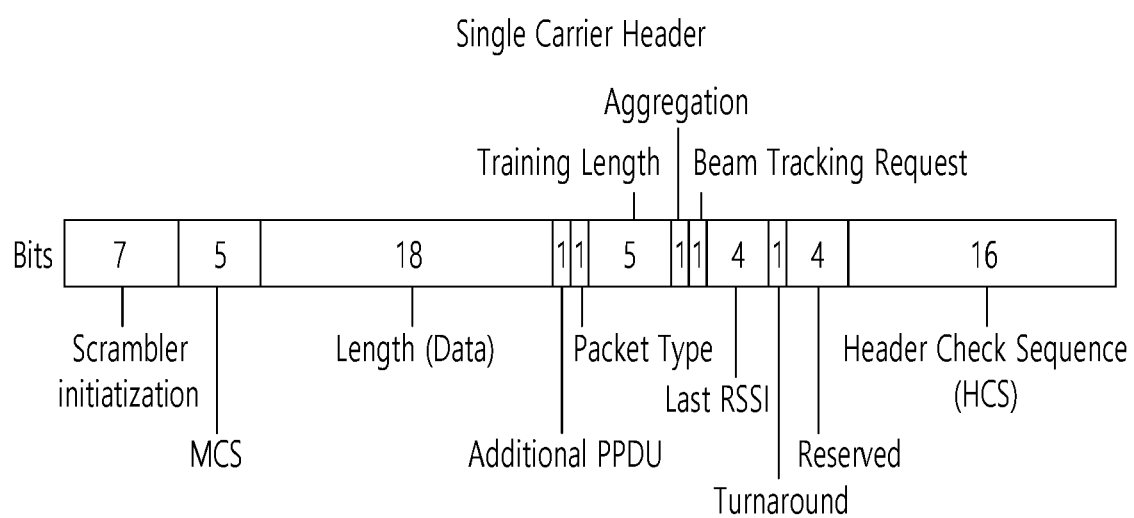
FIG. 7 and FIG. 8 are diagrams describing a configuration of a header field of the radio frame shown in FIG. 6.
Figure 8:
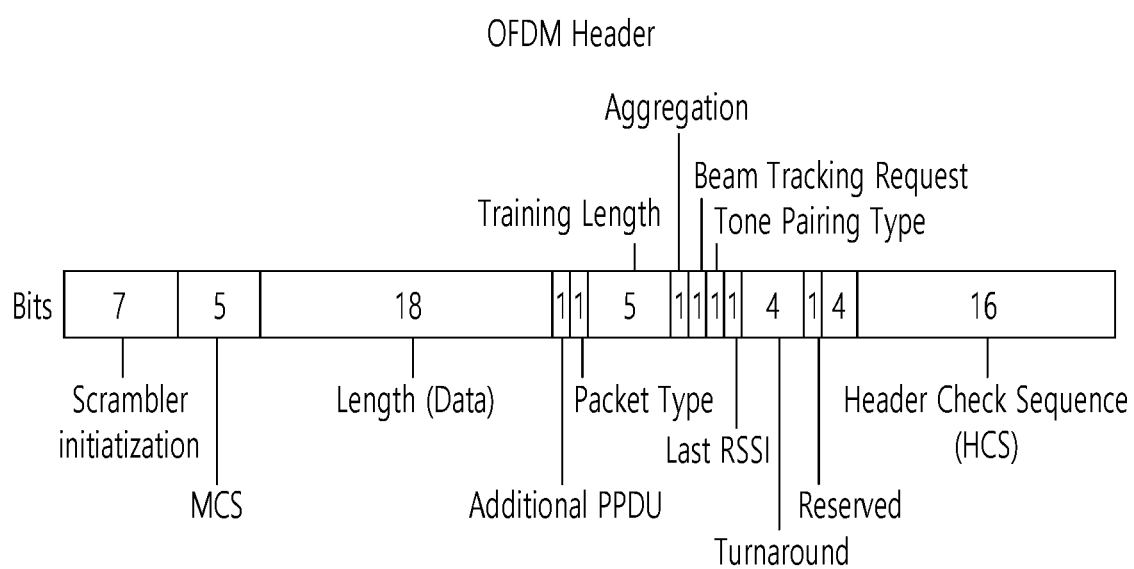

FIG. 7 and FIG. 8 are diagrams describing a configuration of a header field of the radio frame shown in FIG. 6.

More specifically, FIG. 7 illustrates a case where a Single Carrier (SC) mode is used. In the SC mode, the header may include information indicating an initial value of scrambling, information indicating a Modulation and Coding Scheme (MCS) and a data length, information indicating the presence or absence of an additional Physical Protocol Data Unit (PPDU), and information on a packet type, a training length, aggregation or non-aggregation, a presence or absence of a beam training request, a last Received Signal Strength Indicator (RSSI), truncation or non-truncation, a Header Check Sequence (HCS), and so on. Additionally, as shown in FIG. 7, the header has 4 bits of reserved bits, and, in the description presented below, such reserved bits may also be used.

Additionally, FIG. 8 illustrates a detailed configuration of a header corresponding to a case where the OFDM mode is applied. the header may include information indicating an initial value of scrambling, information indicating a MCS and a data length, information indicating the presence or absence of an additional PPDU, and information on a packet type, a training length, aggregation or non-aggregation, a presence or absence of a beam training request, a last RSSI, truncation or non-truncation, a Header Check Sequence (HCS), and so on. Additionally, as shown in FIG. 8, the header has 2 bits of reserved bits, and, just as in the case of FIG. 7, in the description presented below, such reserved bits may also be used.

As described above, the IEEE 802.11 ay system considers for the first time the adoption of channel bonding the MIMO technique to the legacy 11ad system. In order to implement channel boning and MIMO, the 11ay system requires a new PPDU structure. In other words, when using the legacy 11ad PPDU structure, there are limitations in supporting the legacy user equipment (UE) and implementing channel bonding and MIMO at the same time.

For this, a new field for the 11ay UE may be defined after the legacy preamble and legacy header field for supporting the legacy UE. And, herein, channel bonding and MIMO may be supported by using the newly defined field.

FIG. 9 is a diagram showing a PPDU structure according to a preferred embodiment of the present invention. In FIG. 9, a horizontal axis may correspond to a time domain, and a vertical axis may correspond to a frequency domain.

When two or more channels are bonded, a frequency band having a predetermined size (e.g., a 400 MHz band) may exist between a frequency band (e.g., 1.83 GHz) that is used between each channel. In case of a Mixed mode, a legacy preamble (legacy STF, legacy CE) is duplicated through each channel. And, according to the exemplary embodiment of the present invention, it may be considered to perform the transmission (gap filling) of a new STF and CE field along with the legacy preamble at the same time through the 400 MHz band between each channel.

In this case, as shown in FIG. 9, the PPDU structure according to the present invention has a structure of transmitting ay STF, ay CE, ay Header B, and ay payload after legacy preamble, legacy header, and ay Header A via wideband. Therefore, the ay Header and ay Payload fields, which are transmitted after the Header field, may be transmitted through the channels that are used for the channel bonding. Hereinafter, in order to differentiate the ay Header from the legacy Header, the ay Header may be referred to as an enhanced directional multi-gigabit (EDMG) Header, and the corresponding terms may be used interchangeably.

For example, a total of 6 channels or 8 channels (each corresponding to 2.16 GHz) may exist in the 11ay system, and a maximum of 4 channels may be bonded and transmitted to a single STA. Accordingly, the ay header and the ay Payload may be transmitted through bandwidths of 2.16 GHz, 4.32 GHz, 6.48 GHz, and 8.64 GHz.

Alternatively, a PPDU format of a case where the legacy preamble is repeatedly transmitted without performing the above-described gap-filling may also be considered.

In this case, since the Gap-Filling is not performed, the PPDU has a format of transmitting the ay STF, ay CE, and ay Header B after the legacy preamble, legacy header, and ay Header A without the GF-STF and GF-CE fields, which are illustrated in dotted lines in FIG. 8.

Figure 10:
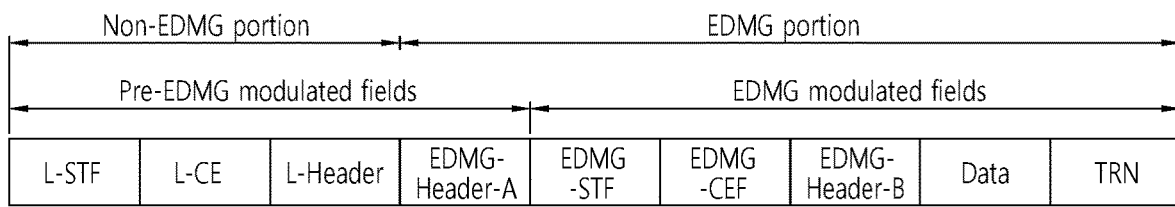
FIG. 10 is a diagram showing a simple PPDU structure that can be applied to the present invention.

FIG. 10 is a diagram showing a simple PPDU structure that can be applied to the present invention. When briefly summarizing the above-described PPDU format, the PPDU format may be illustrated as shown in FIG. 10.

As shown in FIG. 10, the PPDU format that is applicable to the 11ay system may include L-STF, L-CEF, L-Header, EDMG-Header-A, EDMG-STF, EDMG-CEF, EDMG-Header-B, Data, and TRN fields, and the above-mentioned fields may be selectively included in accordance with the format of the PPDU (e.g., SU PPDU, MU PPDU, and so on).

Herein, the part (or portion) including the L-STF, L-CEF, and L-header fields may be referred to as a Non-EDMG portion, and the remaining part (or portion) may be referred to as an EDMG portion (or region). Additionally, the L-STF, L-CEF, L-Header, and EDMG-Header-A fields may be referred to as pre-EDMG modulated fields, and the remaining fields may be referred to as EDMG modulated fields.

The preamble is a part of the PPDU that is used for packet detection, AGC, frequency offset estimation, synchronization, indication of modulation (SC or OFDM) and channel estimation. The format of the preamble is common to both OFDM packets and SC packets. The preamble is configured of two parts: the Short Training field and the Channel Estimation field).

3. Embodiment which May be Applied to the Present Invention

In what follows, a method for composing a TRN subfield in the OFDM mode based on the aforementioned composition (namely a TRN subfield for EDMG OFDM PPDU) and a method for transmitting and receiving signals including the TRN subfield based the composition method will be described in detail.

Now, a TRN subfield structure in the OFDM mode which may be applied to the present invention will be first described in detail.

3.1 TRN Subfield in the OFDM Mode
3.1.1. Sequence of OFDM TRN Subfield

According to the present invention, the TRN subfield for EDMG OFDM PPDU may be configured by using/based on the EDMG CEF in the OFDM mode or EDMG STF in the OFDM mode. Similarly, by taking into account Peak to Average Power Ratio (PAPR) performance, the TRN subfield for EDMG OFDM PPDU may be configured by using/based on a sequence with good PAPR performance.

First, the EDMG CEF field which may be applied to the present invention will be described in detail as follows.

The structure of the EDMG-CEF field depends on the number of contiguous 2.16 GHz channels over which an EDMG PPDU is transmitted and the number, $i_{STS}$, of space-time streams.

First, $Seq_{left,N}^{iSTS}$ and $Seq_{right,N}^{iSTS}$ sequences of length N used for definition of the EDMG-CEF field are defined as shown in FIGS. 11 to 30 depending on the value of N. Here, N may have one of the values 176, 385, 595, and 804.

FIG. 11 illustrates $Seq_{left,176}^{iSTS}$ per space-time stream, and FIG. 12 illustrates $Seq_{right,176}^{iSTS}$ per space-time stream.

Figure 14:
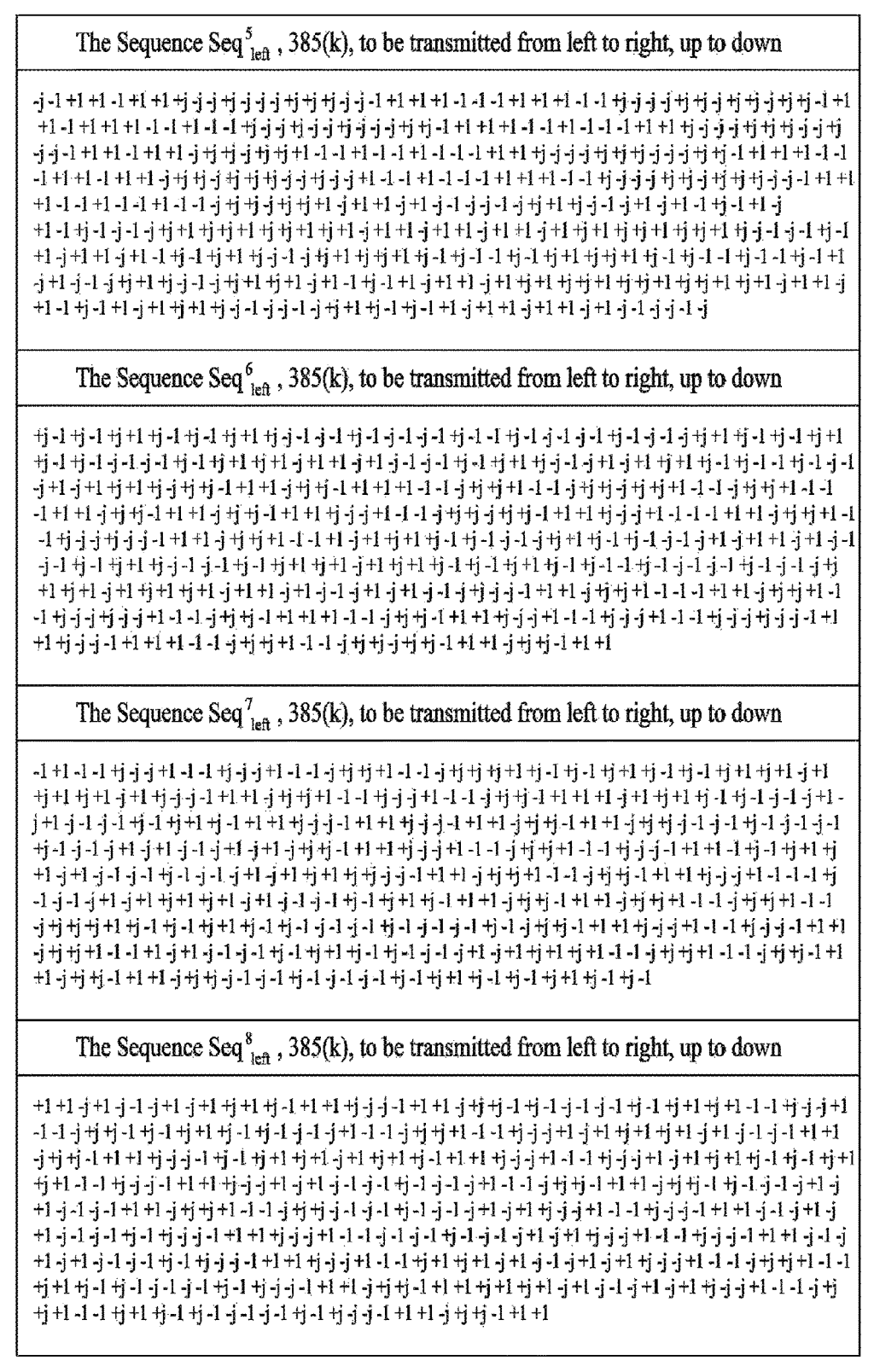

FIGS. 13 and 14 illustrate $Seq_{left,385}^{iSTS}$ per space-time stream; and FIGS. 15 and 16 illustrate $Seq_{right,385}^{iSTS}$ per space-time stream.

FIGS. 17 to 19 illustrate $Seq_{left,595}^{iSTS}$ per space-time stream; and FIGS. 20 to 22 illustrate $Seq_{right,595}^{iSTS}$ per space-time stream.

FIGS. 23 to 26 illustrate $Seq_{left,804}^{iSTS}$ per space-time stream; and FIGS. 27 to 30 illustrate $Seq_{right,804}^{iSTS}$ per space-time stream.

At this time, for transmission of an EDMG PPDU in the EDMG OFDM mode over a 2.16 GHz channel, the EDMG-CEF sequence in the frequency domain for the i-th space-time stream may be defined by the mathematical equation below. At this time, $Seq_{left,176}^{iSTS}$ and $Seq_{right,176}^{iSTS}$ may be defined as shown in FIGS. 11 and 12.

$$\text{EDMG-CEF}^{iSTS}_{-177,177} = [Seq^{iSTSleft,176},0,0, Seq^{iSTS}_{right,176}], \quad \text{[Equation 1]}$$

for $i_{STS}$=1, 2, 3, 4, 5, 6, 7, 8

For transmission of an EDMG PPDU in the EDMG OFDM mode over a 4.32 GHz channel, the EDMG-CEF sequence in the frequency domain for the i-th space-time sequence may be defined by the mathematical equation below. At this time, $Seq_{left,385}^{iSTS}$ and $Seq_{right,385}^{iSTS}$ may be defined as shown in FIGS. 13 to 16.

$$\text{EDMG-CEF}^{iSTS}_{-386,386} = [Seq^{iSTS}_{left,385},0,0,0, Seq^{iSTS}_{right,385}], \quad \text{[Equation 2]}$$

for $i_{STS}$=1, 2, 3, 4, 5, 6, 7, 8

For transmission of an EDMG PPDU in the EDMG OFDM mode over a 6.48 GHz channel, the EDMG-CEF sequence in the frequency domain for the i-th space-time sequence may be defined by the mathematical equation below. At this time, $Seq_{left,595}^{iSTS}$ and $Seq_{right,595}^{iSTS}$ may be defined as shown in FIGS. 17 to 22.

$$\text{EDMG-CEF}^{iSTS}_{-596,596} = [Seq^{iSTS}_{left,595},0,0,0, Seq^{iSTS}_{right,595}], \quad \text{[Equation 3]}$$

for $i_{STS}$=1, 2, 3, 4, 5, 6, 7, 8

For transmission of an EDMG PPDU in the EDMG OFDM mode over an 8.64 GHz channel, the EDMG-CEF sequence in the frequency domain for the i-th space-time sequence may be defined by the mathematical equation below. At this time, $Seq_{left,804}^{iSTS}$ and $Seq_{right,804}^{iSTS}$ may be defined as shown in FIGS. 23 to 30.

$$\text{EDMG-CEF}^{iSTS}_{-805,805} = [Seq^{iSTS}_{left,804},0,0,0, Seq^{iSTS}_{right,804}], \quad \text{[Equation 4]}$$

for $i_{STS}$=1, 2, 3, 4, 5, 6, 7, 8

When the OFDM sampling rate $F_S$ is $N_{CB} \times 2.64$ GHz, and sample time $T_S = 1/F_S$, transmit waveform of the EDMG-CEF field in the time domain may be defined by the mathematical equation given below. Here $N_{CB}$ represents the number of contiguous or bonded (or combined) channels.

$$r^{n,iTX}_{EDMG-CEF}(qT_s) = \frac{1}{\sqrt{N_{STS} \cdot N^{Tone}_{EDMG-CEF}}}$$

$$w(qT_s) \cdot \sum_{k=-N_{SR}}^{N_{SR}} \sum_{i_{STS}=1}^{N_{STS}} [Q_k]_{iTX,iSTS} [P_{EDMG-CEF}]_{i_{STS},n} \text{EDMG}-$$

$$CEF^{iSTS}_k \exp(j2\pi k \Delta_F(qT_s - T_{GI\,long})), 1 \le n \le N^{NITS}_{EDMG-CEF}$$

[Equation 5]

Each parameter in the equation above may be defined as follows.

$$N_{EDMG-CEF}^{Tone} = N_{ST} - N_{DC} \quad \text{[Equation 6]}$$

is the total number of active tones
$Q_k$ is the spatial mapping matrix per $k^{th}$ subcarrier
$P_{EDMG-CEF}$ is the EDMG-CEF mapping matrix defined below
$N_{EDMG-CEF}^{NSTS}$ is the number of OFDM symbols in the EDMG-CEF for a given total number of space-time streams $N_{STS}$ defined below
$[\,]_{m,n}$ is a matrix element from $m^{th}$ row and $n^{th}$ column
$w(qT_S)$ is the window function applied to smooth the transitions between consecutive OFDM symbols. Its definition is implementation dependent.

In what follows, for the convenience of descriptions, a structure proposed by the present invention will be described in detail with reference to an example where a sequence of an EDMG-CEF field is utilized as a sequence of the OFDM TRN subfield. However, it should be noted that according to another embodiment of the present invention, the 'EDMG-CEF' sequence in what follows may be replaced with another sequence (for example, an EDMG-STF sequence or another sequence exhibiting decent PAPR performance).

3.1.2. Symbol Length of OFDM TRN Subfield

In the conventional systems, only the TRN subfield in the SC mode rather than OFDM mode is defined. At this time, the TRN subfield in the SC mode may have a TRN subfield sequence having a different length depending on the value of TRN_BL. At this time, the TRN_BL value may be configured differently according to the 'TRN Subfield Sequence Length field' value of the EDMG Header-A field. As one example, when the TRN Subfield Sequence Length field of the EDMG-Header-A is 0, TRN_BL is set to 128; when the TRN Subfield Sequence Length field of the EDMG-Header-A is 1, TRN_BL is set to 256; and when the TRN Subfield Sequence Length field of the EDMG-Header-A is 2, TRN_BL is set to 64. At this time, when the TRN Subfield Sequence Length field of the EDMG-Header-A is 0, it may indicate 'Normal' while, when it is 2, it may indicate 'Short'.

Here, the TRN sequence in the SC mode may be configured of 6 Golay complementary sequences Ga and Gb as shown in the mathematical equation given below.

$$TRN^i_{basic} = [Ga^i_N, -Gb^i_N, Ga^i_N, Gb^i_N, Ga^i_N, -Gb^i_N] \quad \text{[Equation 7]}$$

In the equation above, i may represent a space-time stream or a transmit chain.

As described above, the length of the TRN subfield may be configured differently depending on the TRN Subfield Sequence Length field of the EDMG Header-A. Accordingly, duration of a TRN subfield sequence for each case may be determined as follows.

When TRN Subfield Sequence Length field of EDMG-Header-A is 0, $6*128*T_C=768*T_C$.
When TRN Subfield Sequence Length field of EDMG-Header-A is 1, $6*256*T_C=1536*T_C$.
When TRN Subfield Sequence Length field of EDMG-Header-A is 2, $6*64*T_C=384*T_C$.

Here, $T_C$ denotes a chip rate of the SC mode and may be 0.57 ns.

If duration of the TRN subfield sequence in the SC mode described above is expressed in terms of $T_S$, OFDM sample time parameter, it may be expressed as follows. ($T_C=T_S*3/2$, $T_S=0.38$ ns).

When TRN Subfield Sequence Length field of EDMG-Header-A is 0, $6*128*T_C=1152*T_S$
When TRN Subfield Sequence Length field of EDMG-Header-A is 1, $6*256*T_C=2304*T_S$
When TRN Subfield Sequence Length field of EDMG-Header-A is 2, $6*64*T_C=576*T_S$ As described above, conventional systems do not define symbol length of the TRN subfield in the OFDM mode. In this regard, examples which may be used as the symbol length of the TRN subfield in the OFDM mode for the 11ay system to which the present invention may be applied will be described in detail.

The 802.11 ay system to which the present invention may be applied may support signal transmission and reception through a channel bonded with one to four channels. Therefore, according to the number of bonded channels, a basic OFDM TRN subfield, an OFDM TRN subfield corresponding to one OFDM symbol, which may be applied to the present invention may be configured as follows.

(1) Single Channel

In this case, the sample frequency $F_S$ in the OFDM mode is 2.64 GHz, and sample time $T_S$ is 0.38 ns ($=T_C*2/3$).

A transmitter applies a 512-point Inverse Discrete Fourier Transform (IDFT) on the OFDM EDMG-CEF and inserts cyclic prefix to compose the OFDM TRN subfield.

At this time, the length of the inserted CP (or the number of samples) may correspond to 48, 96, 192, 32, 64, or 128 samples. In other words, the length of the inserted CP in the time domain may correspond to $48*T_S$, $96*T_S$, $192*T_S$ ($=72.72$ ns), $32*T_S$, $64*T_S$, or $128*T_S$. In this case, the total number of samples for one OFDM symbol may be 560, 608, 704, 544, 576, or 640. Also, in this case, the length of each TRN subfield in the time domain may be $560*T_S$, $608*T_S$, $704*T_S$, $544*T_S$, $576*T_S$, or $640*T_S$.

(2) 2 Channel Bonding

In this case, the sample frequency $F_S$ in the OFDM mode is 5.28 GHz, and sample time $T_S$ is 0.19 ns ($=T_C/3$).

A transmitter applies a 512-point IDFT on the OFDM EDMG-CEF and inserts cyclic prefix to compose the OFDM TRN subfield.

At this time, the length of the inserted CP (or the number of samples) may correspond to 96, 192, 384, 64, 128, or 256 samples. In other words, the length of the inserted CP in the time domain may correspond to $96*T_S$, $192*T_S$, $384*T_S$ ($=72.72$ ns), $64*T_S$, $128*T_S$, or $256*T_S$. In this case, the total number of samples for one OFDM symbol may be 1120, 1216, 1408, 1088, 1152, or 1280. Also, in this case, the length of each TRN subfield in the time domain may be $1120*T_S$, $1216*T_S$, $1408*T_S$, $1088*T_S$, $1152*T_S$, or $1280*T_S$.

(3) 3 Channel Bonding

In this case, the sample frequency $F_S$ in the OFDM mode is 7.92 GHz, and sample time $T_S$ is 0.13 ns ($=2*T_C/9$).

A transmitter applies a 512-point IDFT on the OFDM EDMG-CEF and inserts cyclic prefix to compose the OFDM TRN subfield.

At this time, the length of the inserted CP (or the number of samples) may correspond to 144, 288, 576, 96, 192, or 384 samples. In other words, the length of the inserted CP in the time domain may correspond to $144*T_S$, $288*T_S$, $576*T_S$ ($=72.72$ ns), $96*T_S$, $192*T_S$, or $384*T_S$. In this case, the total number of samples for one OFDM symbol may be 1680, 1824, 2112, 1632, 1728, or 1920. Also, in this case, the length of each TRN subfield in the time domain may be $1680*T_S$, $1824*T_S$, $2112*T_S$, $1632*T_S$, $1728*T_S$, or $1920*T_S$.

(4) 4 Channel Bonding

In this case, the sample frequency $F_S$ in the OFDM mode is 10.56 GHz, and sample time $T_S$ is 0.09 ns ($=T_C/6$).

A transmitter applies a 2018-point IDFT on the OFDM EDMG-CEF and inserts cyclic prefix to compose the OFDM TRN subfield.

At this time, the length of the inserted CP (or the number of samples) may correspond to 192, 384, 768, 128, 256, or 512 samples. In other words, the length of the inserted CP in the time domain may correspond to $192*T_S$, $384*T_S$, $768*T_S$ ($=72.72$ ns), $128*T_S$, $256*T_S$, or $512*T_S$. In this case, the total number of samples for one OFDM symbol may be 2240, 2432, 2816, 2176, 2304, or 2560. Also, in this case, the length of each TRN subfield in the time domain may be $2240*T_S$, $2432*T_S$, $2816*T_S$, $2176*T_S$, $2304*T_S$, or $2560*T_S$.

According to the present invention, the transmitter may compose an OFDM TRN subfield corresponding to one OFDM symbol by using/based on the CP+IDFT (OFDM EDMG-CEF) structure according to the total number of CP samples described above.

Also, similarly to the case of SC mode, Header-A field of an EDMG OFDM PPDU may include a field (for example, TRN Subfield Sequence Length field) indicating the length of a TRN field. In what follows, a method for composing a TRN subfield according to the value of the aforementioned field will be described in detail.

In the present invention, the TRN subfield according to the value of the aforementioned field may be configured by repeating the basic TRN subfield (CP+IDFT (OFDM EDMG-CEF)) one to five times. Therefore, in what follows, similarly to the SC mode, a TRN subfield structure (for example, symbol length of the TRN subfield) which may be applied according to the 'TRN Subfield Sequence Length field' value of the EDMG Header-A field will be described in detail.

1) The Case where TRN Subfield Sequence Length Field of EDMG-Header-A is 0 (TRN_BL is 128, 1152*$T_S$)

FIG. 31 illustrates a TRN subfield structure corresponding to one OFDM symbol.

As shown in FIG. 31, if TRN Subfield Sequence Length field of the EDMG-Header-A is 0, the corresponding TRN subfield structure may be configured of a TRN subfield structure corresponding to one OFDM symbol (namely a structure configured of one basic OFDM TRN subfield).

FIGS. 32 and 33 illustrate a TRN subfield structure corresponding two OFDM symbols.

As shown in FIGS. 32 and 33, if TRN Subfield Sequence Length field of the EDMG-Header-A is 0, the corresponding TRN subfield structure may be configured of a TRN subfield structure corresponding to two OFDM symbols (namely a structure configured of two basic OFDM TRN subfields).

At this time, CP may be used twice as shown in FIG. 32, or only one CP may be used over two OFDM symbols as shown in FIG. 33.

FIG. 34 illustrates a TRN subfield structure corresponding to three OFDM symbols.

As shown in FIG. 34, if TRN Subfield Sequence Length field of the EDMG-Header-A is 0, the corresponding TRN subfield structure may be configured of a TRN subfield structure corresponding to three OFDM symbols (namely a structure configured of three basic OFDM TRN subfields).

FIGS. 35 and 36 illustrate a TRN subfield structure corresponding to four OFDM symbols.

As shown in FIG. 36, if TRN Subfield Sequence Length field of the EDMG-Header-A is 0, the corresponding TRN subfield structure may be configured of a TRN subfield structure corresponding to four OFDM symbols (namely a structure configured of four basic OFDM TRN subfields).

At this time, CP may be used four times for each symbol as shown in FIG. 35, or only two CPs may be used over four OFDM symbols as shown in FIG. 36.

2) The Case where TRN Subfield Sequence Length Field of EDMG-Header-A is 1 (TRN_BL is 256, 2304*$T_S$)

If TRN Subfield Sequence Length field of the EDMG-Header-A is 1, as shown in FIGS. 31 to 36, the corresponding TRN subfield may be configured of a TRN subfield structure corresponding to one OFDM symbol (namely a structure configured of one basic OFDM TRN subfield), a TRN subfield structure corresponding to two OFDM symbols (namely a structure configured of two basic OFDM TRN subfields), a TRN subfield structure configured of three OFDM symbols (namely a structure configured of three basic OFDM TRN subfields), or a TRN subfield structure corresponding to four OFDM symbols (namely a structure configured of four basic OFDM TRN subfields).

Figure 37:
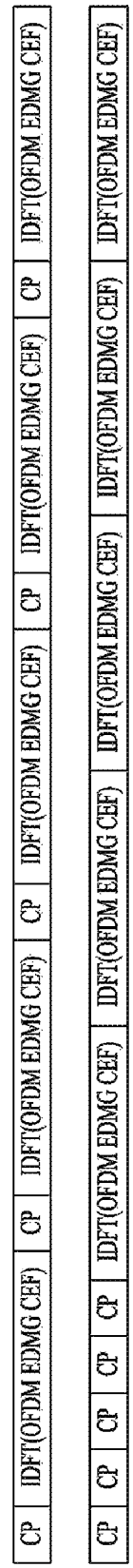
FIG. 37 illustrates a TRN subfield structure corresponding to five OFDM symbols.
Figure 38:
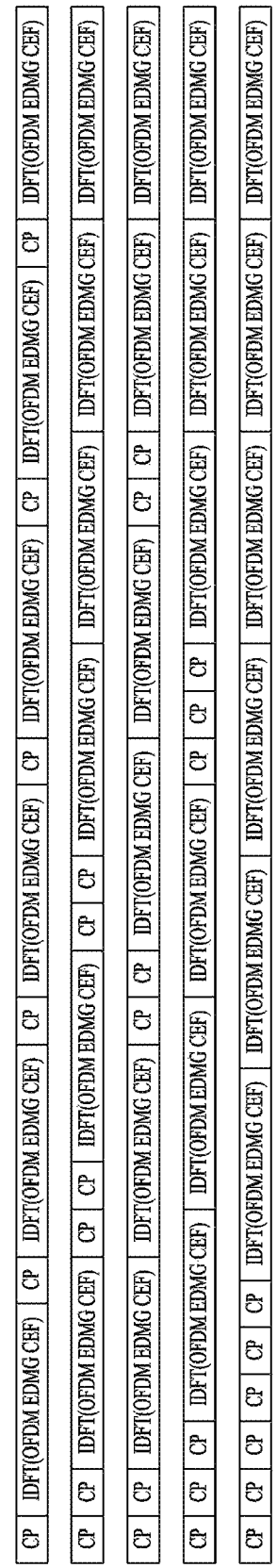
FIG. 38 illustrates a TRN subfield structure corresponding to six OFDM symbols.

In addition, if TRN Subfield Sequence Length field of the EDMG-Header-A is 1, as shown in FIG. 37 or 38, the corresponding TRN subfield may be configured of a TRN subfield structure corresponding to five or six OFDM symbols.

FIG. 37 illustrates a TRN subfield structure corresponding to five OFDM symbols.

As shown in FIG. 37, if TRN Subfield Sequence Length field of the EDMG-Header-A is 1, the corresponding TRN subfield structure may be configured of a TRN subfield structure corresponding to five OFDM symbols (namely a structure configured of five basic OFDM TRN subfields).

FIG. 38 illustrates a TRN subfield structure corresponding to six OFDM symbols.

As shown in FIG. 38, if TRN Subfield Sequence Length field of the EDMG-Header-A is 1, the corresponding TRN subfield structure may be configured of a TRN subfield structure corresponding to six OFDM symbols (namely a structure configured of six basic OFDM TRN subfields).

3) The Case where TRN Subfield Sequence Length Field of EDMG-Header-A is 2 (TRN_BL is 64, 576*$T_S$)

If TRN Subfield Sequence Length field of the EDMG-Header-A is 2, as shown in FIGS. 31 to 33, the corresponding TRN subfield may be configured of a TRN subfield structure corresponding to one OFDM symbol (namely a structure configured of one basic OFDM TRN subfield) or a TRN subfield structure corresponding to two OFDM symbols (namely a structure configured of two basic OFDM TRN subfields).

In a preferred embodiment to which the present invention may be applied, a TRN subfield structure according to the value of the TRN Subfield Sequence Length field of the EDMG Header-A field (namely a structure where the basic TRN subfield structure is repeated for a predetermined number of times) may be determined so as to be aligned with the TRN subfield of the SC mode in the time domain.

In one example, in the normal case (namely when the TRN Subfield Sequence Length field of the EDMG-Header-A is 0), considering that the TRN subfield of the SC mode is aligned with the TRN subfield of the OFDM mode in the time domain, the TRN subfield of the OFDM mode corresponding to the normal case may be configured of one OFDM symbol (704*$T_S$ when a long Guard Interval (GI) with a length of 72.72 ns is used) or two OFDM symbols (1408*$T_S$ when a long Guard Interval (GI) with a length of 72.72 ns is used).

At this time, similarly to the SC mode case, to easily compose the OFDM TRN subfield into a Normal/Short/Long structure according to the value indicated by/included in the TRN Subfield Sequence Length field of the EDMG Header-A field, the TRN subfield structure in the normal case may be configured of two OFDM symbols.

In other words, according to a preferred embodiment to which the present invention may be applied, if the TRN subfield Sequence Length field of the EDMG-Header-A is 0, the TRN subfield may be configured of a TRN subfield structure corresponding to two OFDM symbols as shown in FIG. 32; if the TRN subfield Sequence Length field of the EDMG-Header-A is 1, the TRN subfield may be configured of a TRN subfield structure corresponding to four OFDM symbols as shown in FIG. 35; and if the TRN subfield Sequence Length field of the EDMG-Header-A is 0, the TRN subfield may be configured of a TRN subfield structure corresponding to one OFDM symbols as shown in FIG. 31.

By employing the composition described above, time duration of the TRN subfield of the OFDM mode may be aligned with that of the TRN subfield of the SC mode in the time domain.

As described above, in the case of single channel, 512-point IDFT may be applied; in the case of 2 channel bonding, 1024-point IDFT; in the case of 3 channel bonding, 1536-point IDFT; and in the case of 4 channel bonding, 2048-point IDFT. Also, the number of CP samples which may be applied is 48, 96, 192, 32, 64, or 128 for the case of single channel bonding; 96, 192, 384, 64, 128, or 256 for the case of 2 channel bonding; 144, 288, 576, 96, 192, or 384 for the case of 3 channel bonding; and 192, 384, 768, 128, 256, or 512 for the case of 4 channel bonding.

In the present invention, to compose a TRN subfield which is based on repetition of a TRN subfield structure corresponding to one OFDM symbol, the order of CP and IDFT (OFDM EDMG-CEF) may be changed in various ways.

3.1.3. OFDM TRN Field Structure for Multi-Streams

The 11ay system applicable for the present invention may support up to 8 space-time streams to support the Multiple Input Multiple Output scheme. In what follows, an OFDM TRN subfield structure according to the total number of supported streams will be described in detail.

For the convenience of descriptions, in what follows, a signal obtained by repeating the TRN subfield structure, which corresponds to one OFDM symbol obtained through insertion of CP after IDFT is applied to the OFDM EDMG-CEF of the i-th space-time stream, one, two, or four times according to the value of the TRN Subfield Sequence Length field of the EDMG-Header-A is denoted as OFDM_TRN_basic_i.

Accordingly, the OFDM TRN subfield according to the total number of space time streams may be defined as follows.

Nsts=1(total number of stream: 1)

OFDM_TRN_subfield_1=[OFDM_TRN_basic_1]

or

OFDM_TRN_subfield_1=[OFDM_TRN_basic_1,-OFDM_TRN_basic_1]

(2) Nsts=2(total number of stream: 2)

OFDM_TRN_subfield_1=[OFDM_TRN_basic_1]

OFDM_TRN_subfield_2=[OFDM_TRN_basic_2]

or

OFDM_TRN_subfield_1=[OFDM_TRN_basic_1,-OFDM_TRN_basic_1]

OFDM_TRN_subfield_2=[OFDM_TRN_basic_2, OFDM_TRN_basic_2]

(3) Nsts=3(total number of stream: 3) ($w_3=\exp(-j*2*pi/3)$)

OFDM_TRN_subfield_1=[OFDM_TRN_basic_1, OFDM_TRN_basic_1]

OFDM_TRN_subfield_2=[OFDM_TRN_basic_2, OFDM_TRN_basic_2]

OFDM_TRN_subfield_3=[OFDM_TRN_basic_3,-OFDM_TRN_basic_3]

or

OFDM_TRN_subfield_1=[OFDM_TRN_basic_1,-OFDM_TRN_basic_1,OFDM_TRN_basic_1]

OFDM_TRN_subfield_2=[OFDM_TRN_basic_2,-$w_3^1$*OFDM_TRN_basic_2, $w_3^2$*OFDM_TRN_basic_2]

OFDM_TRN_subfield_3=[OFDM_TRN_basic_3,-$w_3^3$*OFDM_TRN_basic_3, $w_3^4$*OFDM_TRN_basic_3]

or

OFDM_TRN_subfield_1=[OFDM_TRN_basic_1,-OFDM_TRN_basic_1,OFDM_TRN_basic_1, OFDM_TRN_basic_1]

OFDM_TRN_subfield_2=[OFDM_TRN_basic_2, OFDM_TRN_basic_2,-OFDM_TRN_basic_2, OFDM_TRN_basic_2]

OFDM_TRN_subfield_3=[OFDM_TRN_basic_3, OFDM_TRN_basic_3,OFDM_TRN_basic_3,-OFDM_TRN_basic_3]

(4) Nsts=4(total number of stream: 4) ($w_4=\exp(-j*2*pi/4)$)

OFDM_TRN_subfield_1=[OFDM_TRN_basic_1, OFDM_TRN_basic_1]

OFDM_TRN_subfield_2=[OFDM_TRN_basic_2, OFDM_TRN_basic_2]

OFDM_TRN_subfield_3=[OFDM_TRN_basic_3,-OFDM_TRN_basic_3]

OFDM_TRN_subfield_4=[OFDM_TRN_basic_4,-OFDM_TRN_basic_4]

or

OFDM_TRN_subfield_1=[OFDM_TRN_basic_1,-OFDM_TRN_basic_1,OFDM_TRN_basic_1, OFDM_TRN_basic_1]

OFDM_TRN_subfield_2=[OFDM_TRN_basic_2,-$w_4^1$*OFDM_TRN_basic_2, $w_4^2$*OFDM_TRN_basic_2, $w_4^3$*OFDM_TRN_basic_2]

OFDM_TRN_subfield_3=[OFDM_TRN_basic_3,-$w_4^4$*OFDM_TRN_basic_3, $w_4^5$*OFDM_TRN_basic_3, $w_4^6$*OFDM_TRN_basic_3]

OFDM_TRN_subfield_4=[OFDM_TRN_basic_4,-$w_4^7$*OFDM_TRN_basic_4, $w_4^8$*OFDM_TRN_basic_4, $w_4^9$*OFDM_TRN_basic_4]

or

OFDM_TRN_subfield_1=[OFDM_TRN_basic_1,-OFDM_TRN_basic_1,OFDM_TRN_basic_1, OFDM_TRN_basic_1]

OFDM_TRN_subfield_2=[OFDM_TRN_basic_2, OFDM_TRN_basic_2,-OFDM_TRN_basic_2, OFDM_TRN_basic_2]

OFDM_TRN_subfield_3=[OFDM_TRN_basic_3, OFDM_TRN_basic_3,OFDM_TRN_basic_3,-OFDM_TRN_basic_3]

OFDM_TRN_subfield_4=[-OFDM_TRN_basic_4, OFDM_TRN_basic_4,OFDM_TRN_basic_4, OFDM_TRN_basic_4]

(5) Nsts=5(total number of stream: 5) ($w_5=\exp(-j*2*pi/5)$, $w_6=\exp(-j*2*pi/6)$)

OFDM_TRN_subfield_1=[OFDM_TRN_basic_1, OFDM_TRN_basic_1,OFDM_TRN_basic_1, OFDM_TRN_basic_1]

OFDM_TRN_subfield_2=[OFDM_TRN_basic_2,
OFDM_TRN_basic_2,OFDM_TRN_basic_2,
OFDM_TRN_basic_2]

OFDM_TRN_subfield_3=[OFDM_TRN_basic_3,-
OFDM_TRN_basic_3,OFDM_TRN_basic_3,-
OFDM_TRN_basic_3]

OFDM_TRN_subfield_4=[OFDM_TRN_basic_4,-
OFDM_TRN_basic_4,OFDM_TRN_basic_4,-
OFDM_TRN_basic_4]

OFDM_TRN_subfield_5=[OFDM_TRN_basic_5,
OFDM_TRN_basic_5,-OFDM_TRN_basic_5,-
OFDM_TRN_basic_5]

or

OFDM_TRN_subfield_1=[OFDM_TRN_basic_1,-
OFDM_TRN_basic_1,OFDM_TRN_basic_1,
OFDM_TRN_basic_1,OFDM_TRN_basic_1,-
OFDM_TRN_basic_1]

OFDM_TRN_subfield_2=[OFDM_TRN_basic_2,-
$w_6^1$*OFDM_TRN_basic_2,
$w_6^2$*OFDM_TRN_basic_2,
$w_6^3$*OFDM_TRN_basic_2,
$w_6^4$*OFDM_TRN_basic_2,-
$w_6^5$*OFDM_TRN_basic_2]

OFDM_TRN_subfield_3=[OFDM_TRN_basic_3,-
$w_6^2$*OFDM_TRN_basic_3,
$w_6^4$*OFDM_TRN_basic_3,
$w_6^6$*OFDM_TRN_basic_3,
$w_6^8$*OFDM_TRN_basic_3-
$w_6^{10}$*OFDM_TRN_basic_3]

OFDM_TRN_subfield_4=[OFDM_TRN_basic_4,-
$w_6^3$*OFDM_TRN_basic_4,
$w_6^6$*OFDM_TRN_basic_4,
$w_6^9$*OFDM_TRN_basic_4,
$w_6^{12}$*OFDM_TRN_basic_4-
$w_6^{15}$*OFDM_TRN_basic_4]

OFDM_TRN_subfield_5=[OFDM_TRN_basic_5,-
$w_6^4$*OFDM_TRN_basic_5,
$w_6^8$*OFDM_TRN_basic_5,
$w_6^{12}$*OFDM_TRN_basic_5,
$w_6^{16}$*OFDM_TRN_basic_5-
$w_6^{20}$*OFDM_TRN_basic_5]

or

OFDM_TRN_subfield_1=[OFDM_TRN_basic_1,-
OFDM_TRN_basic_1,OFDM_TRN_basic_1,
OFDM_TRN_basic_1,OFDM_TRN_basic_1,-
OFDM_TRN_basic_1,OFDM_TRN_basic_1,
OFDM_TRN_basic_1]

OFDM_TRN_subfield_2=[OFDM_TRN_basic_2,
OFDM_TRN_basic_2,-OFDM_TRN_basic_2,
OFDM_TRN_basic_2,OFDM_TRN_basic_2,
OFDM_TRN_basic_2,-OFDM_TRN_basic_2,
OFDM_TRN_basic_2]

OFDM_TRN_subfield_3=[OFDM_TRN_basic_3,
OFDM_TRN_basic_3,OFDM_TRN_basic_3,
OFDM_TRN_basic_3,OFDM_TRN_basic_3,
OFDM_TRN_basic_3,OFDM_TRN_basic_3,-
OFDM_TRN_basic_3]

OFDM_TRN_subfield_4=[-OFDM_TRN_basic_4,
OFDM_TRN_basic_4,OFDM_TRN_basic_4,
OFDM_TRN_basic_4,-OFDM_TRN_basic_4,
OFDM_TRN_basic_4,OFDM_TRN_basic_4,
OFDM_TRN_basic_4]

OFDM_TRN_subfield_5=[OFDM_TRN_basic_5,-
OFDM_TRN_basic_5,OFDM_TRN_basic_5,
OFDM_TRN_basic_5,OFDM_TRN_basic_5,
OFDM_TRN_basic_5,-OFDM_TRN_basic_5,-
OFDM_TRN_basic_5]

or

OFDM_TRN_subfield_1=[OFDM_TRN_basic_1,-
OFDM_TRN_basic_1,OFDM_TRN_basic_1,
OFDM_TRN_basic_1,OFDM_TRN_basic_1]

OFDM_TRN_subfield_2=[OFDM_TRN_basic_2,-
$w_5^1$*OFDM_TRN_basic_2,
$w_5^2$*OFDM_TRN_basic_2,
$w_5^3$*OFDM_TRN_basic_2,
$w_5^4$*OFDM_TRN_basic_2]

OFDM_TRN_subfield_3=[OFDM_TRN_basic_3,-
$w_5^5$*OFDM_TRN_basic_3,
$w_5^6$*OFDM_TRN_basic_3,
$w_5^7$*OFDM_TRN_basic_3,
$w_5^8$*OFDM_TRN_basic_3]

OFDM_TRN_subfield_4=[OFDM_TRN_basic_4,-
$w_5^9$*OFDM_TRN_basic_4,
$w_5^{16}$*OFDM_TRN_basic_4,
$w_5^{11}$*OFDM_TRN_basic_4,
$w_5^{12}$*OFDM_TRN_basic_4]

OFDM_TRN_subfield_5=[OFDM_TRN_basic_5,-
$w_5^{13}$*OFDM_TRN_basic_5,
$w_5^{14}$*OFDM_TRN_basic_5,
$w_5^{15}$*OFDM_TRN_basic_5,
$w_5^{16}$*OFDM_TRN_basic_5]

(6) Nsts=6(total number of stream: 6) ($w_6$=exp(−j 2*pi/6))

OFDM_TRN_subfield_1=[OFDM_TRN_basic_1,
OFDM_TRN_basic_1,OFDM_TRN_basic_1,
OFDM_TRN_basic_1]

OFDM_TRN_subfield_2=[OFDM_TRN_basic_2,
OFDM_TRN_basic_2,OFDM_TRN_basic_2,
OFDM_TRN_basic_2]

OFDM_TRN_subfield_3=[OFDM_TRN_basic_3,-
OFDM_TRN_basic_3,OFDM_TRN_basic_3,-
OFDM_TRN_basic_3]

OFDM_TRN_subfield_4=[OFDM_TRN_basic_4,-
OFDM_TRN_basic_4,OFDM_TRN_basic_4,-
OFDM_TRN_basic_4]

OFDM_TRN_subfield_5=[OFDM_TRN_basic_5,
OFDM_TRN_basic_5,-OFDM_TRN_basic_5,-
OFDM_TRN_basic_5]

OFDM_TRN_subfield_6=[OFDM_TRN_basic_6,
OFDM_TRN_basic_6,-OFDM_TRN_basic_6,-
OFDM_TRN_basic_6]

or

OFDM_TRN_subfield_1=[OFDM_TRN_basic_1,-
OFDM_TRN_basic_1,OFDM_TRN_basic_1,
OFDM_TRN_basic_1,OFDM_TRN_basic_1,
OFDM_TRN_basic_1]

OFDM_TRN_subfield_2=[OFDM_TRN_basic_2,-
$w_6^1$*OFDM_TRN_basic_2,
$w_6^2$*OFDM_TRN_basic_2,
$w_6^3$*OFDM_TRN_basic_2,
$w_6^4$*OFDM_TRN_basic_2,-
$w_6^5$*OFDM_TRN_basic_2]

OFDM_TRN_subfield_3=[OFDM_TRN_basic_3,-
$w_6^2$*OFDM_TRN_basic_3,
$w_6^4$*OFDM_TRN_basic_3,
$w_6^6$*OFDM_TRN_basic_3, $w_6^8$*OFDM_TRN_basic_3-
$w_6^{10}$*OFDM_TRN_basic_3]

OFDM_TRN_subfield_4=[OFDM_TRN_basic_4,-
  $w_6^3$*OFDM_TRN_basic_4,
  $w_6^6$*OFDM_TRN_basic_4,
  $w_6^9$*OFDM_TRN_basic_4,
  $w_6^{12}$*OFDM_TRN_basic_4-
  $w_6^{15}$*OFDM_TRN_basic_4]

OFDM_TRN_subfield_5=[OFDM_TRN_basic_5,-
  $w_6^4$*OFDM_TRN_basic_5,
  $w_6^8$*OFDM_TRN_basic_5,
  $w_6^{12}$*OFDM_TRN_basic_5,
  $w_6^{16}$*OFDM_TRN_basic_5-
  $w_6^{20}$*OFDM_TRN_basic_5]

OFDM_TRN_subfield_6=[OFDM_TRN_basic_6,-
  $w_6^5$*OFDM_TRN_basic_6,
  $w_6^{10}$*OFDM_TRN_basic_6,
  $w_6^{18}$*OFDM_TRN_basic_6,
  $w_6^{20}$*OFDM_TRN_basic_6-
  $w_6^{28}$*OFDM_TRN_basic_6]

or

OFDM_TRN_subfield_1=[OFDM_TRN_basic_1,-
  OFDM_TRN_basic_1,OFDM_TRN_basic_1,
  OFDM_TRN_basic_1,OFDM_TRN_basic_1,
  OFDM_TRN_basic_1,OFDM_TRN_basic_1,
  OFDM_TRN_basic_1]

OFDM_TRN_subfield_2=[OFDM_TRN_basic_2,
  OFDM_TRN_basic_2,-OFDM_TRN_basic_2,
  OFDM_TRN_basic_2,OFDM_TRN_basic_2,
  OFDM_TRN_basic_2,-OFDM_TRN_basic_2,
  OFDM_TRN_basic_2]

OFDM_TRN_subfield_3=[OFDM_TRN_basic_3,
  OFDM_TRN_basic_3,OFDM_TRN_basic_3,
  OFDM_TRN_basic_3,OFDM_TRN_basic_3,-
  OFDM_TRN_basic_3]

OFDM_TRN_subfield_4=[-OFDM_TRN_basic_4,
  OFDM_TRN_basic_4,OFDM_TRN_basic_4,
  OFDM_TRN_basic_4,-OFDM_TRN_basic_4,
  OFDM_TRN_basic_4,OFDM_TRN_basic_4,
  OFDM_TRN_basic_4]

OFDM_TRN_subfield_5=[OFDM_TRN_basic_5,-
  OFDM_TRN_basic_5,OFDM_TRN_basic_5,
  OFDM_TRN_basic_5,OFDM_TRN_basic_5,
  OFDM_TRN_basic_5,-OFDM_TRN_basic_5,-
  OFDM_TRN_basic_5]

OFDM_TRN_subfield_6=[OFDM_TRN_basic_6,
  OFDM_TRN_basic_6,-OFDM_TRN_basic_6,
  OFDM_TRN_basic_6,OFDM_TRN_basic_6,
  OFDM_TRN_basic_6,OFDM_TRN_basic_6,-
  OFDM_TRN_basic_6]

OFDM_TRN_subfield_7=[OFDM_TRN_basic_7,
  OFDM_TRN_basic_7,OFDM_TRN_basic_7,-
  OFDM_TRN_basic_7,-OFDM_TRN_basic_7,-
  OFDM_TRN_basic_7,OFDM_TRN_basic_7]

or (7) Nsts=7(total number of stream: 7) ($w_7$=exp(−j 2*pi/7))

OFDM_TRN_subfield_1=[OFDM_TRN_basic_1,
  OFDM_TRN_basic_1,OFDM_TRN_basic_1,
  OFDM_TRN_basic_1]

OFDM_TRN_subfield_2=[OFDM_TRN_basic_2,
  OFDM_TRN_basic_2,OFDM_TRN_basic_2,
  OFDM_TRN_basic_2]

OFDM_TRN_subfield_3=[OFDM_TRN_basic_3,-
  OFDM_TRN_basic_3,OFDM_TRN_basic_3,
  OFDM_TRN_basic_3]

OFDM_TRN_subfield_4=[OFDM_TRN_basic_4,-
  OFDM_TRN_basic_4,OFDM_TRN_basic_4,-
  OFDM_TRN_basic_4]

OFDM_TRN_subfield_5=[OFDM_TRN_basic_5,
  OFDM_TRN_basic_5,-OFDM_TRN_basic_5,-
  OFDM_TRN_basic_5]

OFDM_TRN_subfield_6=[OFDM_TRN_basic_6,
  OFDM_TRN_basic_6,-OFDM_TRN_basic_6,-
  OFDM_TRN_basic_6]

OFDM_TRN_subfield_7=[OFDM_TRN_basic_7,-
  OFDM_TRN_basic_7,-OFDM_TRN_basic_7,
  OFDM_TRN_basic_7]

or

OFDM_TRN_subfield_1=[OFDM_TRN_basic_1,-
  OFDM_TRN_basic_1,OFDM_TRN_basic_1,
  OFDM_TRN_basic_1,OFDM_TRN_basic_1,
  OFDM_TRN_basic_1,OFDM_TRN_basic_1,
  OFDM_TRN_basic_1]

OFDM_TRN_subfield_2=[OFDM_TRN_basic_2,
  OFDM_TRN_basic_2,-OFDM_TRN_basic_2,
  OFDM_TRN_basic_2,OFDM_TRN_basic_2,
  OFDM_TRN_basic_2,-OFDM_TRN_basic_2,
  OFDM_TRN_basic_2]

OFDM_TRN_subfield_3=[OFDM_TRN_basic_3,
  OFDM_TRN_basic_3,OFDM_TRN_basic_3,
  OFDM_TRN_basic_3,OFDM_TRN_basic_3,
  OFDM_TRN_basic_3,OFDM_TRN_basic_3,-
  OFDM_TRN_basic_3]

OFDM_TRN_subfield_4=[-OFDM_TRN_basic_4,
  OFDM_TRN_basic_4,OFDM_TRN_basic_4,
  OFDM_TRN_basic_4,-OFDM_TRN_basic_4,
  OFDM_TRN_basic_4,OFDM_TRN_basic_4,
  OFDM_TRN_basic_4]

OFDM_TRN_subfield_5=[OFDM_TRN_basic_5,-
  OFDM_TRN_basic_5,OFDM_TRN_basic_5,
  OFDM_TRN_basic_5,OFDM_TRN_basic_5,
  OFDM_TRN_basic_5,-OFDM_TRN_basic_5,-
  OFDM_TRN_basic_5]

OFDM_TRN_subfield_6=[OFDM_TRN_basic_6,
  OFDM_TRN_basic_6,-OFDM_TRN_basic_6,
  OFDM_TRN_basic_6,OFDM_TRN_basic_6,
  OFDM_TRN_basic_6,OFDM_TRN_basic_6,-
  OFDM_TRN_basic_6]

OFDM_TRN_subfield_7=[OFDM_TRN_basic_7,
  OFDM_TRN_basic_7,OFDM_TRN_basic_7,-
  OFDM_TRN_basic_7,-OFDM_TRN_basic_7,-
  OFDM_TRN_basic_7,OFDM_TRN_basic_7]

or

OFDM_TRN_subfield_1=[OFDM_TRN_basic_1,-
  $w_7^1$*OFDM_TRN_basic_1,
  $w_7^2$*OFDM_TRN_basic_1,
  $w_7^3$*OFDM_TRN_basic_1,
  $w_7^4$*OFDM_TRN_basic_1,-
  $w_7^5$*OFDM_TRN_basic_1,
  $w_7^6$*OFDM_TRN_basic_1]

OFDM_TRN_subfield_2=[OFDM_TRN_basic_2,-
  $w_7^7$*OFDM_TRN_basic_2,
  $w_7^8$*OFDM_TRN_basic_2,
  $w_7^9$*OFDM_TRN_basic_2,
  $w_7^{10}$*OFDM_TRN_basic_2,
  $w_7^{11}$*OFDM_TRN_basic_2,
  $w_7^{12}$*OFDM_TRN_basic_2]

OFDM_TRN_subfield_3=[OFDM_TRN_basic_3,-
  $w_7^{13}$*OFDM_TRN_basic_3,
  $w_7^{14}$*OFDM_TRN_basic_3,
  $w_7^{15}$*OFDM_TRN_basic_3,
  $w_7^{16}$*OFDM_TRN_basic_3,-
  $w_7^{17}$*OFDM_TRN_basic_3,
  $w_7^{18}$*OFDM_TRN_basic_3]

OFDM_TRN_subfield_4=[OFDM_TRN_basic_4,-
 $w_7^{19}$*OFDM_TRN_basic_4,
 $w_7^{20}$*OFDM_TRN_basic_4,
 $w_7^{21}$*OFDM_TRN_basic_4,
 $w_7^{22}$*OFDM_TRN_basic_4,-
 $w_7^{23}$*OFDM_TRN_basic_4,
 $w_7^{24}$*OFDM_TRN_basic_4]

OFDM_TRN_subfield_5=[OFDM_TRN_basic_5,-
 $w_7^{25}$*OFDM_TRN_basic_5,
 $w_7^{26}$*OFDM_TRN_basic_5,
 $w_7^{27}$*OFDM_TRN_basic_5,
 $w_7^{28}$*OFDM_TRN_basic_5,-
 $w_7^{29}$*OFDM_TRN_basic_5,
 $w_7^{30}$*OFDM_TRN_basic_5]

OFDM_TRN_subfield_6=[OFDM_TRN_basic_6,-
 $w_7^{31}$*OFDM_TRN_basic_6,
 $w_7^{32}$*OFDM_TRN_basic_6,
 $w_7^{33}$*OFDM_TRN_basic_6,
 $w_7^{34}$*OFDM_TRN_basic_6,-
 $w_7^{35}$*OFDM_TRN_basic_6,
 $w_7^{36}$*OFDM_TRN_basic_6]

OFDM_TRN_subfield_7=[OFDM_TRN_basic_7,-
 $w_7^{37}$*OFDM_TRN_basic_7,
 $w_7^{38}$*OFDM_TRN_basic_7,
 $w_7^{39}$*OFDM_TRN_basic_7,
 $w_7^{40}$*OFDM_TRN_basic_7,-
 $w_7^{41}$*OFDM_TRN_basic_7,
 $w_7^{42}$*OFDM_TRN_basic_7]

(8) Nsts=8(total number of stream: 8) ($w_8$=exp(−j 2*pi/8))

OFDM_TRN_subfield_1=[OFDM_TRN_basic_1,
 OFDM_TRN_basic_1,OFDM_TRN_basic_1,
 OFDM_TRN_basic_1]

OFDM_TRN_subfield_2=[OFDM_TRN_basic_2,
 OFDM_TRN_basic_2,OFDM_TRN_basic_2,
 OFDM_TRN_basic_2]

OFDM_TRN_subfield_3=[OFDM_TRN_basic_3,-
 OFDM_TRN_basic_3,OFDM_TRN_basic_3,-
 OFDM_TRN_basic_3]

OFDM_TRN_subfield_4=[OFDM_TRN_basic_4,-
 OFDM_TRN_basic_4,OFDM_TRN_basic_4,-
 OFDM_TRN_basic_4]

OFDM_TRN_subfield_5=[OFDM_TRN_basic_5,
 OFDM_TRN_basic_5,-OFDM_TRN_basic_5,-
 OFDM_TRN_basic_5]

OFDM_TRN_subfield_6=[OFDM_TRN_basic_6,
 OFDM_TRN_basic_6,-OFDM_TRN_basic_6,-
 OFDM_TRN_basic_6]

OFDM_TRN_subfield_7=[OFDM_TRN_basic_7,-
 OFDM_TRN_basic_7,-OFDM_TRN_basic_7,
 OFDM_TRN_basic_7]

OFDM_TRN_subfield_8=[OFDM_TRN_basic_8,-
 OFDM_TRN_basic_8,-OFDM_TRN_basic_8,
 OFDM_TRN_basic_8]

or

OFDM_TRN_subfield_1=[OFDM_TRN_basic_1,-
 OFDM_TRN_basic_1,OFDM_TRN_basic_1,
 OFDM_TRN_basic_1,OFDM_TRN_basic_1,-
 OFDM_TRN_basic_1,OFDM_TRN_basic_1,
 OFDM_TRN_basic_1]

OFDM_TRN_subfield_2=[OFDM_TRN_basic_2,
 OFDM_TRN_basic_2,-OFDM_TRN_basic_2,
 OFDM_TRN_basic_2,OFDM_TRN_basic_2,
 OFDM_TRN_basic_2,-OFDM_TRN_basic_2,
 OFDM_TRN_basic_2]

OFDM_TRN_subfield_3=[OFDM_TRN_basic_3,
 OFDM_TRN_basic_3,OFDM_TRN_basic_3,-
 OFDM_TRN_basic_3,OFDM_TRN_basic_3,
 OFDM_TRN_basic_3,OFDM_TRN_basic_3,-
 OFDM_TRN_basic_3]

OFDM_TRN_subfield_4=[−OFDM_TRN_basic_4,
 OFDM_TRN_basic_4,OFDM_TRN_basic_4,
 OFDM_TRN_basic_4,−OFDM_TRN_basic_4,
 OFDM_TRN_basic_4,OFDM_TRN_basic_4,
 OFDM_TRN_basic_4]

OFDM_TRN_subfield_5=[OFDM_TRN_basic_5,-
 OFDM_TRN_basic_5,OFDM_TRN_basic_5,
 OFDM_TRN_basic_5,OFDM_TRN_basic_5,
 OFDM_TRN_basic_5,−OFDM_TRN_basic_5,-
 OFDM_TRN_basic_5]

OFDM_TRN_subfield_6=[OFDM_TRN_basic_6,
 OFDM_TRN_basic_6,−OFDM_TRN_basic_6,
 OFDM_TRN_basic_6,OFDM_TRN_basic_6,
 OFDM_TRN_basic_6,OFDM_TRN_basic_6,-
 OFDM_TRN_basic_6]

OFDM_TRN_subfield_7=[OFDM_TRN_basic_7,
 OFDM_TRN_basic_7,OFDM_TRN_basic_7,-
 OFDM_TRN_basic_7,OFDM_TRN_basic_7,
 OFDM_TRN_basic_7,−OFDM_TRN_basic_7,
 OFDM_TRN_basic_7]

OFDM_TRN_subfield_8=[−OFDM_TRN_basic_8,
 OFDM_TRN_basic_8,OFDM_TRN_basic_8,
 OFDM_TRN_basic_8,OFDM_TRN_basic_8,
 OFDM_TRN_basic_8,−OFDM_TRN_basic_8,-
 OFDM_TRN_basic_8]

or

OFDM_TRN_subfield_1=[OFDM_TRN_basic_1,-
 $w_8^1$*OFDM_TRN_basic_1,
 $w_8^2$*OFDM_TRN_basic_1,
 $w_8^3$*OFDM_TRN_basic_1,
 $w_8^4$*OFDM_TRN_basic_1,
 $w_8^5$*OFDM_TRN_basic_1,
 $w_8^6$*OFDM_TRN_basic_1,
 $w_8^7$*OFDM_TRN_basic_1]

OFDM_TRN_subfield_2=[OFDM_TRN_basic_2,-
 $w_8^8$*OFDM_TRN_basic_2,
 $w_8^9$*OFDM_TRN_basic_2,
 $w_8^{10}$*OFDM_TRN_basic_2,
 $w_8^{11}$*OFDM_TRN_basic_2,-
 $w_8^{12}$*OFDM_TRN_basic_2,
 $w_8^{13}$*OFDM_TRN_basic_2,
 $w_8^{14}$*OFDM_TRN_basic_2]

OFDM_TRN_subfield_3=[OFDM_TRN_basic_3,-
 $w_8^{15}$*OFDM_TRN_basic_3,
 $w_8^{16}$*OFDM_TRN_basic_3,
 $w_8^{17}$*OFDM_TRN_basic_3,
 $w_8^{18}$*OFDM_TRN_basic_3,-
 $w_8^{19}$*OFDM_TRN_basic_3,
 $w_8^{20}$*OFDM_TRN_basic_3,
 $w_8^{21}$*OFDM_TRN_basic_3]

OFDM_TRN_subfield_4=[OFDM_TRN_basic_4,-
 $w_8^{22}$*OFDM_TRN_basic_4,
 $w_8^{23}$*OFDM_TRN_basic_4,
 $w_8^{24}$*OFDM_TRN_basic_4,
 $w_8^{25}$*OFDM_TRN_basic_4,-
 $w_8^{26}$*OFDM_TRN_basic_4,
 $w_8^{27}$*OFDM_TRN_basic_4,
 $w_8^{28}$*OFDM_TRN_basic_4]

OFDM_TRN_subfield_5=[OFDM_TRN_basic_5,-
 $w_8^{29}$*OFDM_TRN_basic_5,
 $w_8^{30}$*OFDM_TRN_basic_5,
 $w_8^{31}$*OFDM_TRN_basic_5,
 $w_8^{32}$*OFDM_TRN_basic_5,-
 $w_8^{33}$*OFDM_TRN_basic_5, $w_8^{34}$*OFDM_TRN_basic_5,
$w_8^{35}$*OFDM_TRN_basic_5]

OFDM_TRN_subfield_6=[OFDM_TRN_basic_6,-
　　$w_8^{36}$*OFDM_TRN_basic_6,
　　$w_8^{37}$*OFDM_TRN_basic_6,
　　$w_8^{38}$*OFDM_TRN_basic_6,
　　$w_8^{39}$*OFDM_TRN_basic_6,-
　　$w_8^{40}$*OFDM_TRN_basic_6,
　　$w_8^{41}$*OFDM_TRN_basic_6,
　　$w_8^{42}$*OFDM_TRN_basic_6]

OFDM_TRN_subfield_7=[OFDM_TRN_basic_7,-
　　$w_8^{43}$*OFDM_TRN_basic_7,
　　$w_8^{44}$*OFDM_TRN_basic_7,
　　$w_8^{45}$*OFDM_TRN_basic_7,
　　$w_8^{46}$*OFDM_TRN_basic_7,-
　　$w_8^{47}$*OFDM_TRN_basic_7,
　　$w_8^{48}$*OFDM_TRN_basic_7,
　　$w_8^{49}$*OFDM_TRN_basic_7]

OFDM_TRN_subfield_8=[OFDM_TRN_basic_8,-
　　$w_8^{50}$*OFDM_TRN_basic_8,
　　$w_8^{51}$*OFDM_TRN_basic_8,
　　$w_8^{52}$*OFDM_TRN_basic_8,
　　$w_8^{53}$*OFDM_TRN_basic_8,-
　　$w_8^{54}$*OFDM_TRN_basic_8,
　　$w_8^{55}$*OFDM_TRN_basic_8,
　　$w_8^{56}$*OFDM_TRN_basic_8]

As described above, the TRN field transmitted by the transmitter may be determined to have a different length according to the total number of streams to be transmitted and the value of the TRN Subfield Sequence Length field of the EDMG Header-A field.

3.1.4. Conclusions

According to one example to which the present invention may be applied, the TRN field (or TRN subfield) of the EDMG OFDM mode may be configured as follows.

For transmission of an EDMG PPDU in the EDMG OFDM mode through a 2.16 GHz channel, an OFDM TRN_BASIC sequence in the frequency domain for the iTX-th space-time stream may be defined by the mathematical equation given below. At this time, $\text{Seq}^{iTX}_{left,\ 176}$ and $\text{Seq}^{iTX}_{right,\ 176}$ may correspond to $\text{Seq}^{iSTS}_{left,\ 176}$ and $\text{Seq}^{iSTS}_{right,\ 176}$ of FIGS. 11 and 12 above.

$$\text{TRN\_BASIC}^{iTX}_{-177,177}=[\text{Seq}^{iTX}_{left,176},0,0,0, \text{Seq}^{iTX}_{right,176}], \quad \text{[Equation 8]}$$

for $i_{TX}$=1, 2, 3, 4, 5, 6, 7, 8

For transmission of an EDMG PPDU in the EDMG OFDM mode through a 2.16 GHz channel, an OFDM TRN_BASIC sequence in the frequency domain for the iTX-th space-time stream may be defined by the mathematical equation given below. At this time, $\text{Seq}^{iTX}_{left,\ 385}$ and $\text{Seq}^{iTX}_{right,\ 385}$ may correspond to $\text{Seq}^{iSTS}_{left,\ 385}$ and $\text{Seq}^{iSTS}_{right,\ 385}$ of FIGS. 13 to 16 above.

$$\text{TRN\_BASIC}^{iTX}_{-386,386}=[\text{Seq}^{iTX}_{left,385},0,0,0, \text{Seq}^{iTX}_{right,385}], \quad \text{[Equation 9]}$$

for $i_{TX}$=1, 2, 3, 4, 5, 6, 7, 8

For transmission of an EDMG PPDU in the EDMG OFDM mode through a 6.48 GHz channel, an OFDM TRN_BASIC sequence in the frequency domain for the iTX-th space-time stream may be defined by the mathematical equation given below. At this time, $\text{Seq}^{iTX}_{left,\ 595}$ and $\text{Seq}^{iTX}_{right,\ 595}$ may correspond to $\text{Seq}^{iSTS}_{left,\ 595}$ and $\text{Seq}^{iSTS}_{right,\ 595}$ of FIGS. 17 to 22 above.

$$\text{TRN\_BASIC}^{iTX}_{-596,596}=[\text{Seq}^{iTX}_{left,595},0,0,0, \text{Seq}^{iTX}_{right,595}], \quad \text{[Equation 10]}$$

for $i_{TX}$=1, 2, 3, 4, 5, 6, 7, 8

For transmission of an EDMG PPDU in the EDMG OFDM mode through an 8.64 GHz channel, an OFDM TRN_BASIC sequence in the frequency domain for the $i_{TX}$-th space-time stream may be defined by the mathematical equation given below. At this time, $\text{Seq}^{iTX}_{left,\ 804}$ and $\text{Seq}^{iTX}_{right,\ 804}$ may correspond to $\text{Seq}^{iSTS}_{left,\ 804}$ and $\text{Seq}^{iSTS}_{right,\ 804}$ of FIGS. 23 to 30 above.

$$\text{TRN\_BASIC}^{iTX}_{-805,805}=[\text{Seq}^{iTX}_{left,804},0,0,0, \text{Seq}^{iTX}_{right,804}], \quad \text{[Equation 11]}$$

for $i_{TX}$=1, 2, 3, 4, 5, 6, 7, 8

When the OFDM sampling rate $F_S=N_{CB}*2.64$ GHz, and sampling time $T_S=1/F_S$, a basic OFDM TRN subfield waveform for the $i_{TX}$-th transmission chain (or space-time stream) in the time domain may be defined by the mathematical equation given below.

$$r^{iTX}_{TRN\_BASIC}(qT_s) = \sum_{n=1}^{N^{N_{TX}}_{TRN}} r^{n,iTX}_{TRN}(qT_s - (n-1)\cdot(T_{DFT}+T_{GI\ long})) \quad \text{[Equation 12]}$$

where:

$$r^{n,iTX}_{TRN}(qT_s) = \frac{1}{\sqrt{N^{Tone}_{TRN}}} w(qT_s) \cdot \sum_{k=-N_{SR}}^{N_{SR}} [P_{TRN}]_{i_{TX},n}$$

$$\text{TRN\_BASIC}^{iTX}_k \exp(j2\pi k\Delta_F(qT_s - T_{GI\ long})), 1 \leq n \leq N^{N_{TX}}_{TRN}$$

At this time, the Normal TRN subfield, Short TRN subfield, and Long TRN subfield according to the value of the TRN Subfield Sequence Length field of the EDMG Header-A field may be defined by the mathematical equation given below.

$$r^{iTX}_{TRN\_NORMAL}(qT_s) = \sum_{n=1}^{2} r^{iTX}_{TRN\_BASIC}(qT_s - (n-1)\cdot T_{BASIC}) \quad \text{[Equation 13]}$$

$$r^{iTX}_{TRN\_SHORT}(qT_s) = r^{iTX}_{TRN\_BASIC}(qT_s)$$

$$r^{iTX}_{TRN\_LONG}(qT_s) = \sum_{n=1}^{4} r^{iTX}_{TRN\_BASIC}(qT_s - (n-1)\cdot T_{BASIC})$$

In the mathematical equations above, $N_{CB}$ represents the number of contiguous or bonded (or combined) channels, and other parameters may be defined as follows.

$$N^{Tone}_{TRN}=N_{ST}-N_{DC} \quad \text{[Equation 14]}$$

is the total number of active tones
$P_{TRN}$ is the TRN mapping matrix (see below)
$N^{N_{TX}}_{TRN}$ is the number of OFDM symbols in a TRN subfield for the given total number of transmit chains $N_{TX}$ (see below)
$[\ ]_{m,n}$ is a matrix element from $m^{th}$ row and $n^{th}$ column
$w(qT_s)$ is window function applied to smooth the transitions between consecutive OFDM symbols; its definition is implementation specific
q is a time sample index
$T_{BASIC}$ is the duration of the basic TRN subfield
From the definition above, $P_{TRN}$ (OFDM TRN mapping matrix) may be defined according to the $N_{TX}$ value by the mathematical equation given below.

The OFDM TRN mapping matrix for $$N_{TX}=1 \quad \text{[Equation 15]}$$

is defined as follows:

$$P_{TRN}=[1\ -1], N_{TRN}^{NTX}=2 \quad \text{[Equation 16]}$$

The OFDM TRN mapping matrix for $N_{TX}=2$ is defined as follows:

$$P_{TRN} = \begin{bmatrix} +1 & -1 \\ +1 & +1 \end{bmatrix}, N_{TRN}^{N_{TX}} = 2 \quad \text{[Equation 17]}$$

The OFDM TRN mapping matrix for $N_{TX}=3$ is defined as follows:

$$P_{TRN} = \begin{bmatrix} +1 & -1 & +1 \\ +1 & -w_3^1 & w_3^2 \\ +1 & -w_3^2 & w_3^4 \end{bmatrix},$$

$$w_3 = \exp(-j2\pi/3), N_{TRN}^{N_{TX}} = 3 \quad \text{[Equation 18]}$$

The OFDM TRN mapping matrix for $N_{TX}=4$ is defined as follows:

$$P_{TRN} = P_{4\times 4} = \begin{bmatrix} +1 & -1 & +1 & +1 \\ +1 & +1 & -1 & +1 \\ +1 & +1 & +1 & -1 \\ -1 & +1 & +1 & +1 \end{bmatrix}, N_{TRN}^{N_{TX}} = 4 \quad \text{[Equation 19]}$$

The OFDM TRN mapping matrix for $N_{TX}=5, 6$ is defined as follows:

$$P_{TRN} = \begin{bmatrix} +1 & -1 & +1 & +1 & +1 & -1 \\ +1 & -w_6^1 & w_6^2 & w_6^3 & w_6^4 & -w_6^5 \\ +1 & -w_6^2 & w_6^4 & w_6^6 & w_6^8 & -w_6^{10} \\ +1 & -w_6^3 & w_6^6 & w_6^9 & w_6^{12} & -w_6^{15} \\ +1 & -w_6^4 & w_6^8 & w_6^{12} & w_6^{16} & -w_6^{20} \\ +1 & -w_6^5 & w_6^{10} & w_6^{15} & w_6^{20} & -w_6^{25} \end{bmatrix}, \quad \text{[Equation 20]}$$

$$w_6 = \exp(-j2\pi/6), N_{TRN}^{N_{TX}} = 6$$

The OFDM TRN mapping matrix for $N_{TX}=7, 8$ is defined as follows:

$$P_{TRN} = \begin{bmatrix} P_{4\times 4} & P_{4\times 4} \\ P_{4\times 4} & -P_{4\times 4} \end{bmatrix}, N_{TRN}^{N_{TX}} = 8$$

The descriptions above summarize what have been disclosed in Sections 3.1.1 to 3.1.3, and it should be understood by those skilled in the art to which the present invention belongs that the descriptions given in Section 3.1.4 are included in the descriptions given in Sections 3.1.1 to 3.1.3.

3.2. Method for Transmitting and Receiving Signals Including a TRN Subfield in the OFDM Mode In one embodiment to which the present invention may be applied, transmission of a TRN field may be started by repeated transmission of a TRN subfield T times. At this time, the TRN subfields transmitted repeatedly T times may be transmitted by using/based on the Antenna Weight Vector (AWV) used for transmission of the initial P TRN subfields.

The T repeated transmission of the TRN subfield, which is the beginning of the TRN field, may be defined for providing a transition interval between processing of the data and the TRN fields of a receiver.

According to the present invention, the T value may be determined based on the value indicated by/included in the TRN Subfield Sequence Length field of the EDMG Header-A field. As one example, when the TRN Subfield Sequence Length field value of the EDMG Header-A field is 0, the T value may be 2. Similarly, when the TRN Subfield Sequence Length field value of the EDMG Header-A field is 1, the T value may be 1. Similarly, when the TRN Subfield Sequence Length field value of the EDMG Header-A field is 2, the T value may be 4.

Accordingly, before transmitting a TRN subfield per space-time stream included in the TRN field, the transmitter may transmit the TRN subfield per space-time stream T times. In other words, the transmitted signal may include the training subfield, wherein the training subfield is transmitted repeatedly T times after a data field based on information indicated by/included in the header field, wherein T is a natural number.

Figure 39:
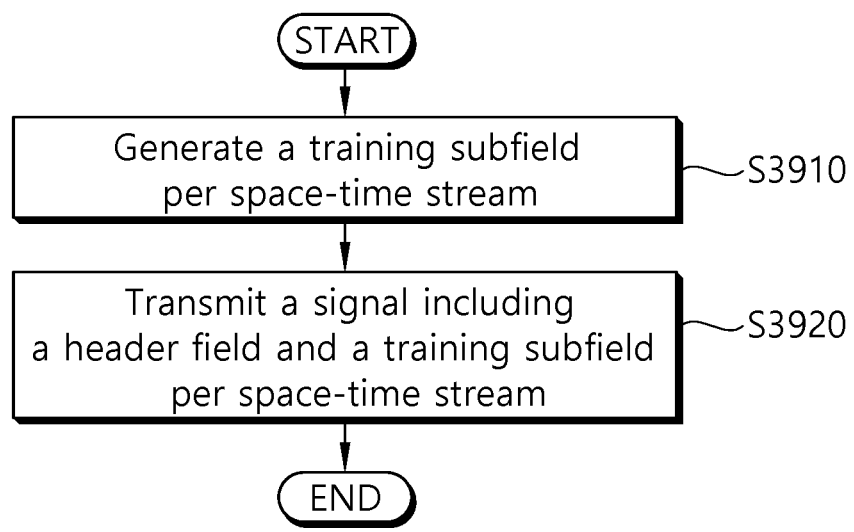
FIG. 39 illustrates a method for transmitting signals including a TRN field according to one embodiment of the present invention.

FIG. 39 is a flow diagram illustrating a method for transmitting signals including a TRN field according to one embodiment of the present invention. In what follows, a TRN field may be interpreted as a concept which includes time duration over which all of training subfields are transmitted.

First, a transmitter (for example, STA) generates a training subfield configured of/including a predetermined number of OFDM symbols included in a transmitted signal S3910. At this time, the training subfield may be configured for each space-time stream.

At this time, the training subfield per space-time stream may be configured by using/based on a basic training subfield per space-time stream configured of M (where M is a natural number) OFDM symbols based on the information indicated by/included in the header field based on the rule determined by the total number of space-time streams.

As one example, when the total number of space-time streams is 1, the training subfield per space-time stream may be configured as follows. In what follows, OFDM_TRN_subfield_N denotes a training subfield with respect to a space-time stream index N, and OFDM_TRN_basic_N denotes a basic training subfield with respect to the space-time stream index N.

OFDM_TRN_subfield_1=[OFDM_TRN_basic_1,-OFDM_TRN_basic_1]

As another example, when the total number of space-time streams is 2, the training subfield per space-time stream may be configured as follows.

OFDM_TRN_subfield_1=[OFDM_TRN_basic_1,-OFDM_TRN_basic_1]

OFDM_TRN_subfield_2=[OFDM_TRN_basic_2,OFDM_TRN_basic_2]

As yet another example, when the total number of space-time streams is 3, the training subfield per space-time stream may be configured as follows. In the mathematical equation given below, $w_3=\exp(-j*2*pi/3)$.

OFDM_TRN_subfield_1=[OFDM_TRN_basic_1,-OFDM_TRN_basic_1,OFDM_TRN_basic_1]

OFDM_TRN_subfield_2=[OFDM_TRN_basic_2,−
  $w_3^1$*OFDM_TRN_basic_2,
  $w_3^2$*OFDM_TRN_basic_2]

OFDM_TRN_subfield_3=[OFDM_TRN_basic_3,−
  $w_3^1$*OFDM_TRN_basic_3,
  $w_3^4$*OFDM_TRN_basic_3]

As yet another example, when the total number of space-time streams is 4, the training subfield per space-time stream may be configured as follows.

OFDM_TRN_subfield_1=[OFDM_TRN_basic_1,−
  OFDM_TRN_basic_1,OFDM_TRN_basic_1,
  OFDM_TRN_basic_1]

OFDM_TRN_subfield_2=[OFDM_TRN_basic_2,
  OFDM_TRN_basic_2,−OFDM_TRN_basic_2,
  OFDM_TRN_basic_2]

OFDM_TRN_subfield_3=[OFDM_TRN_basic_3,
  OFDM_TRN_basic_3,OFDM_TRN_basic_3,−
  OFDM_TRN_basic_3]

OFDM_TRN_subfield_4=[−OFDM_TRN_basic_4,
  OFDM_TRN_basic_4,OFDM_TRN_basic_4,
  OFDM_TRN_basic_4]

As still another example, when the total number of space-time streams is 5, the training subfield per space-time stream may be configured as follows. In the mathematical equation given below, $w_6$=exp(−j*2*pi/6).

OFDM_TRN_subfield_1=[OFDM_TRN_basic_1,−
  OFDM_TRN_basic_1,OFDM_TRN_basic_1,
  OFDM_TRN_basic_1,OFDM_TRN_basic_1,−
  OFDM_TRN_basic_1]

OFDM_TRN_subfield_2=[OFDM_TRN_basic_2,−
  $w_6^1$*OFDM_TRN_basic_2,
  $w_6^2$*OFDM_TRN_basic_2,
  $w_6^3$*OFDM_TRN_basic_2,
  $w_6^4$*OFDM_TRN_basic_2,−
  $w_6^5$*OFDM_TRN_basic_2]

OFDM_TRN_subfield_3=[OFDM_TRN_basic_3,−
  $w_6^2$*OFDM_TRN_basic_3,
  $w_6^4$*OFDM_TRN_basic_3,
  $w_6^6$*OFDM_TRN_basic_3,
  $w_6^8$*OFDM_TRN_basic_3−
  $w_6^{10}$*OFDM_TRN_basic_3]

OFDM_TRN_subfield_4=[OFDM_TRN_basic_4,
  $w_6^3$*OFDM_TRN_basic_4,
  $w_6^6$*OFDM_TRN_basic_4,
  $w_6^9$*OFDM_TRN_basic_4,
  $w_6^{12}$*OFDM_TRN_basic_4−
  $w_6^{15}$*OFDM_TRN_basic_4]

OFDM_TRN_subfield_5=[OFDM_TRN_basic_5,−
  $w_6^4$*OFDM_TRN_basic_5,
  $w_6^8$*OFDM_TRN_basic_5,
  $w_6^{12}$*OFDM_TRN_basic_5,
  $w_6^{16}$*OFDM_TRN_basic_5−
  $w_6^{20}$*OFDM_TRN_basic_5]

As a further example, when the total number of space-time streams is 5, the training subfield per space-time stream may be configured as follows.

OFDM_TRN_subfield_1=[OFDM_TRN_basic_1,−
  OFDM_TRN_basic_1,OFDM_TRN_basic_1,
  OFDM_TRN_basic_1,OFDM_TRN_basic_1,−
  OFDM_TRN_basic_1]

OFDM_TRN_subfield_2=[OFDM_TRN_basic_2,−
  $w_6^1$*OFDM_TRN_basic_2,
  $w_6^2$*OFDM_TRN_basic_2,
  $w_6^3$*OFDM_TRN_basic_2,
  $w_6^4$*OFDM_TRN_basic_2,−
  $w_6^5$*OFDM_TRN_basic_2]

OFDM_TRN_subfield_3=[OFDM_TRN_basic_3,−
  $w_6^3$*OFDM_TRN_basic_3,
  $w_6^4$*OFDM_TRN_basic_3,
  $w_6^6$*OFDM_TRN_basic_3,
  $w_6^8$*OFDM_TRN_basic_3−$w_6^{10}$*OFDM_TRN_basic_3]

OFDM_TRN_subfield_4=[OFDM_TRN_basic_4,−
  $w_6^3$*OFDM_TRN_basic_4,
  $w_6^6$*OFDM_TRN_basic_4,
  $w_6^9$*OFDM_TRN_basic_4,
  $w_6^{12}$*OFDM_TRN_basic_4−
  $w_6^{15}$*OFDM_TRN_basic_4]

OFDM_TRN_subfield_5=[OFDM_TRN_basic_5,−
  $w_6^4$*OFDM_TRN_basic_5,
  $w_6^8$*OFDM_TRN_basic_5,
  $w_6^{12}$*OFDM_TRN_basic_5,
  $w_6^{16}$*OFDM_TRN_basic_5−
  $w_6^{20}$*OFDM_TRN_basic_5]

OFDM_TRN_subfield_6=[OFDM_TRN_basic_6,−
  $w_6^5$*OFDM_TRN_basic_6,
  $w_6^{10}$*OFDM_TRN_basic_6,
  $w_6^{15}$*OFDM_TRN_basic_6,
  $w_6^{20}$*OFDM_TRN_basic_6−
  $w_6^{25}$*OFDM_TRN_basic_6]

As an additional example, when the total number of space-time streams is 7, the training subfield per space-time stream may be configured as follows.

OFDM_TRN_subfield_1=[OFDM_TRN_basic_1,−
  OFDM_TRN_basic_1,OFDM_TRN_basic_1,
  OFDM_TRN_basic_1,OFDM_TRN_basic_1,−
  OFDM_TRN_basic_1,OFDM_TRN_basic_1,
  OFDM_TRN_basic_1]

OFDM_TRN_subfield_2=[OFDM_TRN_basic_2,
  OFDM_TRN_basic_2,−OFDM_TRN_basic_2,−
  OFDM_TRN_basic_2,OFDM_TRN_basic_2,
  OFDM_TRN_basic_2,OFDM_TRN_basic_2,
  OFDM_TRN_basic_2]

OFDM_TRN_subfield_3=[OFDM_TRN_basic_3,
  OFDM_TRN_basic_3,OFDM_TRN_basic_3,−
  OFDM_TRN_basic_3,OFDM_TRN_basic_3,
  OFDM_TRN_basic_3,OFDM_TRN_basic_3,−
  OFDM_TRN_basic_3]

OFDM_TRN_subfield_4=[−OFDM_TRN_basic_4,
  OFDM_TRN_basic_4,OFDM_TRN_basic_4,
  OFDM_TRN_basic_4,−OFDM_TRN_basic_4,
  OFDM_TRN_basic_4,OFDM_TRN_basic_4,
  OFDM_TRN_basic_4]

OFDM_TRN_subfield_5=[OFDM_TRN_basic_5,−
  OFDM_TRN_basic_5,OFDM_TRN_basic_5,
  OFDM_TRN_basic_5,−OFDM_TRN_basic_5,
  OFDM_TRN_basic_5,−OFDM_TRN_basic_5,−
  OFDM_TRN_basic_5]

OFDM_TRN_subfield_6=[OFDM_TRN_basic_6,
  OFDM_TRN_basic_6,−OFDM_TRN_basic_6,
  OFDM_TRN_basic_6,−OFDM_TRN_basic_6,
  OFDM_TRN_basic_6,OFDM_TRN_basic_6,−
  OFDM_TRN_basic_6]

OFDM_TRN_subfield_7=[OFDM_TRN_basic_7,
  OFDM_TRN_basic_7,OFDM_TRN_basic_7,−
  OFDM_TRN_basic_7,−OFDM_TRN_basic_7,
  OFDM_TRN_basic_7,−OFDM_TRN_basic_7,
  OFDM_TRN_basic_7]

As yet another additional example, when the total number of space-time streams is 8, the training subfield per space-time stream may be configured as follows.

OFDM_TRN_subfield_1=[OFDM_TRN_basic_1,−
  OFDM_TRN_basic_1,OFDM_TRN_basic_1,

```
OFDM_TRN_basic_1,OFDM_TRN_basic_1,-
OFDM_TRN_basic_1,OFDM_TRN_basic_1,
OFDM_TRN_basic_1]

OFDM_TRN_subfield_2=[OFDM_TRN_basic_2,
    OFDM_TRN_basic_2,-OFDM_TRN_basic_2,
    OFDM_TRN_basic_2,OFDM_TRN_basic_2,
    OFDM_TRN_basic_2,-OFDM_TRN_basic_2,
    OFDM_TRN_basic_2]

OFDM_TRN_subfield_3=[OFDM_TRN_basic_3,
    OFDM_TRN_basic_3,OFDM_TRN_basic_3,-
    OFDM_TRN_basic_3,OFDM_TRN_basic_3,
    OFDM_TRN_basic_3,OFDM_TRN_basic_3,-
    OFDM_TRN_basic_3]

OFDM_TRN_subfield_4=[-OFDM_TRN_basic_4,
    OFDM_TRN_basic_4,OFDM_TRN_basic_4,
    OFDM_TRN_basic_4,-OFDM_TRN_basic_4,
    OFDM_TRN_basic_4,OFDM_TRN_basic_4,
    OFDM_TRN_basic_4]

OFDM_TRN_subfield_5=[OFDM_TRN_basic_5,-
    OFDM_TRN_basic_5,OFDM_TRN_basic_5,-
    OFDM_TRN_basic_5,-OFDM_TRN_basic_5,
    OFDM_TRN_basic_5,-OFDM_TRN_basic_5,-
    OFDM_TRN_basic_5]

OFDM_TRN_subfield_6=[OFDM_TRN_basic_6,
    OFDM_TRN_basic_6,-OFDM_TRN_basic_6,
    OFDM_TRN_basic_6,-OFDM_TRN_basic_6,
    OFDM_TRN_basic_6,OFDM_TRN_basic_6,-
    OFDM_TRN_basic_6]

OFDM_TRN_subfield_7=[OFDM_TRN_basic_7,
    OFDM_TRN_basic_7,OFDM_TRN_basic_7,-
    OFDM_TRN_basic_7,-OFDM_TRN_basic_7,-
    OFDM_TRN_basic_7,-OFDM_TRN_basic_7,
    OFDM_TRN_basic_7]

OFDM_TRN_subfield_8=[-OFDM_TRN_basic_8,
    OFDM_TRN_basic_8,OFDM_TRN_basic_8,
    OFDM_TRN_basic_8,OFDM_TRN_basic_8,-
    OFDM_TRN_basic_8,-OFDM_TRN_basic_8,-
    OFDM_TRN_basic_8]
```

At this time, based on the information indicated by/included in the header field, the basic training subfield per space-time stream may be configured of one, two, or four OFDM symbols.

At this time, one OFDM symbol included in the one, two, or four OFDM symbols may include a guard interval with a length of 72.72 ns or cyclic prefix (CP).

Also, the header field may include an Enhanced Directional Multi Gigabit (EDMG) training subfield sequence length field which indicates/including information on the OFDM symbol length of the basic training subfield per space-time stream.

More specifically, when the EDMG training subfield sequence length field indicates 0, the basic training subfield per space-time stream may be configured of two OFDM symbols; when the EDMG training subfield sequence length field indicates 1, the basic training subfield per space-time stream may be configured of four OFDM symbols; and when the EDMG training subfield sequence length field indicates 2, the basic training subfield per space-time stream may be configured of one OFDM symbol.

In the composition above, the basic training subfield per space-time stream may be configured of a sequence with a different length in the frequency domain according to the number of contiguous channels over which the signal is transmitted.

As one example, when the number of contiguous channels over which the signal is transmitted is 1, the basic training subfield per space-time stream may be configured of a sequence with a length of 355 in the frequency domain. At this time, a 512-point IDFT may be applied to the sequence.

As another example, when the number of contiguous channels over which the signal is transmitted is 2, the basic training subfield per space-time stream may be configured of a sequence with a length of 773 in the frequency domain. At this time, a 1024-point IDFT may be applied to the sequence.

As yet another example, when the number of contiguous channels over which the signal is transmitted is 3, the basic training subfield per space-time stream may be configured of a sequence with a length of 596 in the frequency domain. At this time, a 1536-point IDFT may be applied to the sequence.

As still another example, when the number of contiguous channels over which the signal is transmitted is 4, the basic training subfield per space-time stream may be configured of a sequence with a length of 805 in the frequency domain. At this time, a 2048-point IDFT may be applied to the sequence.

Next, the transmitter transmits a signal including the training subfield per space-time stream generated as described above and the header field S3920. At this time, the transmitter may transmit the training subfield (per space-time stream) subsequent to the data field included in the signal repeatedly T times (where T is a natural number) based on the information indicated by/included in the header field. Accordingly, the transmitted signal includes the training subfield (per space-time stream), wherein the training subfield is transmitted repeatedly T times after a data field based on information indicated by/included in the header field, wherein T is a natural number.

At this time, as described in detail above, the T value may be determined by the information (namely the information indicated by/included in the EDMG training subfield sequence length field including in the EDMG header field) indicated by/included in the header field.

As one example, when the EDMG training subfield sequence length field indicates 0, the basic training subfield per space-time stream may be configured of two OFDM symbols, and the T value may be set to 2.

As another example, when the EDMG training subfield sequence length field indicates 1, the basic training subfield per space-time stream may be configured of four OFDM symbols, and the T value may be set to 1.

As yet another example, when the EDMG training subfield sequence length field indicates 2, the basic training subfield per space-time stream may be configured of one OFDM symbol, and the T value may be set to 4.

Through the composition as described above, the time duration over which the training subfield per space-time stream is actually transmitted repeatedly T times may be kept to a fixed value irrespective of the value indicated by/included in the EDMG training subfield sequence length field.

At this time, when the signal is transmitted through a plurality of channels, the transmitter may transmit the signal through the corresponding space-time stream within a plurality of channels.

In response to the transmission, first, the receiver receives a header field included in the transmitted signal. Next, the receiver receives the signal by switching processing between a data field and a training field during a period within a period during which the signal is transmitted, wherein the training subfield is transmitted repeatedly T times after a data field based on the information indicated by/included in the header field during the period, wherein the training subfield is configured of/includes a predetermined number of Orthogonal Frequency Division Multiplexing (OFDM) symbols, wherein the T is a natural number.

At this time, as described above, the time period over which the training subfield per space-time stream is actually transmitted repeatedly T times may be kept to a fixed value irrespective of the value indicated by/included in the EDMG training subfield sequence length field.

4. Device Configuration

Figure 40:
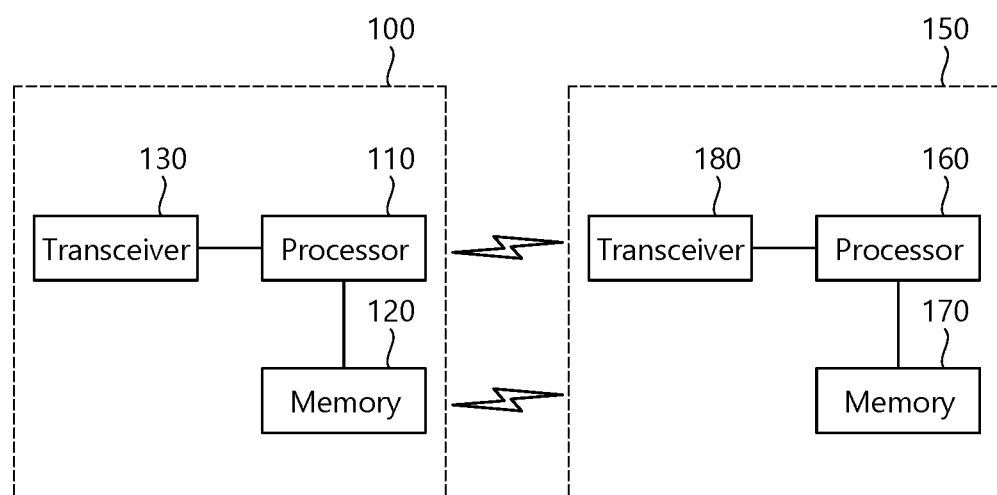
FIG. 40 is a diagram illustrating a device for implementing the above-described method.

FIG. 40 is a diagram illustrating a device for implementing the above-described method.

A wireless device 100 of FIG. 40 may correspond to an STA that transmits a signal described in the above description, and a wireless device 150 may correspond to an STA that receives a signal described in the above description.

In this case, the station transmitting the signal may correspond to a PCP/AP or an 11ay terminal supporting an 11ay system, and the station receiving the signal may correspond to a legacy terminal (e.g., 11ad terminal) that does not support the 11ay system as well as a PCP/AP or an 11ay terminal supporting the 11ay system.

Hereinafter, for convenience of description, the STA transmitting a signal is referred to as a transmitting device 100, and the STA receiving a signal is referred to as a receiving device 150.

The transmitting device (100) may include a processor (110), a memory (120), and; a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

As described above, the detailed description of the preferred exemplary embodiment of the present invention is provided so that anyone skilled in the art can implement and execute the present invention. In the detailed description presented herein, although the present invention is described with reference to the preferred exemplary embodiment of the present invention, it will be understood by anyone having ordinary skills in the art that diverse modifications, alterations, and variations can be made in the present invention. Therefore, the scope and spirit of the present invention will not be limited only to the exemplary embodiments of the present invention set forth herein. Thus, it is intended to provide the broadest scope and spirit of the appended claims of the present invention that are equivalent to the disclosed principles and novel characteristics of the present invention.

INDUSTRIAL APPLICABILITY

Although the present invention has been described in detail under the assumption that the present invention can be applied to an IEEE 802.11 based wireless LAN (WLAN) system, the present invention will not be limited only to this. It will be understood that the present invention can be applied to diverse wireless systems capable of performing data transmission based on channel bonding by using the same method as presented herein.

What is claimed is:

1. A method in a wireless local area network (WLAN) system, the method performed by a transmitting station (STA) and comprising:
   generating a training (TRN) subfield based on a basic TRN subfield,
   wherein:
   the basic TRN subfield is configured for at least one transmit (TX) chain,
   the basic TRN subfield is configured based on a first sequence, a zero sequence being contiguous to the first sequence and a second sequence being contiguous to the zero sequence,
   the first and second sequences have a same number of elements, and
   the zero sequence is configured based on {0, 0, 0}; and
   transmitting an Orthogonal Frequency Division Multiplexing (OFDM) physical protocol data unit (PPDU) including a header field and a TRN field to a receiving STA,
   wherein:
   the TRN field starts with T repetitions of the TRN subfield,
   T denotes a non-zero positive integer,
   the header field includes a length field related to the TRN subfield
   the TRN subfield is determined to be one of a short TRN subfield, a normal TRN subfield and a long TRN subfield based on the length field,
   the short TRN subfield is configured based on 1 repetition of the basic TRN subfield,
   the normal TRN subfield is configured based on 2 repetitions of the basic TRN subfield, and
   the long TRN subfield is configured based on 4 repetitions of the basic TRN subfield.

2. The method of claim 1, wherein when T is set to 1 for the long TRN subfield, T is set to 2 for the normal TRN subfield, and T is set to 4 for the short TRN subfield.

3. The method of claim 1, wherein the TX chain is related to a space time stream (STS), and a maximum number of the STS is set to 8.

4. The method of claim 1, wherein a value of the length field is set to 0 for the normal TRN subfield, a value of the length field is set to 1 for the long TRN subfield, and a value of the length field is set to 2 for the short TRN subfield.

5. The method of claim 1, wherein when the OFDM PPDU is transmitted over 2.16 GHz channel, each of the first sequence and the second sequence includes 176 elements, and when the OFDM PPDU is transmitted over 4.32 GHz channel, each the first sequence and the second sequence includes 385 elements.

6. The method of claim 1, wherein when the OFDM PPDU is transmitted over 6.48 GHz channel, each the first sequence and the second sequence includes 595 elements, and when the OFDM PPDU is transmitted over 8.64 GHz channel, each of the first sequence and the second sequence includes 804 elements.

7. A transmitting station (STA) in a wireless local area network (WLAN) system, comprising:
a transceiver having one or more Radio Frequency (RF) chains and transmitting signals to a receiving STA; and
a processor coupled to the transceiver and configured to:
generate a training (TRN) subfield based on a basic TRN subfield,
wherein:
the basic TRN subfield is configured for at least one transmit (TX) chain,
the basic TRN subfield is configured based on a first sequence, a zero sequence being contiguous to the first sequence and a second sequence being contiguous to the zero sequence,
the first and second sequences have a same number of elements, and
the zero sequence is configured based on {0, 0, 0}; and
transmit an Orthogonal Frequency Division Multiplexing (OFDM) physical protocol data unit (PPDU) including a header field and a TRN field,
wherein:
the TRN field starts with T repetitions of the TRN subfield,
T denotes a non-zero positive integer,
the header field includes a length field related to the TRN subfield
the TRN subfield is determined to be one of a short TRN subfield, a normal TRN subfield and a long TRN subfield based on the length field,
the short TRN subfield is configured based on 1 repetition of the basic TRN subfield,
the normal TRN subfield is configured based on 2 repetitions of the basic TRN subfield, and
the long TRN subfield is configured based on 4 repetitions of the basic TRN subfield.

8. The transmitting STA of claim 7, wherein when T is set to 1 for the long TRN subfield, T is set to 2 for the normal TRN subfield, and T is set to 4 for the short TRN subfield.

9. The transmitting STA of claim 7, wherein the TX chain is related to a space time stream (STS), and a maximum number of the STS is set to 8.

10. The transmitting STA of claim 7, wherein a value of the length field is set to 0 for the normal TRN subfield, a value of the length field is set to 1 for the long TRN subfield, and a value of the length field is set to 2 for the short TRN subfield.

11. The transmitting STA of claim 7, wherein when the OFDM PPDU is transmitted over 2.16 GHz channel, each of the first sequence and the second sequence includes 176 elements, and when the OFDM PPDU is transmitted over 4.32 GHz channel, each the first sequence and the second sequence includes 385 elements.

12. The transmitting STA of claim 7, wherein when the OFDM PPDU is transmitted over 6.48 GHz channel, each the first sequence and the second sequence includes 595 elements, and when the OFDM PPDU is transmitted over 8.64 GHz channel, each of the first sequence and the second sequence includes 804 elements.

\* \* \* \* \*